(12) United States Patent
Kitabayashi et al.

(10) Patent No.: US 8,174,952 B2
(45) Date of Patent: May 8, 2012

(54) LIGHT SOURCE UNIT, OPTICAL DETECTOR UNIT, OPTICAL PICKUP DEVICE, AND OPTICAL DISK DEVICE

(75) Inventors: Junichi Kitabayashi, Kanagawa (JP); Takeshi Miki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 612 days.

(21) Appl. No.: 12/094,569

(22) PCT Filed: Nov. 20, 2006

(86) PCT No.: PCT/JP2006/323529
§ 371 (c)(1), (2), (4) Date: May 21, 2008

(87) PCT Pub. No.: WO2007/058389
PCT Pub. Date: May 24, 2007

(65) Prior Publication Data
US 2009/0046562 A1 Feb. 19, 2009

(30) Foreign Application Priority Data

Nov. 21, 2005 (JP) .................................. 2005-336097
Jan. 20, 2006 (JP) .................................. 2006-012763

(51) Int. Cl.
*G11B 7/135* (2012.01)
*G11B 7/20* (2011.01)
(52) U.S. Cl. ..................................... 369/112.23; 369/94
(58) Field of Classification Search ............. 369/112.23, 369/121, 120, 109.02, 112.17, 112.11, 103, 369/112.1, 112.13, 112.15, 94; 359/15, 34
See application file for complete search history.

(56) References Cited

U.S. PATENT DOCUMENTS

| | | | | |
|---|---|---|---|---|
| 4,908,813 A | * | 3/1990 | Ojima et al. | 369/94 |
| 4,918,679 A | | 4/1990 | Opheij et al. | |
| 5,136,572 A | * | 8/1992 | Bradley | 369/108 |
| 5,272,550 A | * | 12/1993 | Dickson et al. | 359/3 |
| 6,130,872 A | * | 10/2000 | Sugiura et al. | 369/112.04 |
| 6,151,142 A | * | 11/2000 | Phillips et al. | 359/3 |
| 6,563,779 B1 | * | 5/2003 | McDonald et al. | 369/103 |
| 6,650,612 B1 | | 11/2003 | Matsuzaki et al. | |
| 7,330,420 B2 | | 2/2008 | Kimura et al. | |
| 2005/0157624 A1 | | 7/2005 | Koreeda et al. | |

(Continued)

FOREIGN PATENT DOCUMENTS
EP 1 553 574 A1 7/2005
(Continued)

OTHER PUBLICATIONS
Korean Office Action, Jun. 22, 2009.
(Continued)

*Primary Examiner* — Joseph Haley
*Assistant Examiner* — Nicholas Lee
(74) *Attorney, Agent, or Firm* — Dickstein Shapiro LLP

(57) ABSTRACT

A light source unit comprises a plurality of light sources emitting a plurality of light beams. A plurality of volume hologram elements are provided for the plurality of light sources respectively, each volume hologram element having a plane of incidence of an incoming light beam and a plane of outgoing radiation of a diffracted light beam which are perpendicular to each other, the plurality of volume hologram elements having mutually different Bragg conditions in which an optical intensity of a diffracted light beam is set to a maximum.

13 Claims, 42 Drawing Sheets

U.S. PATENT DOCUMENTS

| | | |
|---|---|---|
| 2005/0169153 A1 | 8/2005 | Ogasawara et al. |
| 2005/0207466 A1* | 9/2005 | Glebov et al. .................. 372/92 |
| 2008/0018969 A1 | 1/2008 | Sakai et al. |

FOREIGN PATENT DOCUMENTS

| | | |
|---|---|---|
| EP | 1 592 000 A2 | 11/2005 |
| JP | 63-113947 | 5/1988 |
| JP | 1-224933 | 9/1989 |
| JP | 2 988732 | 10/1999 |
| JP | 2001-43554 | 2/2001 |
| JP | 2002-140829 | 5/2002 |
| JP | 2005-38513 | 2/2005 |
| JP | 2005-203011 | 7/2005 |
| JP | 2005-203041 | 7/2005 |
| JP | 2006-338782 | 12/2006 |
| KR | 2001-31135 | 4/2001 |
| KR | 10-2004-0010334 | 1/2004 |
| WO | WO 99/24852 | 5/1999 |

OTHER PUBLICATIONS

Lee, et al, "Volume holographic device for the spherical aberration correction and the parallel data access in three-dimensional memory" ISOM2000, Fr-PD-15, pp. 244-245. , Dec. 2000.

* cited by examiner

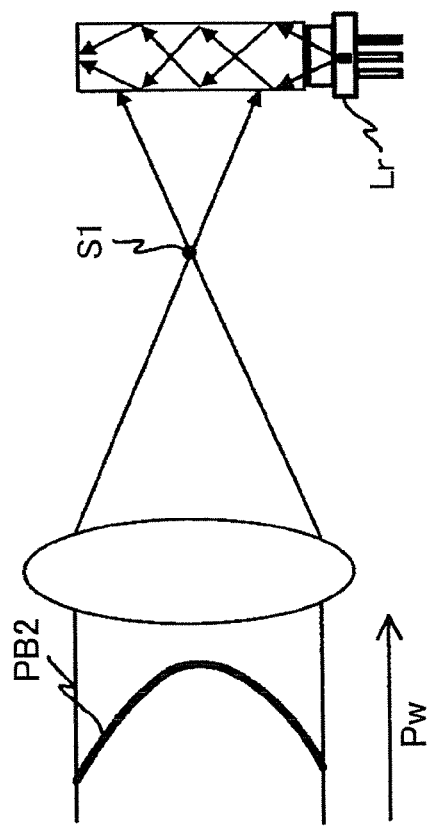
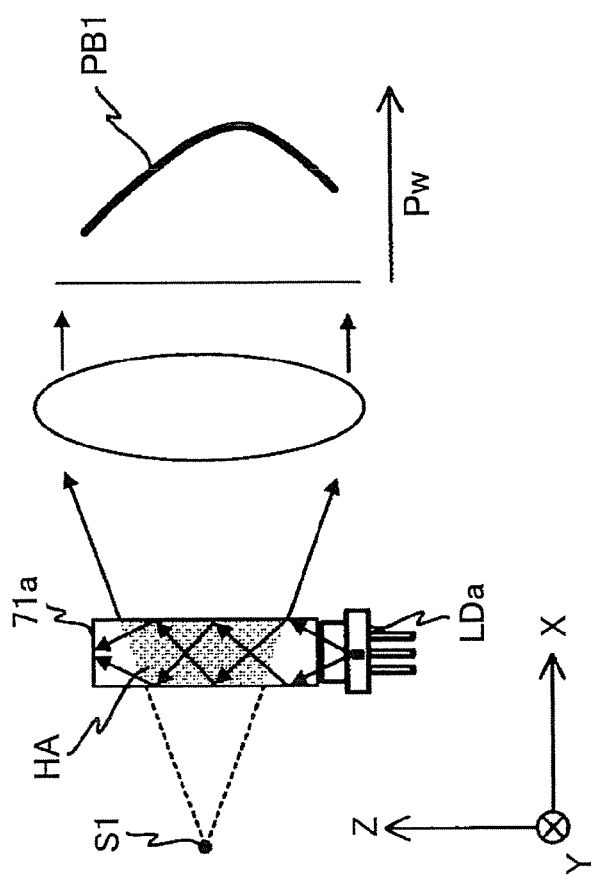

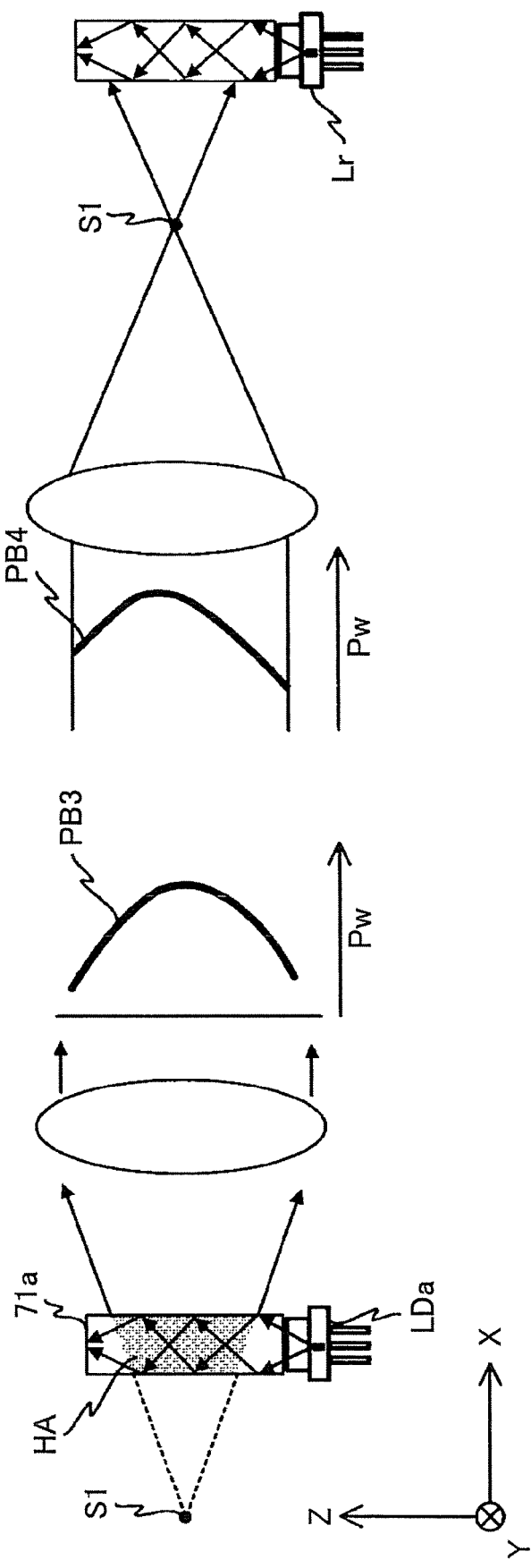

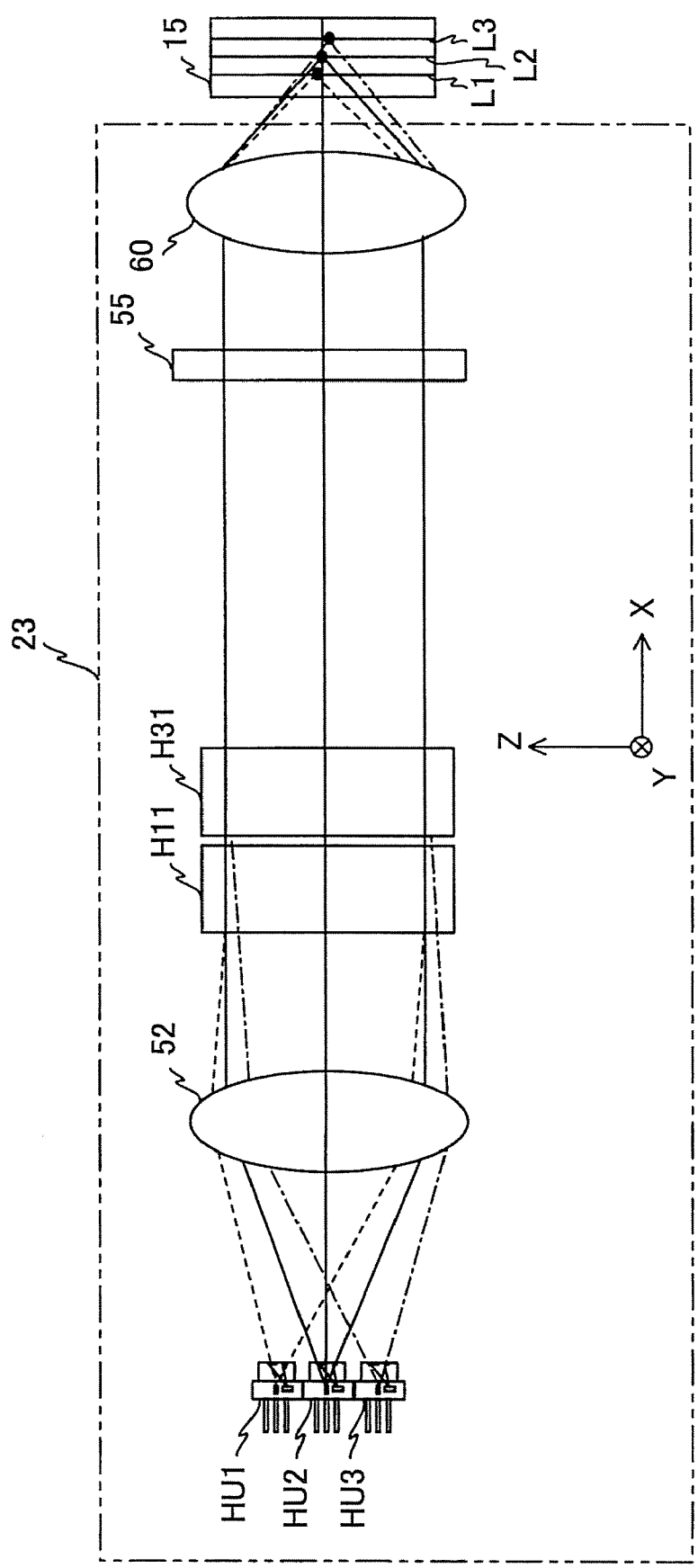

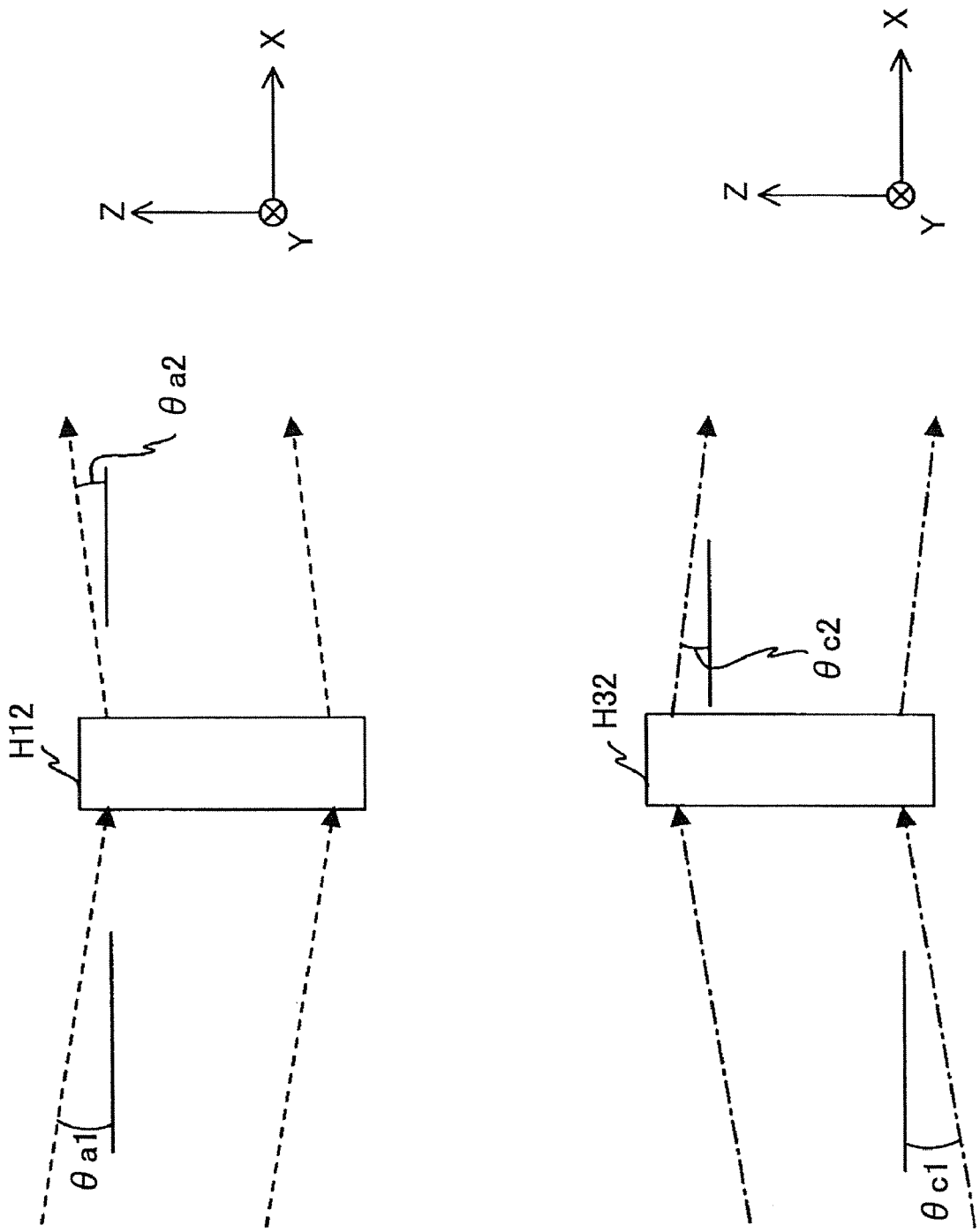

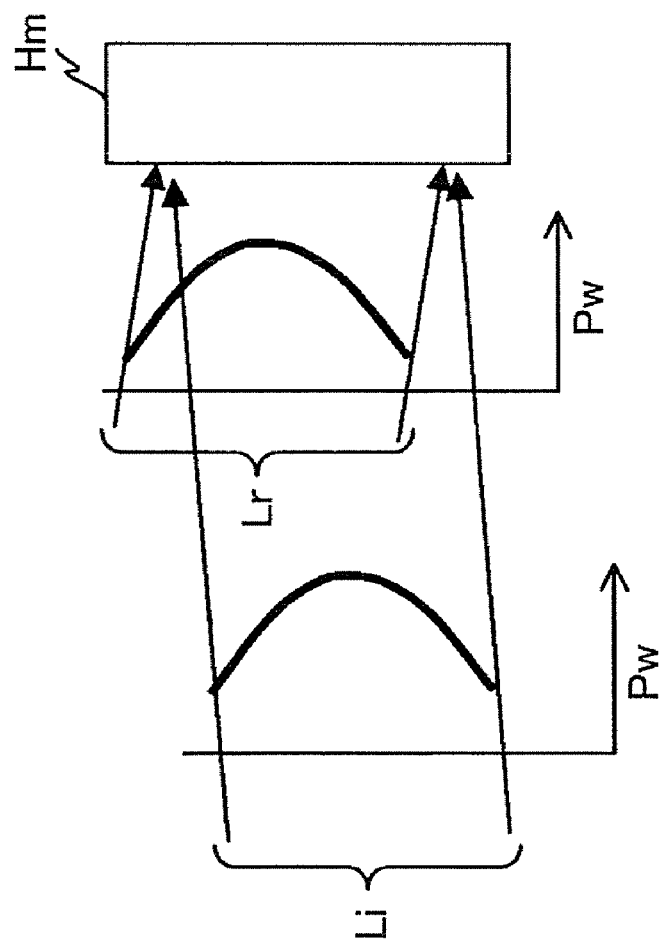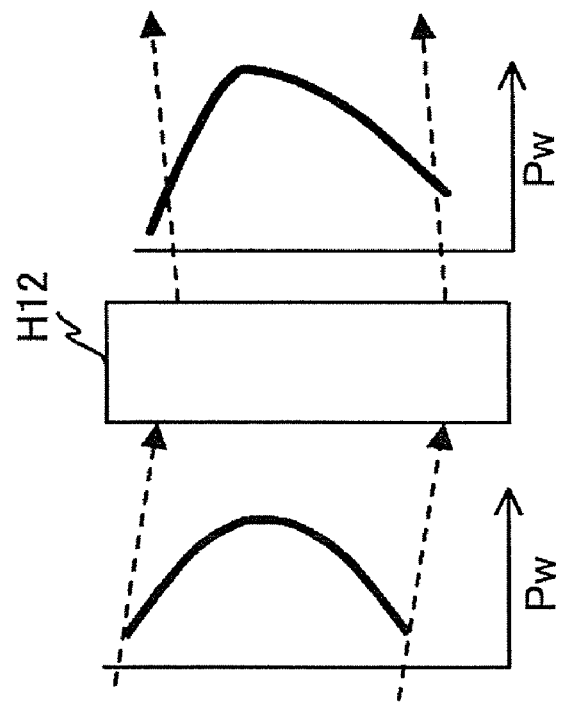

LIGHT SOURCE UNIT, OPTICAL DETECTOR UNIT, OPTICAL PICKUP DEVICE, AND OPTICAL DISK DEVICE

TECHNICAL FIELD

This invention relates to a light source unit which emits light beams simultaneously, an optical detector unit which detects light beams individually, and an optical pickup device in which light beams are emitted to recording layers of an optical disk and the reflected light beams are received from the optical disk, and an optical disk device in which the optical pickup device is provided.

BACKGROUND ART

In recent years, with progress of digital technology and improvement in data compression technology, information recording media for recording computer programs, music information, video information (contents), etc., which include optical disks, such as CD (compact disk) and DVD (digital versatile disk), have come to attract attention. And inexpensive optical disk devices for performing recording of information to the optical disk and reproducing of information from the optical disk have come to spread. CD-RW (CD-rewritable), DVD-RAM, DVD-RW (DVD-rewritable), DVD+RW (DVD+rewritable), etc are currently marketed as rewritable optical disks.

In an optical disk device, a small spot of a laser beam is formed on a recording layer of an optical disk in which the track is formed in a spiral shape or in the shape of a concentric circle, to recording information to the disk, and reproduction of information from the disk is performed based on the reflected light from the recording layer.

Meanwhile, the amount of information of video information or contents tends to increase year by year, and it is expected that the amount of information that is recordable on a single optical disk, i.e., the storage capacity, will further increase. For example, the Blu-ray standard is proposed as a method for increasing the storage capacity of an optical disk such that the recording density thereof is higher than that of the currently marketed DVD.

In the case of the optical disk in conformity with the Blu-ray standard (which will be called the BD disk), the thickness of the substrate is equal to about 0.1 mm, and the optical disk device corresponding to the BD disk uses a light source whose wavelength is equal to 405 nm, forms a focusing light spot with NA of 0.85 by using an objective lens, and performs recording, reproduction and erasing of information for the BD disk. That is, the DVD and the BD disk have mutually different light source wavelengths, substrate thicknesses, and NA values.

For this reason, there is a problem in that, in the optical disk device adapted to access both the DVD and the BD disk and having a single objective lens, if the characteristics of the objective lens are made to suit one of the DVD and the BD disk, the aberration will occur for the other recording medium due to the difference in the substrate thickness between the DVD and the BD disk.

Another method for increasing the storage capacity of an optical disk is to use an optical disk having a plurality of recording layers (called the multi-layered disk). Development of an optical element corresponding to the multi-layered disk and an optical disk device adapted to access the multi-layered disk is performed energetically. For example, refer to Japanese Laid-Open Patent Application No. 63-113947, Japanese Patent No. 2988732, and the literature entitled "Volume holographic device for the spherical aberration correction and the parallel data access in three-dimensional memory" Fr-PD-15 ISOM2000, Lee S. C. and Y. Kawata.

However, according to the optical element disclosed in Japanese Laid-Open Patent Application No. 63-113947, to make the number of the recording layers of the optical disk into several ten layers, it is necessary to create the optical disk by using a different recording material for each recording layer, which will make the cost for creating the optical disk too high.

According to the optical disk device disclosed in Japanese Patent No. 2988732, if a plurality of light sources are arranged on the same plane and the light beam from the light source located out of the optical axis is used, the aberration (coma aberration) occurs in the lens system. There is a problem in that it is difficult to obtain the light spot of a diffraction limit on the disk surface. Moreover, the light from the collimating lens is outputted with a certain angle, the quantity of light captured into the objective lens is different for each light source, and there is a problem in that the efficiency for light utilization is reduced significantly.

According to the optical element disclosed in the above-mentioned literature, diffraction efficiency of a volume hologram is reduced as the volume hologram performs multiplex exposure. If the number of spots is increased, the resulting surface power will fall. Moreover, if the light source is arranged on the surface perpendicular to the optical axis, the light from the collimating lens is outputted with a certain angle, and the quantity of light captured into the objective lens and the light quantity distribution are different for every light source. There is a problem in that the reduction of efficiency for light utilization and the asymmetrical spot configuration will occur.

DISCLOSURE OF THE INVENTION

According to one aspect of the invention, there is provided an improved light source unit in which the above-mentioned problems are eliminated.

According to one aspect of the invention, there is provided any of a light source unit, an optical detector unit, an optical pickup device, and an optical disk device which are adapted to attain miniaturization of the device without reducing efficiency for light utilization.

In an embodiment of the invention which solves or reduces one or more of the above-mentioned problems, there is provided a light source unit comprising: a plurality of light sources emitting a plurality of light beams; and a plurality of volume hologram elements provided for the plurality of light sources respectively, each volume hologram element having a plane of incidence of an incoming light beam and a plane of outgoing radiation of a diffracted light beam which are perpendicular to each other, the plurality of volume hologram elements having mutually different Bragg conditions in which an optical intensity of a diffracted light beam is set to a maximum.

In an embodiment of the invention which solves or reduces one or more of the above-mentioned problems, there is provided a light source unit comprising: a plurality of light sources emitting a plurality of light beams; and a plurality of volume hologram elements provided for the plurality of light sources respectively, at least one of the plurality of volume hologram elements provided for at least one of the plurality of light sources and having a plane of incidence of an incoming light beam and a plane of outgoing radiation of a diffracted light beam which are perpendicular to each other.

In an embodiment of the invention which solves or reduces one or more of the above-mentioned problems, there is provided an optical detector unit which detects a plurality of light beams individually, the optical detector unit comprising: a plurality of volume hologram elements provided for the plurality of light beams respectively, each volume hologram element having a plane of incidence of a corresponding light beam and a plane of outgoing radiation of a diffracted light beam which are perpendicular to each other, the plurality of volume hologram elements having mutually different Bragg conditions in which an optical intensity of a diffracted light beam is set to a maximum; and a plurality of photodetectors provided for the plurality of volume hologram elements respectively, each photodetector receiving a diffracted light beam from a corresponding one of the plurality of volume hologram elements.

In an embodiment of the invention which solves or reduces one or more of the above-mentioned problems, there is provided an optical detector unit which detects a plurality of light beams individually, the optical detector unit comprising: a plurality of volume hologram elements provided for the plurality of light beams respectively, at least one of the plurality of volume hologram elements provided to diffract at least one of the plurality of light beams and having a plane of incidence of the at least one of the plurality of light beams and a plane of outgoing radiation of a diffracted light beam which are perpendicular to each other; and a plurality of photodetectors provided for the plurality of volume hologram elements respectively, each photodetector receiving a diffracted light from a corresponding one of the plurality of volume hologram elements.

According to the embodiment of the invention, it is possible to attain miniaturization of the device without reducing efficiency for light utilization.

Other objects, features and advantages of the present invention will be apparent from the following detailed description when reading in conjunction with the accompanying drawings.

BRIEF DESCRIPTION OF THE DRAWINGS

FIG. 13A and FIG. 13B are diagrams for explaining the relation between the information luminous-intensity distribution and the intensity distribution of diffracted light.

FIG. 14A and FIG. 14B are diagrams for explaining the relation between information luminous-intensity distribution and the intensity distribution of diffracted light.

FIG. 26 is a diagram for explaining the optical pickup device in an embodiment of the invention.

FIG. 32A and FIG. 32B are diagrams for explaining operation of each hologram element in FIG. 29.

FIG. 33A and FIG. 33B are diagrams for explaining the relation between information luminous-intensity distribution and the intensity distribution of diffracted light.

BEST MODE FOR CARRYING OUT THE INVENTION

A description will now be given of an embodiment of the invention with reference to the accompanying drawings.

Figure 1:
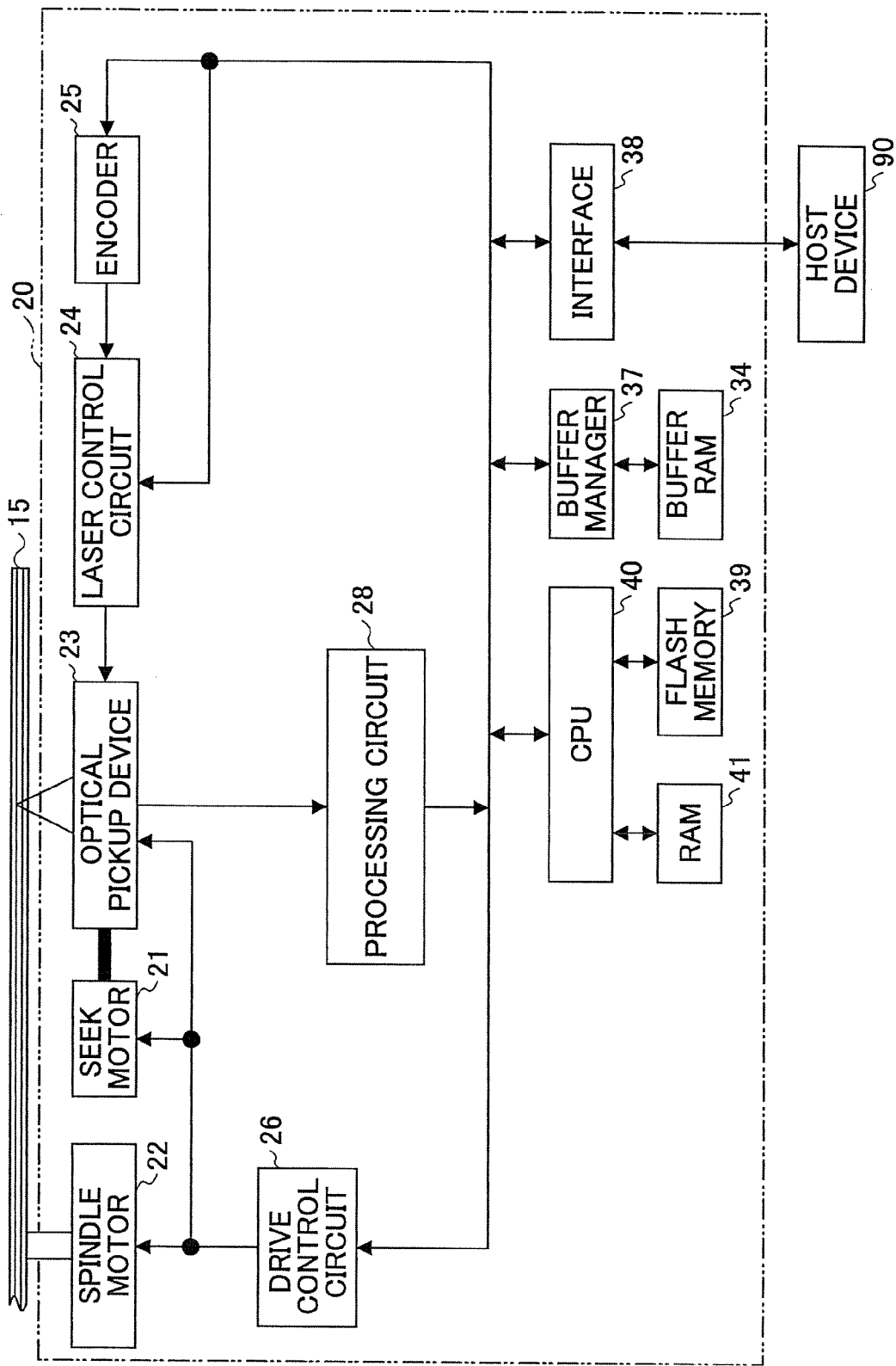
FIG. 1 is a block diagram showing the composition of an optical disk device in an embodiment of the invention.

FIG. 1 shows the composition of an optical disk device 20 in an embodiment of the invention. As shown in FIG. 1, the optical disk device 20 comprises a spindle motor 22 for rotating an optical disk 15, an optical pickup unit 23, a seek motor 21 for driving the optical pickup unit 23 in a radial direction of the disk 15, a laser control circuit 24, an encoder 25, a drive control circuit 26, a signal processing circuit 28, a buffer RAM 34, a buffer manager 37, an interface 38, a flash memory 39, a CPU 40, and a RAM 41.

In FIG. 1, the arrow merely indicates the flow of a typical signal or typical information, and it does not indicate the physical connection between respective elements of the optical disk device. In this embodiment, the optical disk device 20 is adapted to recording information in a one-side multi-layered optical disk which has a plurality of rewritable recording layers on the one-side surface of the disk.

Figure 2:
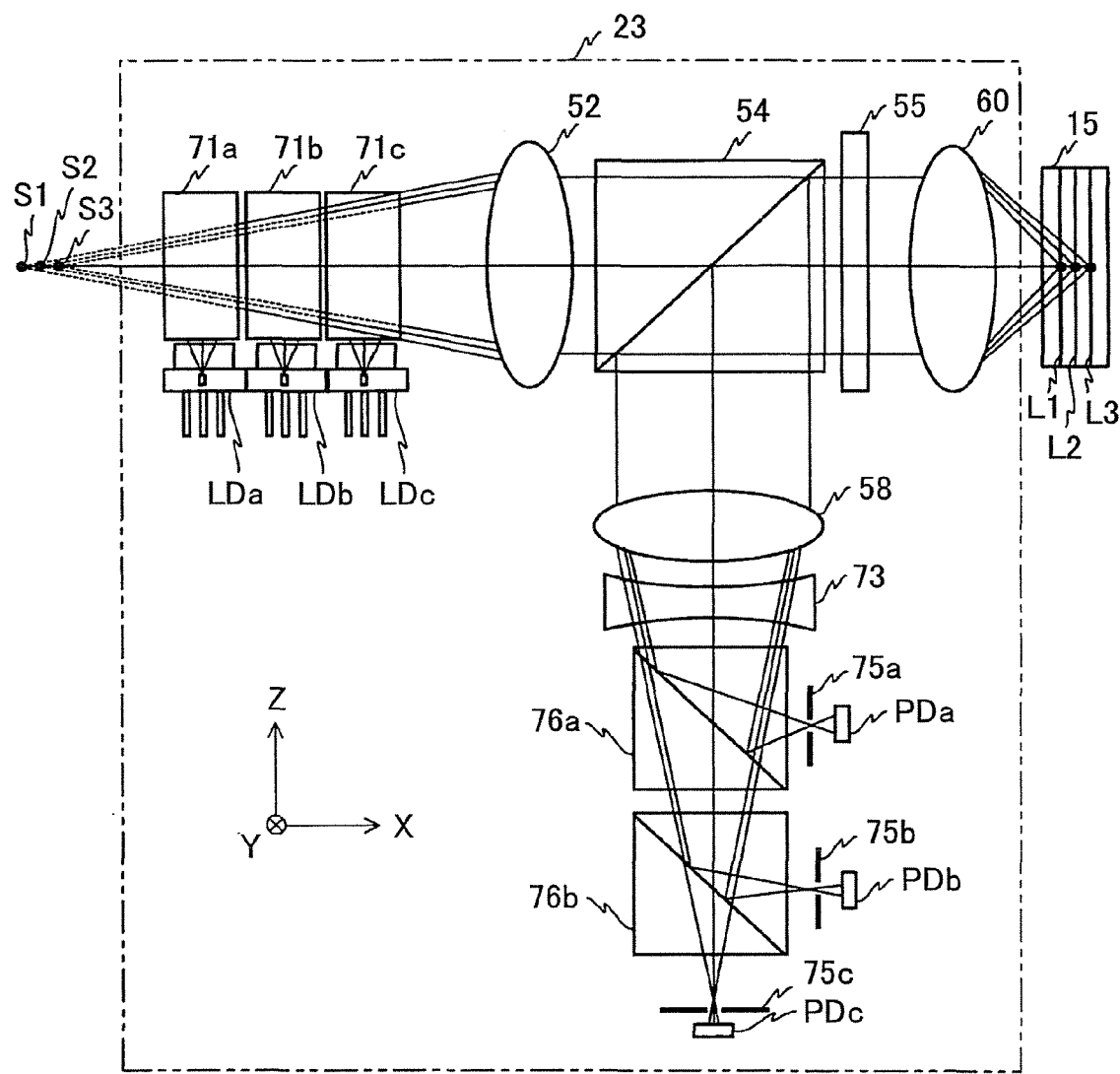
FIG. 2 is a diagram for explaining the optical pickup device in FIG. 1.

FIG. 2 shows the structure of the optical disk in the optical disk device of FIG. 1. As shown in FIG. 2, the optical disk 15 is a one-side three-layered optical disk, and it has a 1st recording layer (L1), a 2nd recording layer (L2), and a 3rd recording layer (L3) sequentially from the incidence side of a laser beam. The optical disk 15 is typically an information recording medium, such as a DVD.

The optical pickup device 23 is adapted to emit the laser light to the three recording layers of the optical disk 15 simultaneously and receive the reflected light beams from the three recording layers simultaneously.

As shown in FIG. 2, the optical pickup device 23 in this embodiment comprises three light sources (LDa, LDb, LDc), three hologram elements (71a, 71b, 71c), a collimating lens 52, a polarization beam splitter 54, a quarter wave plate 55, an objective lens 60, a detection lens 58, a cylinder lens 73, two half prisms (76a, 76b), three pinholes (75a, 75b, 75c), three photodetectors (PDa, PDb, PDc), and a drive system (which is not illustrated) for driving the objective lens 60.

Each light source has a semiconductor laser which emits a laser beam whose wavelength is equal to 660 nm, and each light source has equivalent luminescence characteristics.

In this embodiment, all of the maximum intensity outgoing radiation the instructions of the laser beams emitted from the respective light sources are set to the direction of +Z. The light source LDb is arranged adjacent to the +X side of light source LDa, and the light source LDc is arranged adjacent to the +X side of light source LDb. The polarized light beam (P polarization) parallel to the plane of incidence of polarization beam splitter 54 is emitted from each light source.

All the hologram elements are volume hologram elements. The volume hologram element means a hologram element in which the value of parameter Q (Q value) computed in accordance with the following formula (1) is larger than 10, according to "Light wave electron optics" from Corona Publishing Co., Ltd., pages 117-132 page, by Jiro Koyama and Hiroshi Nishihara.

$$Q = 2\pi\lambda_0 T / (n_0 \Pi^2) \quad (1)$$

where $\lambda_0$ denotes the wavelength of incident light (inside of the air: 660 nm), T denotes the thickness of the hologram element, $n_0$ denotes the refractive index of the hologram element substrate, and $\Pi$ denotes the pitch (hologram pitch) of pattern grooves.

It is known that a volume hologram element diffracts only the light whose wavelength and whose incident angle satisfy specific diffraction conditions (what is called Bragg conditions).

Figure 3:
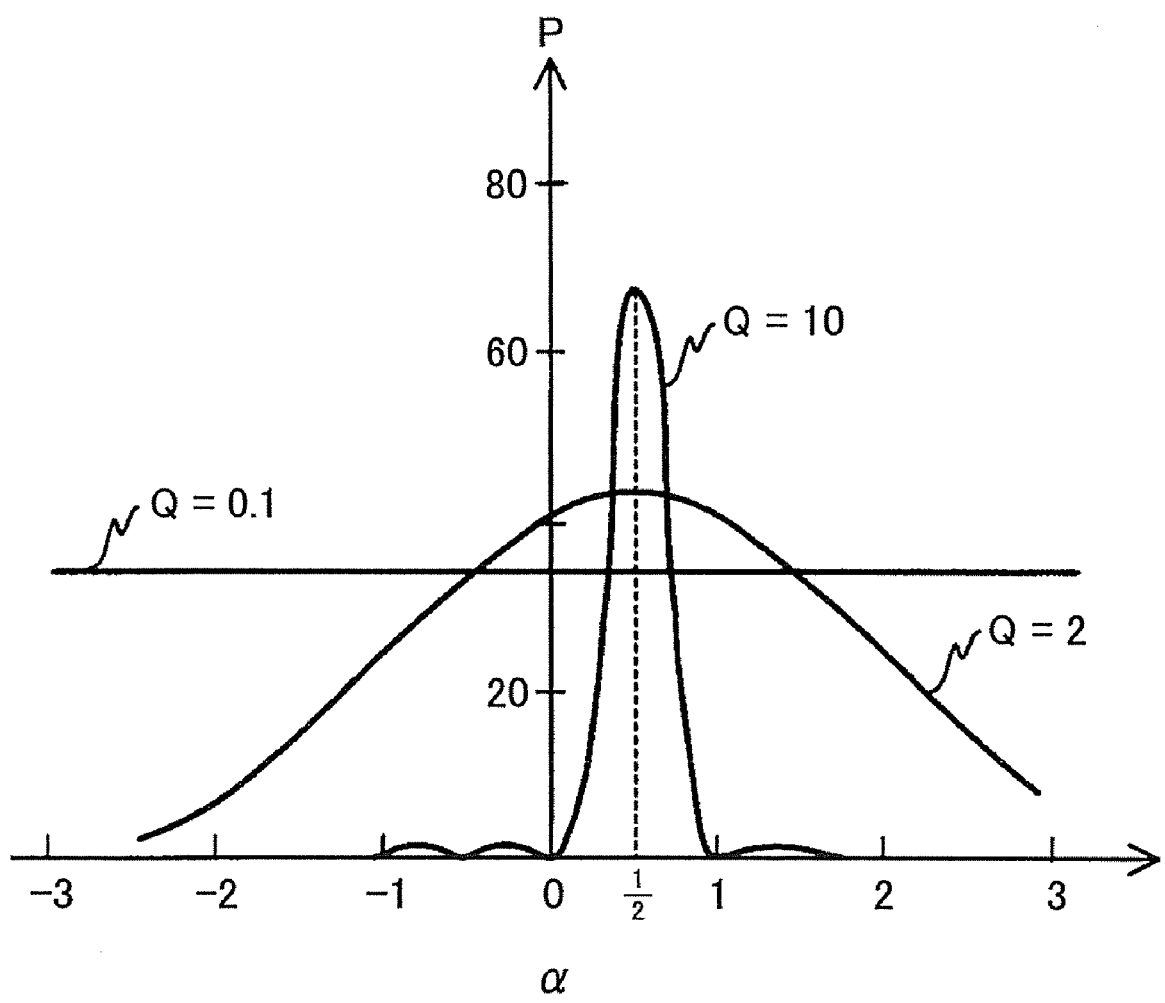
FIG. 3 is a diagram for explaining the characteristic of a volume hologram element.

FIG. 3 is a diagram for explaining the characteristic of a volume hologram element. As shown in FIG. 3, when Q=10, the primary diffraction efficiency P (%) has a peak value if the incident angle satisfies the Bragg conditions. In FIG. 3, $\alpha$ is defined by the formula: $\alpha = -\sin$ (the incident angle)/2 sin (Bragg angle).

A thermoplastic is used for the material of each hologram element, and it is set up such that T=2 mm, $n_0$=1.5, and $\Pi=0.7 \times \lambda_0/n_0$. If these values are applied to the above-mentioned formula (1), the Q value in this case is set to Q≈5800. The conditions for a volume hologram element are fully satisfied.

If a material like photo-polymer (which is not easy to make the thickness large) is used for the material of each hologram element, it is preferred that the layer of that material is sandwiched between two sheets of glass, in order to ensure that it has a sufficiently large thickness. The thickness T of the material layer which satisfies Q>10 at this time is set to 4 micrometers or more. As for each hologram element, the whole area is set to a hologram area. The Bragg conditions of the respective hologram elements are different from each other.

Figure 4A:
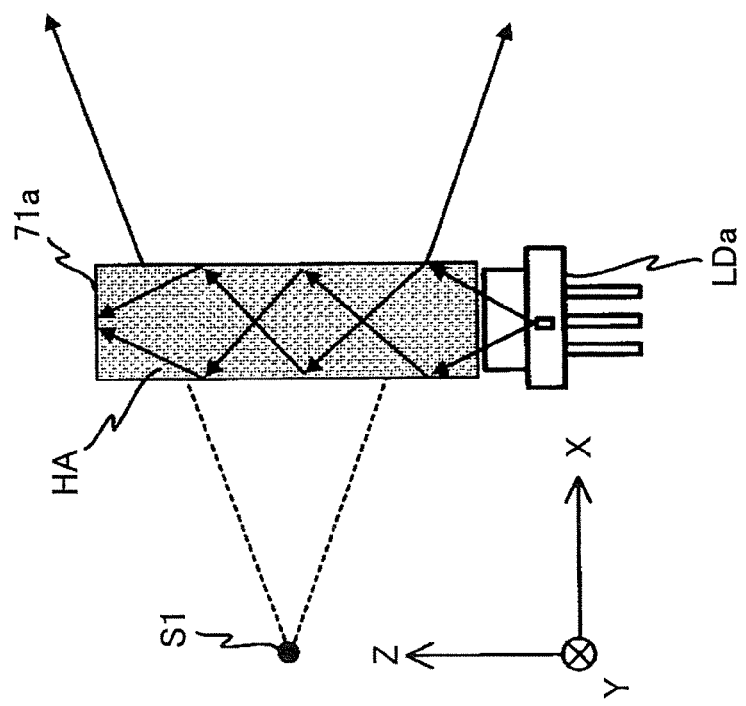
FIG. 4A and FIG. 4B are diagrams for explaining operation of the hologram element in FIG. 2.

The hologram element 71a is arranged on the +Z side of light source LDa, and the light from light source LDa enters the hologram element 71a. As shown in FIG. 4A, the light from light source LDa is repeatedly diffracted in the hologram area HA of hologram element 71a, and is reflected on the border plane repeatedly. And the diffracted light is emitted in the direction of +X from hologram element 71a. The diffracted light from hologram element 71a is a diverging light which is equivalent to the light emitted from a virtual emission point S1 located on the optical axis of collimating lens 52 and located on the −X side apart from the focal position of collimating lens 52. Although the diffracted light from hologram element 71a enters into hologram element 71b and hologram element 71c, it penetrates them without change because the Bragg conditions are not satisfied.

Figure 5:
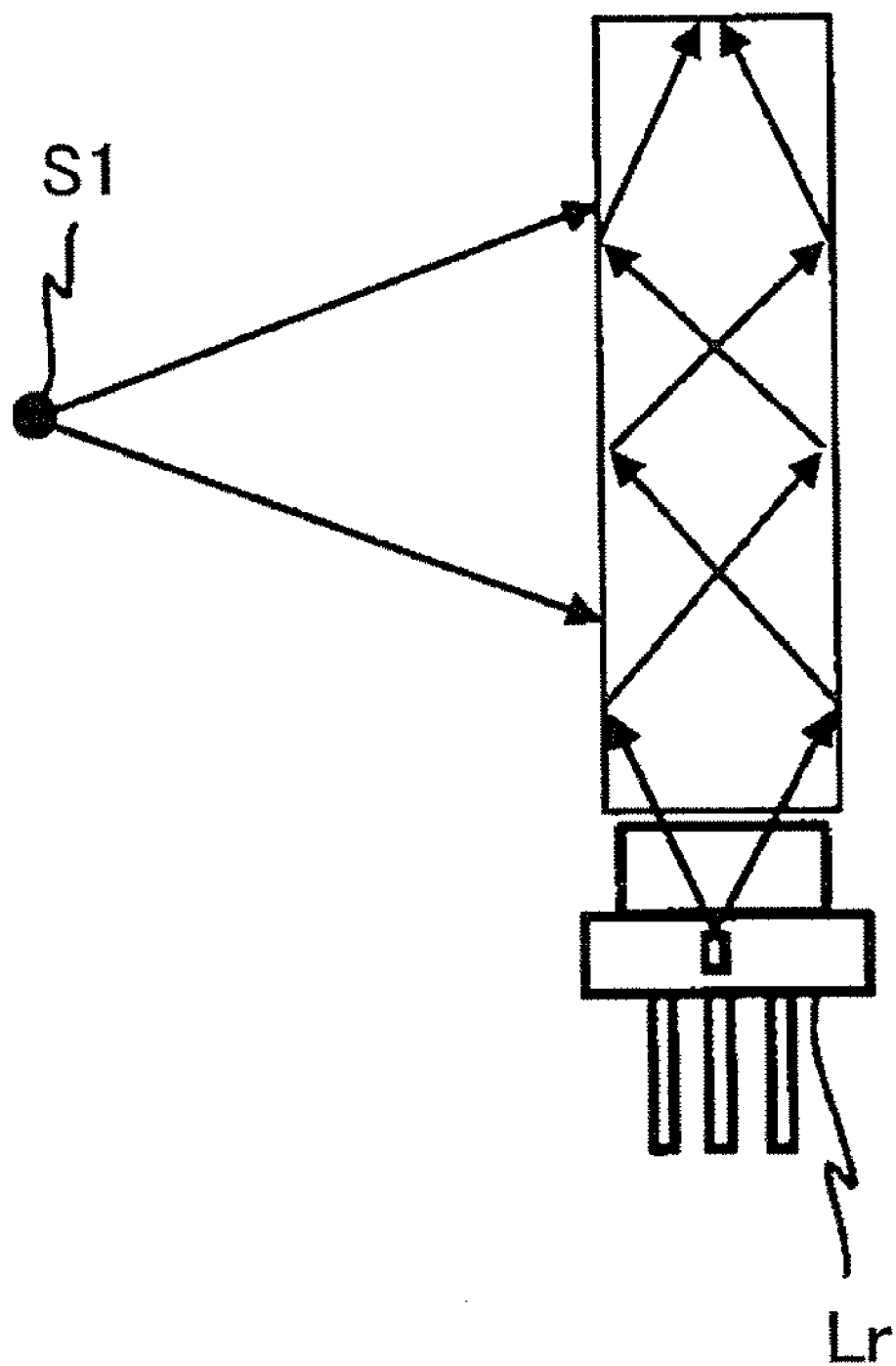
FIG. 5 is a diagram for explaining the method of creating the hologram element in FIG. 2.

This hologram element 71a is created by using the known 2-light interference method, as shown in FIG. 5. For example, the reference light from the reference light source Lr (which is equivalent to the light source LDa) enters into the hologram element (in which the hologram pattern is not formed yet) from the undersurface of the figure, and the information light which has the light emission point S1 enters into the hologram element from the left-hand side of the figure. Thereby, the hologram pattern is formed in the inside of the hologram element. In this manner, the hologram element 71a in which the hologram pattern is formed is created.

Referring back to FIG. 2, the hologram element 71b is arranged on the +Z side of light source LDb, and the light from light source LDb enters the hologram element 71b. The light from light source LDb is repeatedly diffracted in the hologram area of hologram element 71b, and is reflected on the border plane repeatedly. And the diffracted light is emitted in the direction of +X from hologram element 71b. The diffracted light from hologram element 71b is a diverging light which is equivalent to the light emitted from a virtual emission point S2 which is located on the focal position of collimating lens 52. Although the diffracted light from hologram element 71b enters into hologram element 71c, it penetrates the hologram element 71c without change because the Bragg conditions are not satisfied.

The hologram element 71c is arranged on the +Z side of light source LDc, and the light from light source LDc enters the hologram element 71c. The light from light source LDc is repeatedly diffracted in the hologram area of hologram element 71c, and is reflected on the border plane repeatedly. And the diffracted light is emitted in the direction of +X from hologram element 71c. The diffracted light from hologram element 71c is a diverging light which is equivalent to the light emitted from a virtual emission point S3 located on the +X side emitting apart from the above virtual emission point S2.

Figure 4B:
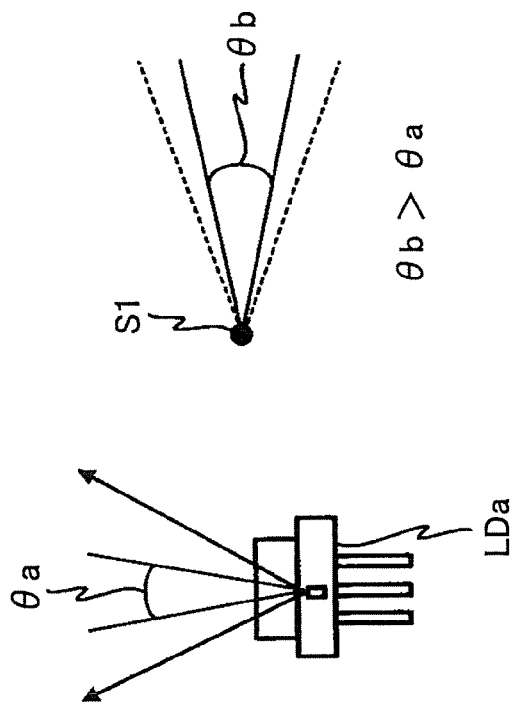

Namely, the respective hologram elements have mutually different Bragg conditions in which the optical intensity of the diffracted light is set to the maximum. And as shown in FIG. 4B, the diffracted light emitted from the hologram element has the intensity distribution which is symmetrical with respect to the optical axis of the hologram element, and the half-width angle θb of the intensity distribution is larger than the half-width angle θa of the incident light.

The hologram element 71b and the hologram element 71c are created in a manner similar to the above-mentioned hologram element 71a.

The distance between the respective virtual emission points is determined based on the optical magnification determined from the collimating lens 52 and the objective lens 66 and the distance between the respective recording layers of the optical disk 15.

Since the virtual emission points are set up to be located at the positions which are separated by the determined distance on the optical axis of the collimating lens 52, the spherical aberration by the difference in the position of each recording layer to the objective lens 60 is corrected. That is, each hologram element has a function which corrects the aberration resulting from the difference in the position of the recording layer to the objective lens 60.

Moreover, by adding the aberration for correcting high order spherical aberration to the hologram element at the time of its preparation, and by adding the aberration for correcting the aberration (mainly coma aberration) which occurs due to the shifting in the track servo operation of the objective lens 60, it is possible to correct high order spherical aberration and coma aberration.

The collimating lens 52 is arranged on the +X side of hologram element 71c. The diffracted light from hologram element 71a is converted into a slightly converging light after penetrating the collimating lens 52. The diffracted light from hologram element 71b is converted into a parallel beam after penetrating the collimating lens 52. The diffracted light from hologram element 71c is converted into a slightly diverging light after penetrating collimating lens 52.

The polarization beam splitter 54 is arranged on the +X side of collimating lens 52. The reflection factor of this polarization beam splitter 54 differs according to the polarization state of the entering light. For example, the polarization beam splitter 54 is provided so that it has a small reflection factor to P polarization and has a large reflection factor to S polarization. Therefore, the most part of light from collimating lens 52 can penetrate polarization beam splitter 54.

The quarter wave plate 55 is arranged on the +X side of polarization beam splitter 54, and gives an optical phase difference of ¼ wavelength to the entering light. On the +X side of this quarter wave plate 55, the objective lens 60 is arranged so that the light penetrating the quarter wave plate 55 is focused.

The light from light source LDa is focused on the 1st recording layer L1, the light from light source LDb is focused on the 2nd recording layer L2, and the light from light source LDc is focused on the 3rd recording layer L3. That is, if each light source is made to emit light simultaneously, a light spot can be simultaneously formed on each recording layer.

The detection lens 58 is arranged on the −Z side of polarization beam splitter 54, and converts into a converging light beam the returned light reflected in the direction of −Z by the polarization beam splitter 54.

The cylinder lens 73 is arranged on the −Z side of detection lens 58, and gives astigmatism to the light from the detection lens 58.

The half prism 76a is arranged on the −Z side of cylinder lens 73, reflects the returned light component from the 3rd recording layer L3 contained in the light from cylinder lens 73 in the direction of +X, and makes the remaining light component penetrate the half prism 76a.

The half prism 76b is arranged on the −Z side of half prism 76a, reflects the returned light component from the 2nd recording layer L2 contained in the light penetrating the half prism 76a in the direction of +X, and makes the remaining light component penetrate the half prism 76b.

The pinhole 75a is arranged on the +X side of half prism 76a, and the light reflected by half prism 76a enters the pinhole 75a. The light passing through this pinhole 75a is received by the photodetector PDa. Therefore, the light received by the photodetector PDa is mainly the returned light from the 3rd recording layer L3.

The pinhole 75b is arranged on the +X side of half prism 76b, and the light reflected by half prism 76b enters the pinhole 75b. The light passing through this pinhole 75b is received by the photodetector PDb. Therefore, the light received by the photodetector PDb is mainly the returned light from the 2nd recording layer L2.

The pinhole 75c is arranged on the −Z side of half prism 76b, and the light penetrating the half prism 76a enters the pinhole 75c. The light passing through this pinhole 75c is received by the photodetector PDc. Therefore, the light received by the photodetector PDc is mainly the returned light from the 1st recording layer L1.

The drive system comprises a focusing actuator for actuating a very small movement of the objective lens 60 in the focusing direction which is an optical axis direction of objective lens 60, and a tracking actuator for actuating a very small movement of the objective lens 60 in the tracking direction which is perpendicular to the tangential direction of the track in the disk.

Next, operation of the optical pickup device 23 mentioned above will be explained briefly.

The light of the plane polarization (P polarization) emitted from light source LDa is diffracted in the direction of +X by hologram element 71a, and enters into polarization beam splitter 54 in the state of a slightly converging light beam through hologram element 71b, hologram element 71c, and collimating lens 52.

The light of the plane polarization (P polarization) emitted from light source LDb is diffracted in the direction of +X by hologram element 71b, and enters into polarization beam splitter 54 in the state of a generally parallel line beam through hologram element 71c and collimating lens 52.

The light of the plane polarization (P polarization) emitted from light source LDc is diffracted in the direction of +X by hologram element 71c, and enters into polarization beam splitter 54 in the state of a slightly diverging light beam through collimating lens 52.

The greater part of each diffracted light penetrates polarization beam splitter 54 without change, and it is converted into the circularly polarized light by the quarter wave plate 55, so that it is focused on each recording layer of optical disk 15 as a small spot through objective lens 60.

The reflected light from each recording layer of optical disk 15 is converted into the circularly polarized light in the opposite polarization direction, and the returned light enters into quarter wave plate 55 through objective lens 60 so that it is converted into the linearly polarized light (S polarization) which is perpendicular to the outward trip. And this returned light enters into polarization beam splitter 54.

The returned light reflected in the direction of −Z enters into half prism 76a through detection lens 58 and cylinder lens 73 by polarization beam splitter 54. It is reflected by half prism 76a, and the returned light component from the 3rd recording layer L3 contained in returned light is received by the photodetector PDa through pinhole 75a.

The returned light penetrating the half prism 76a enters into half prism 76b. It is reflected by half prism 76b, and the returned light component from the 2nd recording layer L2 contained in this returned light is received by the photodetector PDb through pinhole 75b.

The returned light (mainly returned light component from the 1st recording layer L1) penetrating the half prism 76b is received by the photodetector PDc through pinhole 75c. Each pinhole is provided in order to remove the cross talk between the layers.

The respective photodetectors are constituted including a plurality of photodetectors (or a plurality of light receiving areas) which output the signal containing the wobble signal information, the playback data information, the focal error information, the track error information, etc. similar to the known optical disk device.

Each photodetector (or each light receiving area) generates the signal according to light receiving quantity by photoelectric conversion, respectively, and outputs the signal to the playback signal processing circuit 28.

Referring back to FIG. 1, the playback signal processing circuit 28 acquires servo signals (a focus error signal, a track error signal, etc.), address information, synchronization information, an RF signal, etc. based on the output (a plurality of photoelectric conversion signals) of each of the photodetector.

The servo signal acquired is outputted to the drive control circuit 26, the address information is outputted to the CPU 40, and the synchronizing signal is outputted to the encoder 25 and the drive control circuit 26. The playback signal processing circuit 28 performs decoding processing, error detection processing, etc. to the RF signal. When an error is detected, error correction processing is performed and the resulting playback data is stored in the buffer RAM 34 through the buffer manager 37. The address information contained in the playback data is outputted to the CPU 40.

Based on the servo signal from the playback signal processing circuit 28, the drive control circuit 26 generates the driving signal of the drive system, and outputs it to the optical pickup device 23. Thereby, tracking control and focus control are performed.

The drive control circuit 26 generates the driving signal for driving the seek motor 21, and the driving signal for driving the spindle motor 22 based on the instructions of the CPU 40. The driving signals for the motors are outputted to the seek motor 21 and the spindle motor 22.

The data (the recorded data) recorded on optical disk 15, the data (the playback data) reproduced from optical disk 15, etc. are temporarily stored in the buffer RAM 34. The input/output of the data of the buffer RAM 34 is managed by the buffer manager 37.

Based on the instructions of the CPU 40, the encoder 25 acquires the recorded data stored in the buffer RAM 34 through buffer manager 37, performs modulation of data, addition of an error correction code, etc., and generates the write signal to optical disk 15.

The write signal generated is outputted to laser control circuit 24.

The laser control circuit 24 controls the emission power of each of the light sources. For example, in the case of recording, the driving signal of each light source is generated by the laser control circuit 24 based on the write signal, the recording condition, the luminescence characteristics of each light source, etc.

The interface 38 is a bidirectional communication interface to the host device 90 (for example, a personal computer). It is based on standard interfaces, such as ATAPI (AT Attachment Packet Interface), SCSI (Small Computer System Interface), and USB (Universal Serial Bus).

The various programs described in instruction codes that are interpreted by the CPU 40, the luminescence characteristics of each light source, etc. are stored in the flash memory 39.

The CPU 40 controls operation of the respective parts and stores the data required for control into the RAM 41 and the buffer RAM 34 according to the above-mentioned programs stored in the flash memory 39.

Next, a description will be given of recording processing. The recording processing performed by the optical disk device 20 when the recording request of user data is received from the host device 90 will be explained with reference to FIG. 6.

Figure 6:
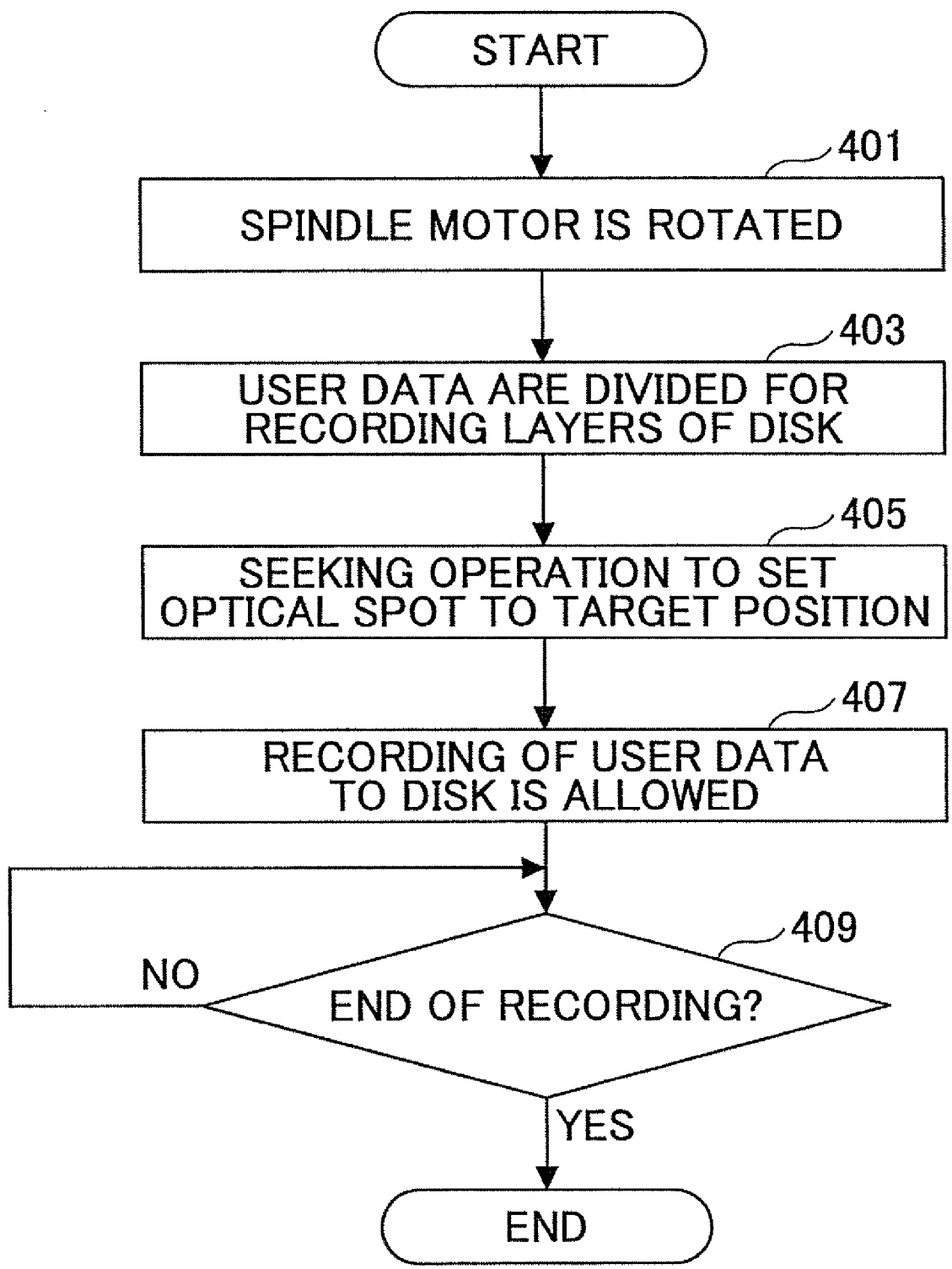
FIG. 6 is a flowchart for explaining processing performed by the optical disk device of FIG. 1 when receiving a recording request from the host device.

The flowchart of FIG. 6 is to explain a series of processing algorithms which are performed by the CPU 40. The user data is recorded on the 1st recording layer L1, the 2nd recording layer L2, and the 3rd recording layer L3.

If a recording request command is received from the host device 90, the start address of the program corresponding to the flowchart of FIG. 6 will be set to the program counter of the CPU 40, and the recording processing will start.

At the first step 401, the request is sent to the drive control circuit 26 so that the optical disk 15 be rotated at a predetermined linear velocity (or angular velocity), and it is notified to the playback signal processing circuit 28 that the recording request command is received from the host device 90.

At the following step 403, the user data (the recorded data) from the host device 90 which is stored in the buffer RAM 34 is divided into the user data recorded on the 1st recording layer L1, the user data recorded on the 2nd recording layer L2, and the user data recorded on the 3rd recording layer L3.

At the following step 405, the request is sent to drive control circuit 26 so that a light spot may be formed near the target position corresponding to the specified address. Thereby, the seek operation is performed. The processing will be skipped if the seek operation is unnecessary.

At the following step 407, the recording is permitted. Thereby, the user data is recorded on each recording layer of optical disk 15 through encoder 25, laser control circuit 24, and optical pickup device 23.

At the following step 409, it is determined whether the recording is completed or not. When it is not completed, the result of determination is negative and the determination is again performed after a predetermined time elapses. When the recording is completed, the result of determination is affirmative and the recording processing is terminated.

The recording in each recording layer is performed simultaneously, and the time for the recording processing can be reduced.

Next, a description will be given of reproduction processing. The reproduction processing performed by the optical disk device 20 when a reproduction request is received from the host device 90 will be explained with reference to FIG. 7.

Figure 7:
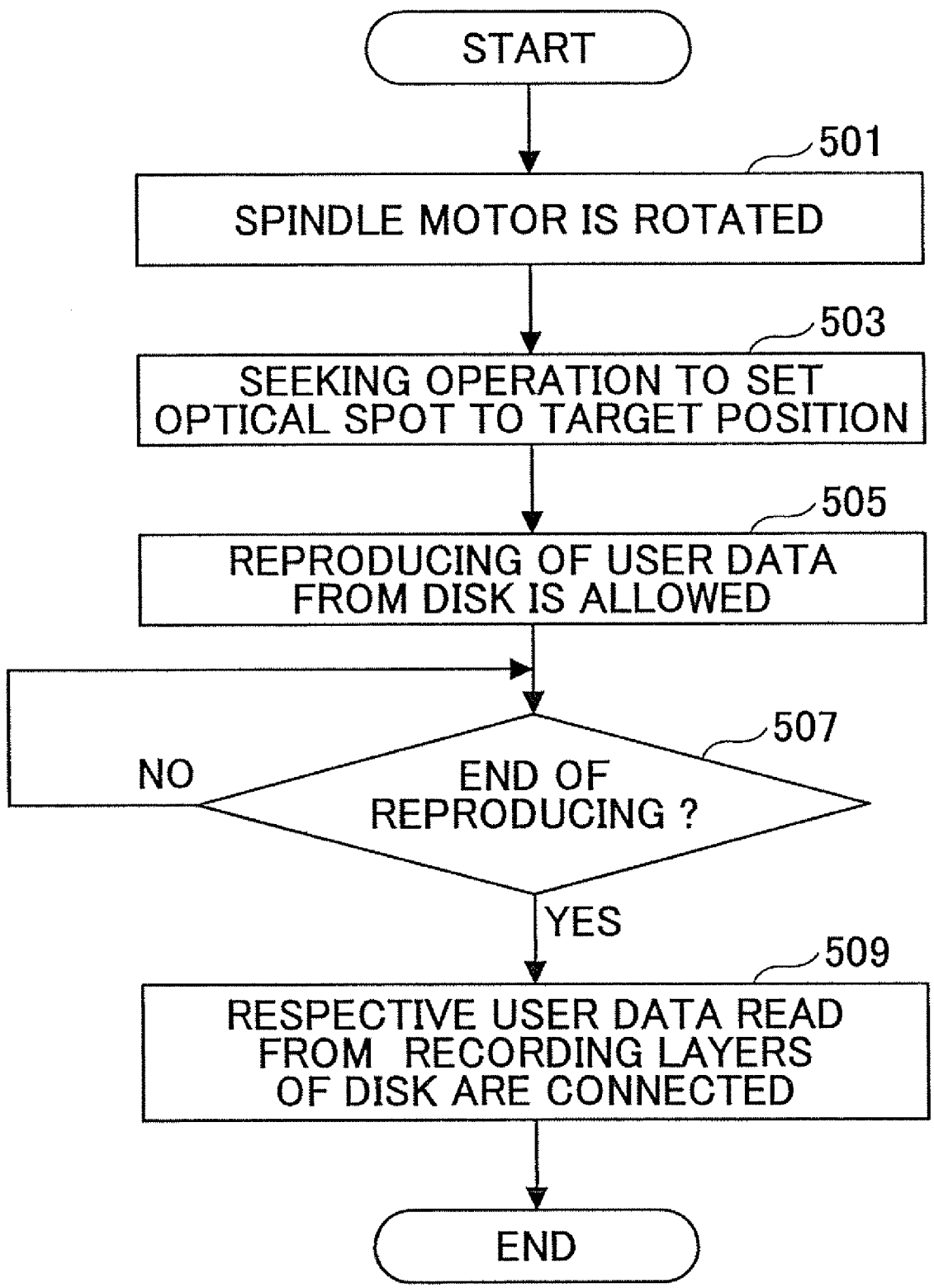
FIG. 7 is a flowchart for explaining processing performed by the optical disk device of FIG. 1 when receiving a reproduction request from the host device.

The flowchart of FIG. 7 is to explain a series of processing algorithms performed by the CPU 40. The reproducing processing is performed sequentially from the 1st recording layer L1, the 2nd recording layer L2, and the 3rd recording layer L3.

If a reproduction request command is received from the host device 90, the start address of the program corresponding to the flowchart of FIG. 7 will be set to the program counter of the CPU 40, and reproduction processing will start.

At the first step 501, while directing that optical disk 15 rotates with predetermined linear velocity (or angular velocity) to drive control circuit 26, it is notified to the playback signal processing circuit 28 that the reproduction request command is received from the host device 90.

At the following step 503, it directs to drive control circuit 26 so that light spot may be formed near the target position corresponding to the specified address. Thereby, the seek operation is performed. The processing will be skipped if the seek operation is unnecessary.

Reproduction is permitted at the following step 505.

Thereby, the data currently recorded on each recording layer of optical disk 15 is reproduced through the optical pickup device 23 and the playback signal processing circuit 28.

At the following step 507, it is determined whether reproduction is completed or not. When it is not completed, the result of determination is negative and the determination is again determined after a predetermined time elapses. When the reproduction processing is completed, the result of determination is affirmative and the control is shifted to step 509.

At the step 509, the playback data from the 1st recording layer L1, the playback data from the 2nd recording layer L2, and the playback data from the 3rd recording layer L3 are connected, and the resulting data are transmitted to the host device 90. And the reproduction processing is ended. The reproduction from each recording layer is performed simultaneously, and the time for the reproduction processing can be reduced.

In the optical disk device 20 of this embodiment, the processing unit is realized by the playback signal processing circuit 28 and the program executed by the CPU 40 and the CPU 40. Some of the processing unit realized according to the program by the CPU 40 may be realized with the hardware. Alternatively, all the processing unit may be realized with the hardware.

The light source unit is realized by the three light sources (LDa, LDb, LDc) and the three hologram elements (71a, 71b, 71c) in the optical pickup device 23 of this embodiment.

As explained above, in the optical pickup device 23 of this embodiment, the hologram element 71a which diffracts the light emitted in the direction of +Z from light source LDa in the direction of +X, the hologram element 71b which diffracts the light emitted in the direction of +Z from light source LDb in the direction of +X, and the hologram element 71c which diffracts the light emitted in the direction of +Z from light source LDc in the direction of +X are arranged on the optical path of the light which is emitted from each light source to the objective lens 60. It is possible to attain miniaturization without causing performance decrement.

It is possible to attain miniaturization without reducing the access accuracy to the optical disk which has a plurality of recording layers, since it has optical pickup device 23 which can attain a miniaturization according to the optical disk device 20 of this embodiment, without causing performance decrement.

According to the optical disk device 20 of this embodiment, since recording in the 1st recording layer L1, recording in the 2nd recording layer L2, and recording in the 3rd recording layer L3 can be performed almost simultaneous, it is possible to perform quickly recording processing to the optical disk which has a plurality of recording layers.

According to the optical disk device 20 of this embodiment, since reproduction from the 1st recording layer L1, reproduction from the 2nd recording layer L2, and reproduction from the 3rd recording layer L3 can be performed almost simultaneously, it is possible to perform quickly reproduction processing to the optical disk which has a plurality of recording layers.

In this embodiment, it is also possible to perform recording and reproduction almost simultaneously. For example, information is renewable from the 2nd recording layer L2, recording the information on the 1st recording layer L1.

Figure 8:
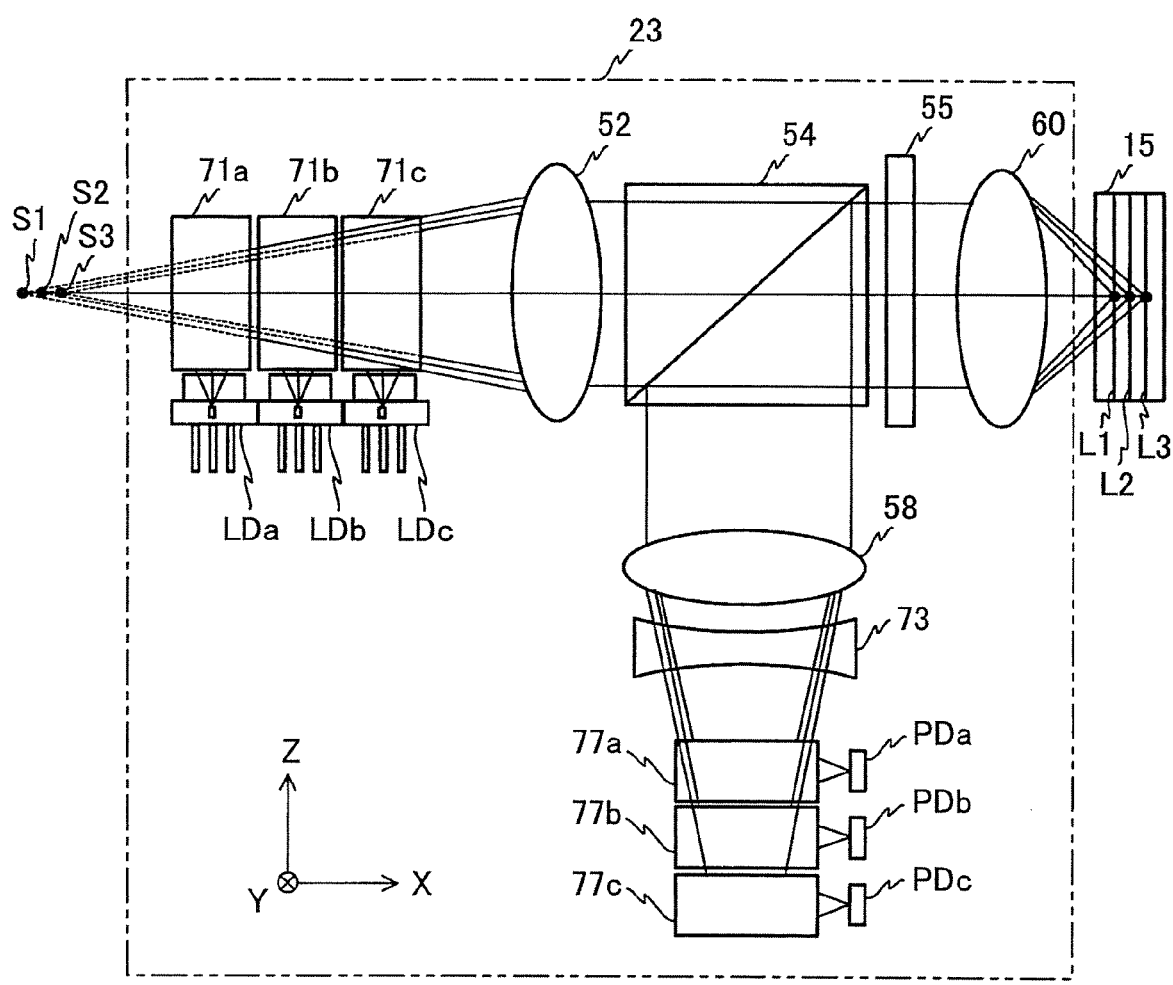
FIG. 8 is a diagram for explaining modification of the optical pickup device in FIG. 1.

In this embodiment, as shown in FIG. 8, it may replace with the half prism 76a, may replace with the half prism 76b using hologram element 77a, and hologram element 77c may be formed in the −Z side of hologram element 77b using hologram element 77b.

The hologram element 77a is a volume hologram element which diffracts the returned light from the 3rd recording layer L3 in the direction of +X. The hologram element 77b is a volume hologram element which diffracts the returned light from the 2nd recording layer L2 in the direction of +X. The hologram element 77c is a volume hologram element which diffracts the returned light from the 1st recording layer L1 in the direction of +X.

The photodetector PDc is arranged on the +X side of hologram element 77c. Namely, the three hologram elements (77a, 77b, 77c) have mutually different Bragg conditions in which the optical intensity of the diffracted light is set to the maximum. The hologram elements (77a, 77b, 77c) have a function which corrects the aberration resulting from the difference in the position of the recording layer to objective lens 60.

In this case, the optical detector unit is realized by the three hologram elements (77a, 77b, 77c) and the three photodetectors (PDa, PDb, PDc). And the respective pinholes are unnecessary.

Figure 9:
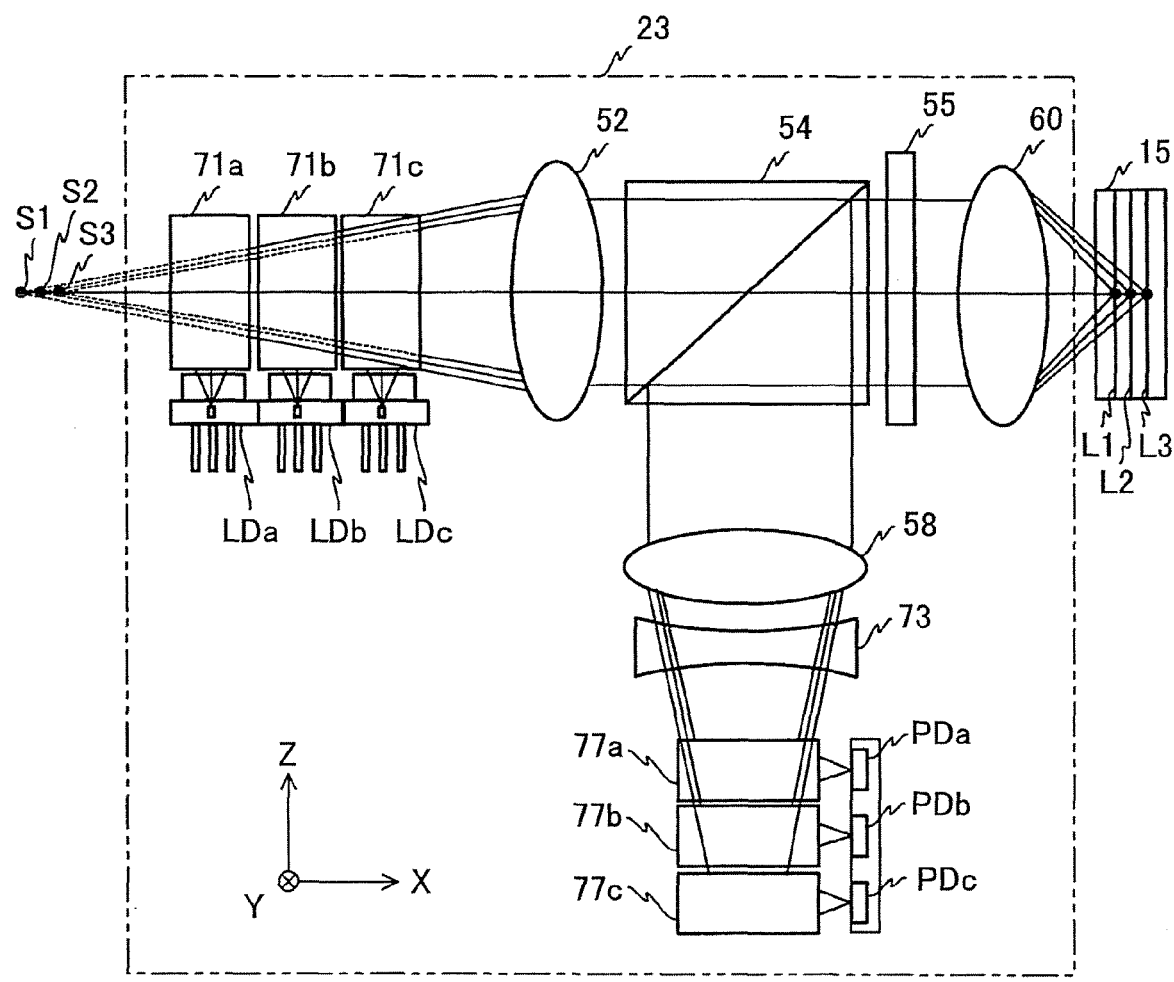
FIG. 9 is a diagram for explaining modification of the optical pickup device in FIG. 1.

In this case, as shown in FIG. 9, the photodetectors in FIG. 8 may be unified. This makes it possible to easily perform positioning in the assembling process.

Figure 10:
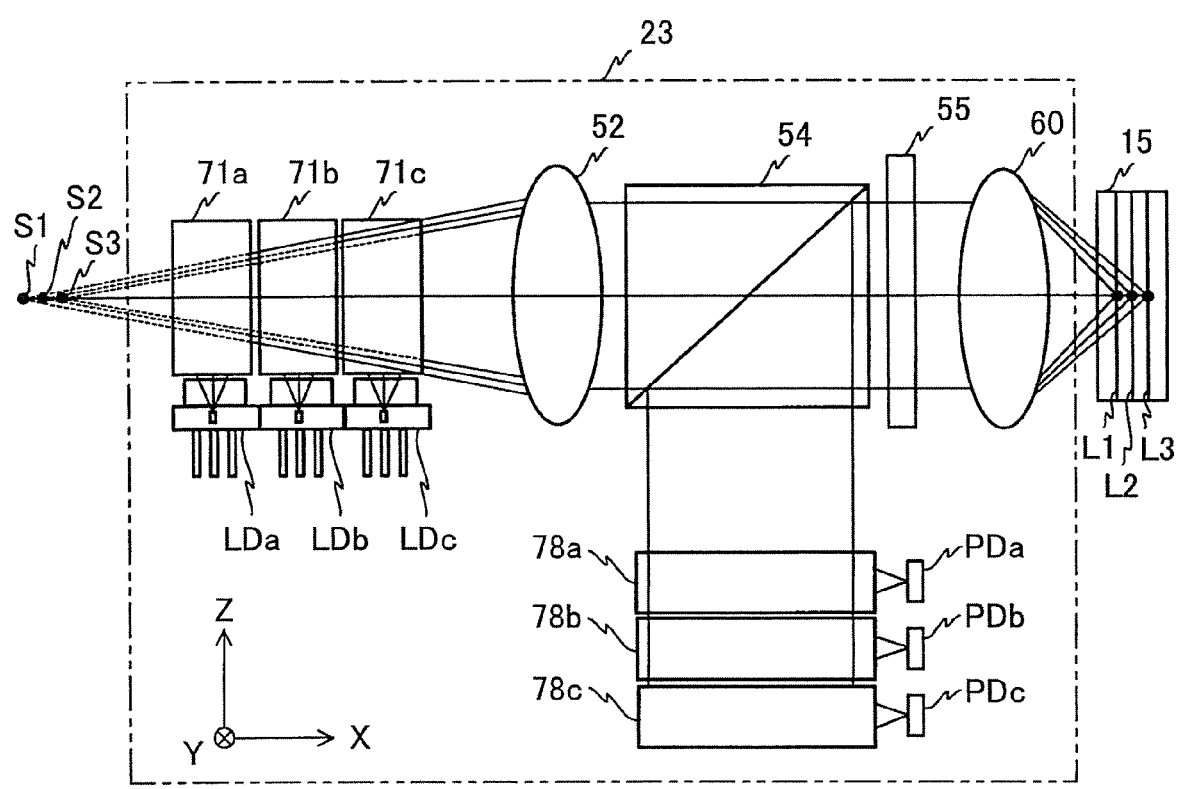
FIG. 10 is a diagram for explaining modification of the optical pickup device in FIG. 1.

As shown in FIG. 10, instead of the above-mentioned hologram element 77a, hologram element 77b and hologram element 77c, the detection lens 58 which changes the degree of divergence of outgoing radiation light to incident light, the cylinder lens 73 which gives astigmatism to incident light, and the hologram element 78a, hologram element 78b, and hologram element 78c to which the equivalent function is added may be used. This makes it possible to exclude the detection lens 58 and the cylinder lens 73, and a further miniaturization can be attained.

In this case, the optical detector unit is realized by the three hologram elements (78a, 78b, 78c) and the three photodetectors (PDa, PDb, PDc).

Although the above embodiment is described with respect to the case where the number of light sources is three, the invention is not limited to this embodiment.

Figure 11:
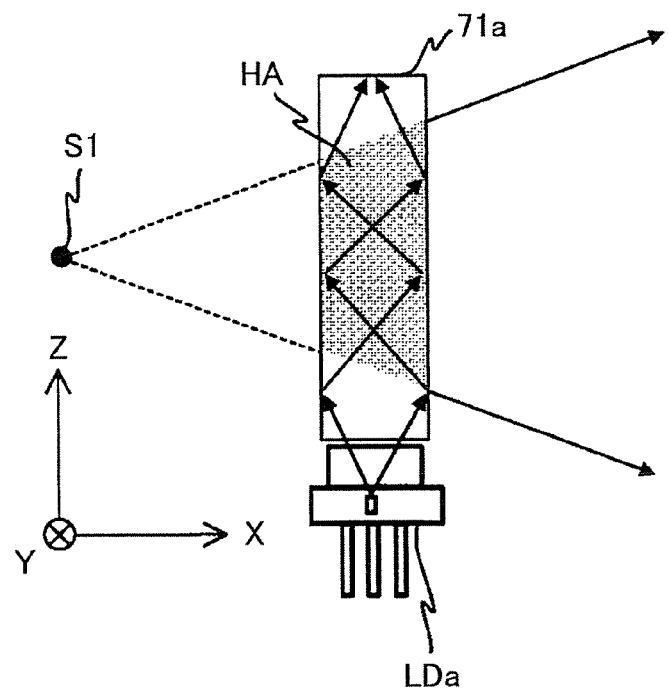
FIG. 11 is a diagram for explaining modification of the hologram element in FIG. 2.

Although the above embodiment will be explained with respect to the case where the whole hologram element serves as the hologram area, it is also possible to use the partial area (for example, the gray portion in FIG. 11) of each hologram element which is set up beforehand as the hologram area HA.

Specifically, in consideration of the shift amount at the time of the tracking of objective lens 60, it is also possible to use the area which is larger than the opening diameter of the objective lens 60 by 0.2-0.4 mm as a hologram area. Thereby, efficiency for light utilization can be raised.

Figure 12:
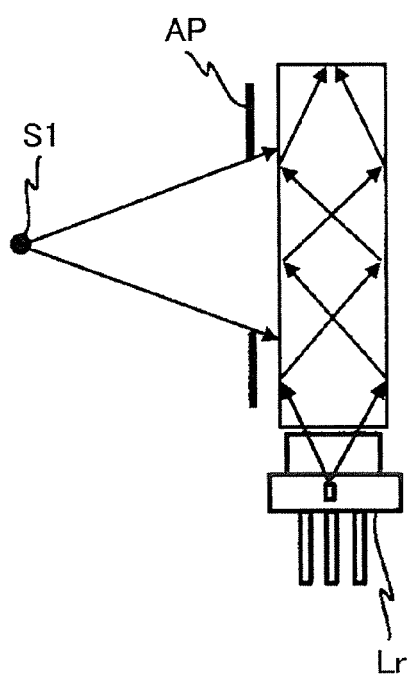
FIG. 12 is a diagram for explaining the method of creating the hologram element of FIG. 11.

In this case, as shown in FIG. 12, when creating the hologram element 71a, the information light which is emitted from the light emission point S1 enters into the hologram element through the aperture AP.

When limiting the hologram area in this way, it is preferred to increase the light exposure of the information light more than at the time of using the whole hologram area.

A beam shaping function can be given to each hologram element. The refractive index change on the side of a light source will become large if a volume hologram element is created with information light having the intensity distribution PB2 (similar to the usual Gaussian distribution) as shown in FIG. 13B. As shown in FIG. 13A, there is a possibility that the intensity distribution PB1 of diffracted light may become the partial Gaussian distribution, may change the form of the light spot formed on the optical disk, and a signal characteristic may deteriorate.

As shown in FIG. 14A, in order to obtain diffracted light having the intensity distribution PB3 (similar to the Gaussian distribution of axial symmetry) as shown in FIG. 14B, it is good to expose with the information light in which the peak intensity position has the intensity distribution PB4 shifted in the direction which separates from light source Lr for reference light.

Figure 15B:
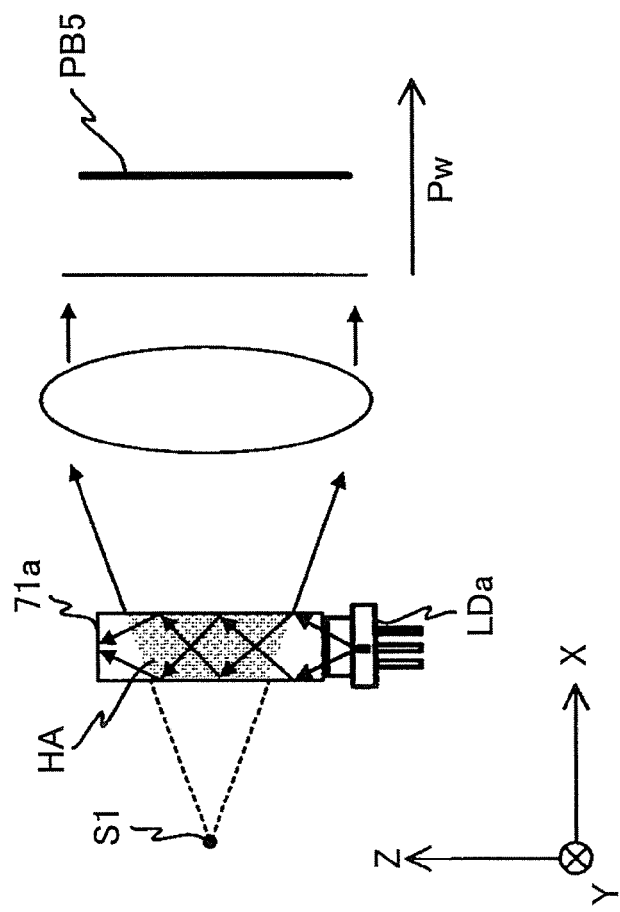
FIG. 15A and FIG. 15B are diagrams for explaining the relation between information luminous-intensity distribution and the intensity distribution of diffracted light.
Figure 15A:
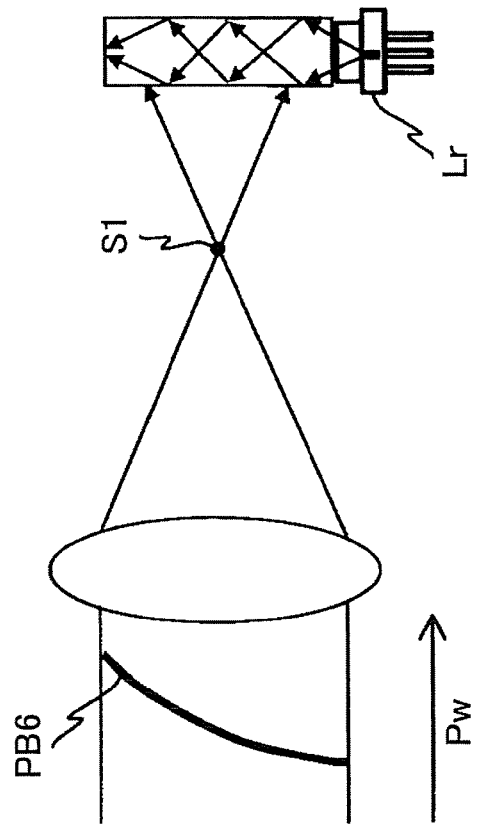

As shown in FIG. 15A, in order to obtain the diffracted light which has uniform intensity distribution PB5, it is good to expose with information light having the intensity distribution PB6 to which intensity becomes large as are shown in FIG. 15B and it separates from light source Lr for reference light. Then, the end intensity (RIM intensity) of diffracted light can be adjusted by adjusting the information luminous-intensity distribution.

Figure 16:
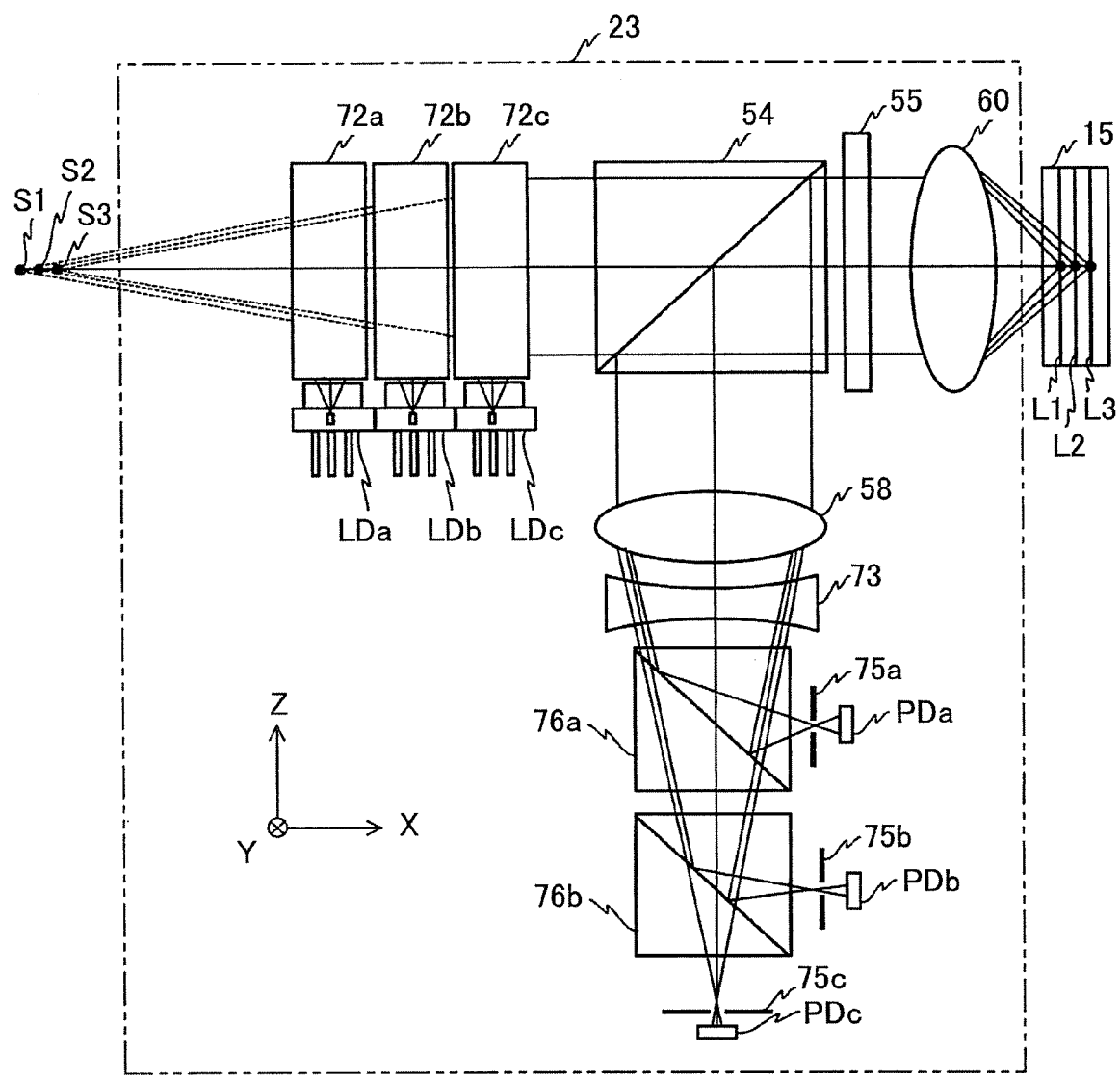
FIG. 16 is a diagram for explaining modification of the optical pickup device in FIG. 1.

In the above embodiment, as shown in FIG. 16, it may replace with the hologram element 71a, hologram element 71b, and hologram element 71c, and the lens function to change the degree of divergence of outgoing radiation light to incident light may use hologram element 72a added further, hologram element 72b, and hologram element 72c. Thereby, the collimating lens 52 can be excluded and the further miniaturization can be attained.

In this case, the light source unit is realized by the three light sources (LDa, LDb, LDc) and the three hologram elements (72a, 72b, 72c).

Next, a description will be given of the optical pickup device in an embodiment of the invention.

This embodiment uses a hologram unit instead of each light source in the previously mentioned embodiment. The composition of the optical disk device except the optical pickup device is the same as that of the previously mentioned embodiment, and a description thereof will be omitted.

Figure 17:
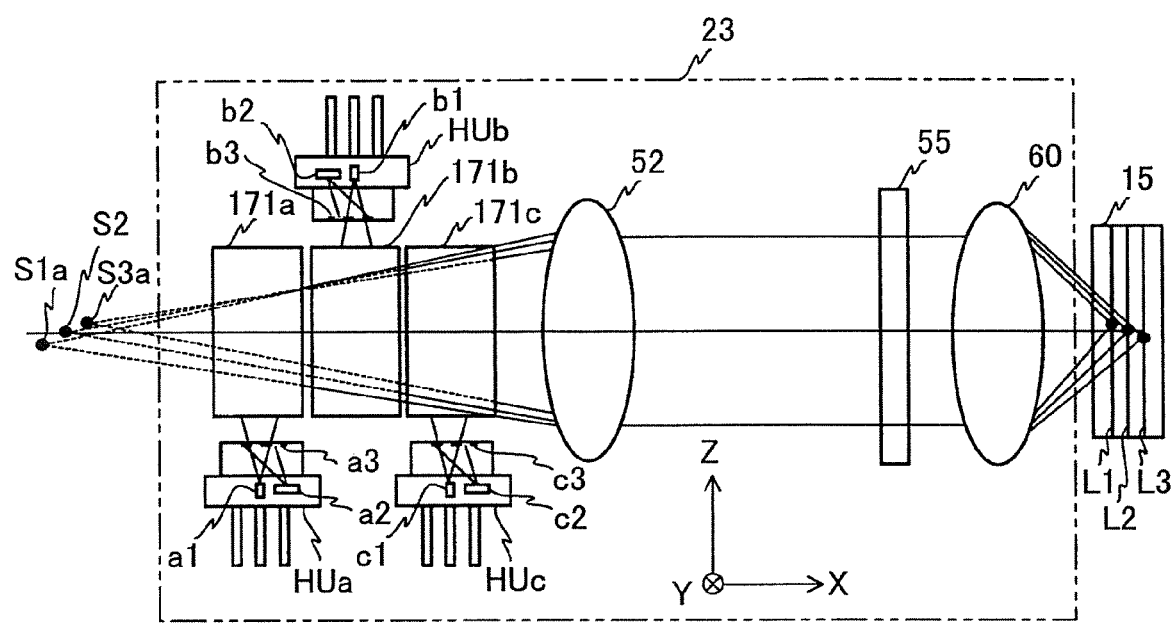
FIG. 17 is a diagram for explaining the optical pickup device in an embodiment of this invention.

As shown in FIG. 17, the optical pickup device 23 of this embodiment comprises three hologram units (HUa, HUb, HUc), three hologram elements (171a, 171b, 171c), the collimating lens 52, the quarter wave plate 55, the objective lens 60, and the drive system (which is not illustrated) for driving the objective lens 60.

All the hologram elements are volume hologram elements, and the respective hologram elements have mutually different Bragg conditions in which the optical intensity of the diffracted light is set to the maximum. Each hologram element has a function which corrects the aberration resulting from the difference in the position of the recording layer to the objective lens 60.

The hologram element 171b is arranged on the +X side of hologram element 171a, and hologram element 171c is arranged on the +X side of hologram element 171b. The hologram unit HUa has semiconductor laser a1, the photodetector a2, and polarization hologram a3, and is arranged on the −Z side of hologram element 171a.

The semiconductor laser a1 emits the light of P polarization to the direction of +Z. The polarization hologram a3 is arranged on the +Z side of semiconductor laser a1, and it is set up so that its diffraction efficiency to P polarization is small and its diffraction efficiency to S polarization is large.

The photodetector a2 is arranged near the semiconductor laser a1, and receives the returned light deflected by polarization hologram a3. Therefore, the light emitted from semiconductor laser a1 enters into hologram element 171a through polarization hologram a3.

The light from hologram unit HUa is repeatedly diffracted in the hologram area of hologram element 171a, and is reflected on the border plane repeatedly. And the diffracted light is emitted towards the direction of +X from hologram element 171a.

The diffracted light from hologram element 171a is a diverging light which is equivalent to the light emitted from the virtual emission point S1a which is located on the −Z side of the optical axis of collimating lens 52 and located on the −X side of the virtual emission point S2.

Although it enters into hologram element 171b and hologram element 171c, it does not satisfy the Bragg conditions of these hologram elements, and the diffracted light from hologram element 171a is penetrated without change.

The hologram unit HUb comprises the semiconductor laser b1, the photodetector b2, and the polarization hologram b3. The hologram unit HUb is arranged on the +Z side of hologram element 71b.

The semiconductor laser b1 emits the light of P polarization to the direction of −Z. The polarization hologram b3 is arranged on the −Z side of semiconductor laser b1, and it is set up so that its diffraction efficiency to P polarization is small and its diffraction efficiency to S polarization is large.

The photodetector b2 is arranged near the semiconductor laser b1, and receives the returned light deflected by polarization hologram b3. Therefore, the light emitted from semiconductor laser b1 enters into hologram element 171b through polarization hologram b3.

The light from hologram unit HUb is repeatedly diffracted in the hologram area of hologram element 171b, and is reflected on the border plane repeatedly. And the diffracted light is emitted towards the direction of +X from hologram element 171b.

The diffracted light from hologram element 171b is a diverging light which is equivalent to the light emitted from the virtual emission point S2. Although it enters into hologram element 171c, it does not satisfy the Bragg conditions thereof, and the diffracted light from hologram element 171b is penetrated without change.

The hologram unit HUc comprises the semiconductor laser c1, the photodetector c2, and the polarization hologram c3. The hologram unit HUc is arranged on the −Z side of hologram element 71c.

The semiconductor laser c1 emits the light of P polarization towards the direction of +Z. The polarization hologram c3 is arranged on the +Z side of semiconductor laser c1, and it is set up so that its diffraction efficiency to P polarization is small and its diffraction efficiency to S polarization is large.

The photodetector c2 is arranged near the semiconductor laser c1, and receives the returned light deflected by polarization hologram c3. Therefore, the light emitted from semiconductor laser c1 enters into hologram element 171c through polarization hologram c3.

The light from hologram unit HUc is repeatedly diffracted in the hologram area of hologram element 171c, and is reflected on the border plane repeatedly. And the diffracted light is emitted towards the direction of +X from hologram element 171c.

The diffracted light from hologram element 171c is a diverging light which is equivalent to the light emitted from the virtual emission point S3a which is located on the +Z side of the optical axis of collimating lens 52 and located on the +X side of the virtual emission point S2.

The collimating lens 52 is arranged on the +X side of hologram element 171c. Each of the quarter wave plate 55 and the objective lens 60 is arranged similar to that in the previously mentioned embodiment.

Operation of the optical pickup device 23 of this embodiment will be explained briefly.

The light of the plane polarization (P polarization) emitted from semiconductor laser a1 enters into hologram element 171a through polarization hologram a3, is diffracted by hologram element 171a, and enters into collimating lens 52 through hologram element 171b and hologram element 171c.

The light of the plane polarization (P polarization) emitted from semiconductor laser b1 enters into hologram element 171b through polarization hologram b3, is diffracted by hologram element 171b, and enters into collimating lens 52 through hologram element 171c.

The light of the plane polarization (P polarization) emitted from semiconductor laser c1 enters into hologram element 171c through polarization hologram c3, is diffracted by hologram element 171c, and enters into collimating lens 52.

Each diffracted light penetrating the collimating lens 52 is converted into the circularly polarized light by quarter wave plate 55, and it is focused on each recording layer of optical disk 15 as a small spot through objective lens 60.

In this embodiment, the light from semiconductor laser a1 is focused on the 1st recording layer L1, the light from semiconductor laser b1 is focused on the 2nd recording layer L2, and the light from semiconductor laser c1 is focused on the 3rd recording layer L3. That is, if each semiconductor laser is made to emit light simultaneously, a light spot can be simultaneously formed in each recording layer.

However, unlike the previously mentioned embodiment, the positions of the respective light spots in the direction of the Z-axis are different from each other (refer to FIG. 17). Namely, the distance of each light spot from the center of rotation of optical disk 15 differs mutually.

The reflected light from optical disk 15 is converted into circularly polarized light in the opposite polarization direction, and the returned light enters into quarter wave plate 55 through objective lens 60 so that it is converted into the linearly polarized light (S polarization) which is perpendicular to the outward trip. And this returned light enters into hologram element 171c through collimating lens 52.

In the hologram element 171c, the returned light component from the 3rd recording layer L3 is diffracted towards the direction of −Z. The returned light penetrating the hologram element 171c enters into hologram element 171b.

In the hologram element 171b, the returned light component from the 2nd recording layer L2 is diffracted towards the direction of +Z. The returned light penetrating the hologram element 171b enters into hologram element 171a.

In the hologram element 171a, the returned light component from the 1st recording layer L1 is diffracted towards the direction of −Z. The diffracted light (returned light component from the 3rd recording layer L3) from hologram element 171c is deflected by polarization hologram c3, and is received by the photodetector c2.

The diffracted light (returned light component from the 2nd recording layer L2) from hologram element 171b is deflected by polarization hologram b3, and is received by the photodetector b2.

The diffracted light (returned light component from the 1st recording layer L1) from hologram element 171a is deflected by polarization hologram a3, and is received by the photodetector a2.

The respective photodetectors are constituted similar to the previously mentioned embodiment, and each photodetector outputs the signal according to the light receiving quantity to the playback signal processing circuit 28.

In the optical disk device 20 of this embodiment, the light source unit is realized by three light sources (a1, b1, c1) and three hologram elements (171a, 171b, 171c). And the optical detector unit is realized by three hologram elements (171a, 171b, 171c) and three the photodetectors (a2, b2, c2).

As explained above, in the optical pickup device 23 of this embodiment, the volume hologram element 171a diffracts the light beam from semiconductor laser a1 to send the diffracted light to objective lens 60, and diffracts the returned light through objective lens 60 of the light beam emitted from semiconductor laser a1. The volume hologram element 171b diffracts the light beam from semiconductor laser b1 to send the diffracted light to objective lens 60, and diffracts the returned light through objective lens 60 of the light beam emitted from semiconductor laser b1. And the volume hologram element 171c diffracts the light beam from semiconductor laser c1 to send the diffracted light to objective lens 60, and diffracts the returned light through objective lens 60 of the light beam emitted from semiconductor laser c1. Thus, the miniaturization of an optical pickup device and optical disk device can be further promoted rather than the previously mentioned embodiment.

In this embodiment, the position of the virtual emission point of each hologram element is made to differ in both the optical axis direction of collimating lens 52 and the direction which is perpendicular to the optical axis direction. Thereby, the incident angle of the returned light component from the 1st recording layer L1 to each hologram element, the incident angle of the returned light component from the 2nd recording layer L2, and the incident angle of the returned light component from the 3rd recording layer L3 can be changed.

Therefore, it is possible that only the returned light component from the 3rd recording layer L3 is diffracted by hologram element 171c, only the returned light component from the 2nd recording layer L2 is diffracted by hologram element 171b, and only the returned light component from the 1st recording layer L1 is diffracted by hologram element 171a.

That is, the separation characteristics of the returned light in each hologram element can be improved.

In this embodiment, the incidence directions of the incident lights in the two hologram elements which are arranged adjacent to each other differ mutually, and the width of a hologram element may be made smaller than the width of a hologram unit.

The above embodiment is described with respect to the case in which the number of light sources is three. However, the invention is not limited to this embodiment.

Next, a description will be given of the optical pickup device in an embodiment of the invention.

Unlike the previously mentioned embodiment, this embodiment is adapted to form a plurality of light spots on the same recording layer simultaneously. The composition of the optical disk device except the portions of data processing and signal processing and the optical pickup device is the same as that of the previously mentioned embodiment. And the elements which are the same as corresponding elements in the previously mentioned embodiment are designated by the same reference numerals, and a description thereof will be omitted. It is supposed that the optical disk 15 is a DVD-type optical disk which has one recording layer.

Figure 18:
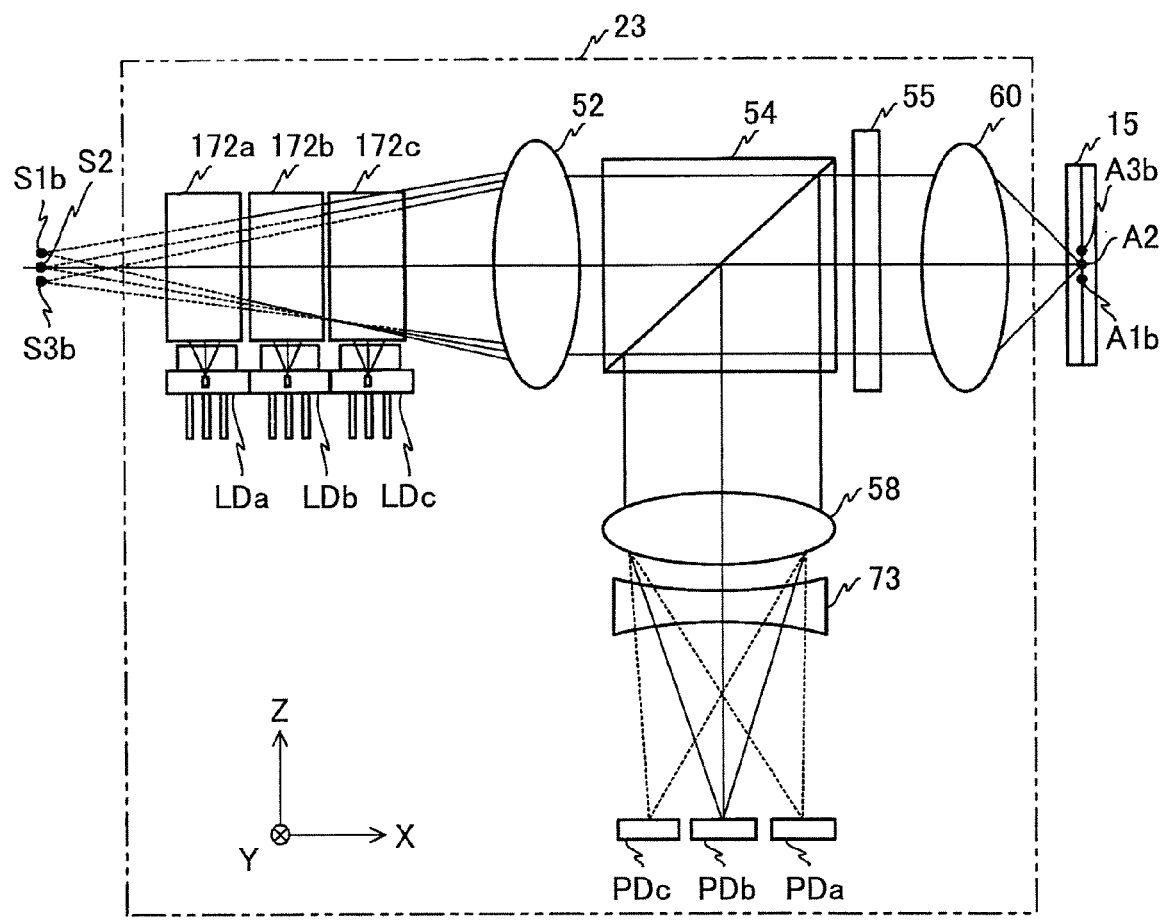
FIG. 18 is a diagram for explaining the optical pickup device in an embodiment of this invention.

As shown in FIG. 18, the optical pickup device 23 in this embodiment comprises three light sources (LDa, LDb, LDc), three hologram elements (172a, 172b, 172c), a collimating lens 52, a polarization beam splitter 54, a quarter wave plate 55, an objective lens 60, a detection lens 58, a cylinder lens 73, three photodetectors (PDa, PDb, PDc), and the drive system (which is not illustrated) for driving the objective lens 60.

Each light source has a semiconductor laser which emits a laser beam whose wavelength is 660 nm, and has equivalent luminescence characteristics. In the maximum intensity outgoing radiation direction of the laser beam emitted from each light source, all are the direction of +Z.

The light source LDb is arranged adjacent to the +X side of light source LDa, and the light source LDc is arranged adjacent to the +X side of light source LDb. The polarized light beam (P polarization) parallel to the plane of incidence of polarization beam splitter 54 is emitted from each light source.

All the hologram elements are volume hologram elements, and the respective hologram elements have mutually different Bragg conditions in which the optical intensity of the diffracted light is set to the maximum.

The hologram element 172a is arranged on the +Z side of light source LDa, and the light from light source LDa enters it. The light from light source LDa is repeatedly diffracted in the hologram area of hologram element 172a, and is reflected on the border plane repeatedly. The diffracted light from hologram element 172a is emitted towards the direction of +X. The diffracted light from hologram element 172a is a diverging light which is equivalent to the light emitted from the virtual emission point S1b which is located on the +Z side of the virtual emission point S2.

Although it enters into hologram element 172b and hologram element 172c, since it is not satisfied with these of Bragg conditions, the diffracted light from hologram element 172a is penetrated without change.

The hologram element 172b is arranged on the +Z side of light source LDb, and the light from light source LDb enters the hologram element 172b. The light from light source LDb is repeatedly diffracted in the hologram area of hologram element 172b, and is reflected on the border plane repeatedly. And the diffracted light from hologram element 172b is emitted towards the direction of +X.

The diffracted light from hologram element 172b is a diverging light which is equivalent to the light emitted from the virtual emission point S2. Although it enters into hologram element 172c, the Bragg conditions are not satisfied, and the diffracted light from hologram element 172b is penetrated without change.

The hologram element 172c is arranged on the +Z side of light source LDc, and the light from light source LDc enters the hologram element 172c. The light from light source LDc is repeatedly diffracted in the hologram area of hologram element 172c, and is reflected on the border plane repeatedly. And the diffracted light from hologram element 172c is emitted towards the direction of +X. The diffracted light from hologram element 172c is a diverging light which is equivalent to the light emitted from the virtual emission point S3b which is located on the −Z side of the virtual emission point S2.

The distance between the respective virtual emission points is determined based on the optical magnification determined from the collimating lens 52 and the objective lens 66, and the track pitch of the optical disk 15.

The collimating lens 52 is arranged on the +X side of hologram element 172c. The polarization beam splitter 54, the quarter wave plate 55, the objective lens 60, the detection lens 58, and the cylinder lens 73 are arranged similar to the previously mentioned embodiment.

The photodetector PDb is arranged on the −Z side of cylinder lens 73, and arranged on the optical axis of cylinder lens 73. The photodetector PDa is arranged on the +X side of the photodetector PDb, and the photodetector PDc is arranged on the −X side of the photodetector PDb.

Operation of the optical pickup device 23 of this embodiment will be explained briefly.

The light of the plane polarization (P polarization) emitted from light source LDa is diffracted by hologram element 172a, and enters into polarization beam splitter 54 through hologram element 172b, hologram element 172c, and collimating lens 52.

The light of the plane polarization (P polarization) emitted from light source LDb is diffracted by hologram element 172b, and enters into polarization beam splitter 54 through hologram element 172c and collimating lens 52.

The light of the plane polarization (P polarization) emitted from light source LDc is diffracted by hologram element 172c, and enters into polarization beam splitter 54 through collimating lens 52. The greater part of each diffracted light penetrates polarization beam splitter 54 without change, it is converted into the circularly polarized light by quarter wave plate 55, and is focused on the recording layer of optical disk 15 as a small spot through objective lens 60.

The light from light source LDb is focused on position A2 on the 1st track that intersects the optical axis of the objective lens, and the light from light source LDa is focused at the position A1b on the 2nd track located in the −Z side of the 1st track between two tracks contiguous to the 1st track, and the light from light source LDc is focused at the position A3b on the 3rd track located in the +Z side of the 1st track between two tracks contiguous to the 1st track.

The reflected light from optical disk 15 is converted into the circularly polarized light in the opposite polarization direction, and the returned light enters into quarter wave plate 55 through objective lens 60 so that it is converted into the linearly polarized light (S polarization) which is perpendicular to the outward trip. And this returned light enters into polarization beam splitter 54.

The returned light reflected in the direction of −Z by polarization beam splitter 54 is received by each photodetector through detection lens 58 and cylinder lens 73.

The returned light from position A1b is received by the photodetector PDa, the returned light from position A2 is received by the photodetector PDb, and the returned light component from position A3b is received by the photodetector PDc.

In the optical pickup device 23 of this embodiment, if each light source is made to emit light simultaneously, three light spots can be simultaneously formed on three tracks. Therefore, simultaneous recording and reproduction to three tracks is possible. It is also possible to perform recording and reproduction of the optical disk 15 simultaneously.

In the optical pickup device 23 of this embodiment, the light source unit is realized by three light sources (LDa, LDb, LDc) and three hologram elements (172a, 172b, 172c).

In the optical pickup device 23 of this embodiment, the hologram element 172a diffracts the light emitted in the direction of +Z from light source LDa in the direction of +X, the hologram element 172b diffracts the light emitted in the direction of +Z from light source LDb in the direction of +X, the hologram element 172c diffracts the light emitted in the direction of +Z from light source LDc in the direction of +X, and these holograms are arranged on the optical path of the light which faces to objective lens 60 from each light source. It is possible to attain miniaturization without causing performance decrement.

According to the optical disk device of this embodiment, recording on the 1st track, recording on the 2nd track, and recording on the 3rd track can be performed almost simultaneously, and it is possible to perform recording processing to the optical disk quickly.

According to the optical disk device of this embodiment, reproduction from the 1st track, reproduction from the 2nd track, and reproduction from the 3rd track can be performed almost simultaneously, and it is possible to perform reproduction processing to the optical disk quickly.

In this embodiment, it is also possible to perform recording and reproduction almost simultaneously. For example, information is renewable from the 2nd track, recording the information on the 1st track.

Next, a description will be given of the optical pickup device in an embodiment of the invention.

Unlike the previously mentioned embodiment, this embodiment is characterized in that the optical pickup device is adapted to access both the DVD and the BD.

The composition of the optical disk device except the optical pickup device and the portions of data processing and signal processing is the same as that of the previously mentioned embodiment. The elements which are the same as corresponding elements in the previously mentioned embodiment are designated by the same reference numerals, and a description thereof will be omitted. It is supposed that the optical disks 15 is either DVD or BD, and that the DVD is the optical disk 15a, and the BD is the optical disk 15b.

Figure 19:
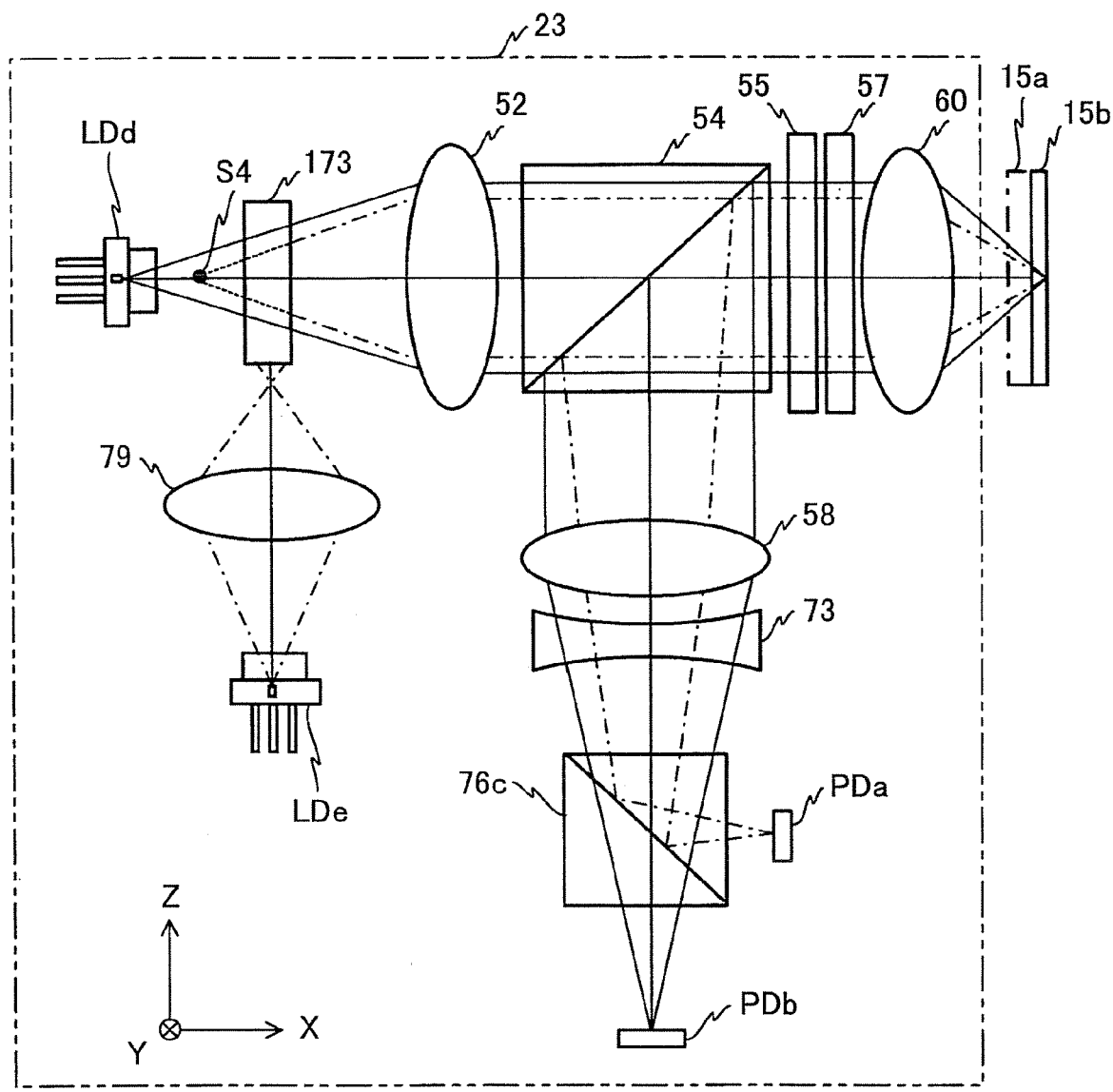
FIG. 19 is a diagram for explaining the optical pickup device in an embodiment of this invention.

As shown in FIG. 19, the optical pickup device 23 of this embodiment comprises two light sources (LDd, LDe), a coupling lens 79, a hologram element 173, a collimating lens 52, a polarization beam splitter 54, a quarter wave plate 55 for two wavelengths, an opening wavelength filter 57, an objective lens 60, a detection lens 58, a cylinder lens 73, a dichroic prism 76c, and the drive system (which is not illustrated) for driving the two photodetectors (PDa, PDb) and the objective lens 60.

The light source LDd is used when the optical disk is BD, and this light source has the semiconductor laser which emits a laser beam whose wavelength is 405 nm. The maximum intensity outgoing radiation direction of the laser beam emitted from light source LDd is the direction of +X.

The light source LDd is arranged in the position whose point of the emitting light corresponds with the focal position of collimating lens 52. The light source LDe is used when the optical disk is DVD, and this light source has a semiconductor laser which emits a laser beam whose wavelength is 660 nm. The maximum intensity outgoing radiation direction of the laser beam emitted from light source LDe is the direction of +Z. The polarized light beam (P polarization) parallel to the plane of incidence of polarization beam splitter 54 is emitted from each of light source LDd and light source LDe.

The coupling lens 79 is arranged on the +Z side of light source LDe, and makes convergence light emitted from light source LDe. The hologram element 173 is a volume hologram element, and it is arranged on the +X side of light source LDd, and is arranged on the +Z side of coupling lens 79, and the light penetrating the coupling lens 79 enters the hologram element 173.

The light penetrating the coupling lens 79 is repeatedly diffracted in the hologram area of hologram element 173, and is reflected on the border plane repeatedly. And the diffracted light from hologram element 173 is emitted towards the direction of +X.

The diffracted light from hologram element 173 is a diverging light which is equivalent to the light emitted from the virtual emission point S4 which is located on the +X side of the focal position of collimating lens 52.

The objective lens 60 is optimized to BD. The virtual emission point S4 is determined in consideration of the difference in the substrate thickness of BD and DVD. Thereby, the aberration resulting from the difference in the substrate thickness of BD and DVD is corrected.

The collimating lens 52 is arranged on the +X side of hologram element 173. The polarization beam splitter 54, the quarter wave plate 55, the objective lens 60, the detection lens 58, and the cylinder lens 73 are arranged similar to the previously mentioned embodiment.

The opening wavelength filter 57 is arranged on the optical path between the quarter wave plate 55 and the objective lens 60, and it is designed so that the opening diameter may change according to the wavelength.

The opening restriction of the light from light source LDd is carried out so that the numerical aperture (NA) of objective lens 60 may be set to 0.85, and opening restriction of the light from light source LDe is carried out so that the numerical aperture (NA) of objective lens 60 may be set to 0.65.

The servo drive of this opening wavelength filter 57 is carried out integrally with the objective lens 60.

The dichroic prism 76c is arranged on the −Z side of cylinder lens 73, and when the optical disk is DVD, it reflects the returned light in the direction of +X. The photodetector PDa is arranged on the +X side of this dichroic prism 76c, and the returned light reflected with dichroic prism 76c is received. The photodetector PDb is arranged on the −Z side of dichroic prism 76c, and receives the returned light penetrating the dichroic prism 76c.

Operation of the optical pickup device 23 of this embodiment will be explained briefly.

When the optical disk is DVD, the light of the plane polarization (P polarization) emitted from light source LDe enters into hologram element 173 through coupling lens 79, it is diffracted by hologram element 173, is converted into a slightly diverging light beam by collimating lens 52, and enters into polarization beam splitter 54. Penetrating the polarization beam splitter 54 without change, it is converted into a circularly polarized light beam by quarter wave plate 55, opening restriction is carried out with opening wavelength filter 57, and the most part of diffracted light is focused on the recording layer of optical disk 15a as a small spot through objective lens 60.

The reflected light from optical disk 15a is converted into circularly polarized light in the opposite polarization direction, and the returned light enters into quarter wave plate 55 through objective lens 60 and opening wavelength filter 57 so that it is converted to the linearly polarized light (S polarization) which is perpendicular to the outward trip. And this returned light enters into polarization beam splitter 54.

It enters into dichroic prism 76c through detection lens 58 and cylinder lens 73, it is reflected with dichroic prism 76c, and the returned light reflected in the direction of −Z by polarization beam splitter 54 is received by the photodetector PDa.

When the optical disk is BD, the light of the plane polarization (P polarization) emitted from light source LDd penetrates hologram element 173 without change, is converted into the parallel beam with collimating lens 52, and enters into polarization beam splitter 54.

The polarization beam splitter 54 is penetrated without change, it is converted into the circularly polarized light with quarter wave plate 55, opening restriction is carried out with opening wavelength filter 57, and the most part of light from collimating lens 52 is focused on the recording layer of optical disk 15b as a small spot through objective lens 60.

The reflected light from optical disk 15b is converted into the circularly polarized light in the opposite polarization direction, and the returned light enters into quarter wave plate 55 through objective lens 60 and opening wavelength filter 57 so that it is converted into the linearly polarized light (S polarization) which is perpendicular to the outward trip. And this returned light enters into polarization beam splitter 54.

The returned light reflected in the direction of −Z by polarization beam splitter 54 enters into dichroic prism 76c through detection lens 58 and cylinder lens 73, penetrates dichroic prism 76c without change, and is received by the photodetector PDb.

In the case of a DVD, the light which enters into objective lens 60 becomes with emission light, and the aberration resulting from the difference between substrate thickness with that of BD and a wavelength is corrected.

In the optical pickup device 23 of this embodiment, the light source unit is realized by two light sources (LDd, LDe) and hologram elements 173.

According to the optical pickup device 23 of this embodiment, it is possible to attain a miniaturization, without causing performance decrement, since hologram element 173 which diffracts the light emitted in the direction of +Z from light source LDe in the direction of +X is arranged on the optical path of the light which faces to objective lens 60 from each light source.

It is possible to attain miniaturization of the device without reducing the access accuracy to several optical disks with which the substrate thickness differs mutually, since it has optical pickup device 23 which can attain a miniaturization according to the optical disk device of this embodiment, without causing performance decrement.

Figure 20:
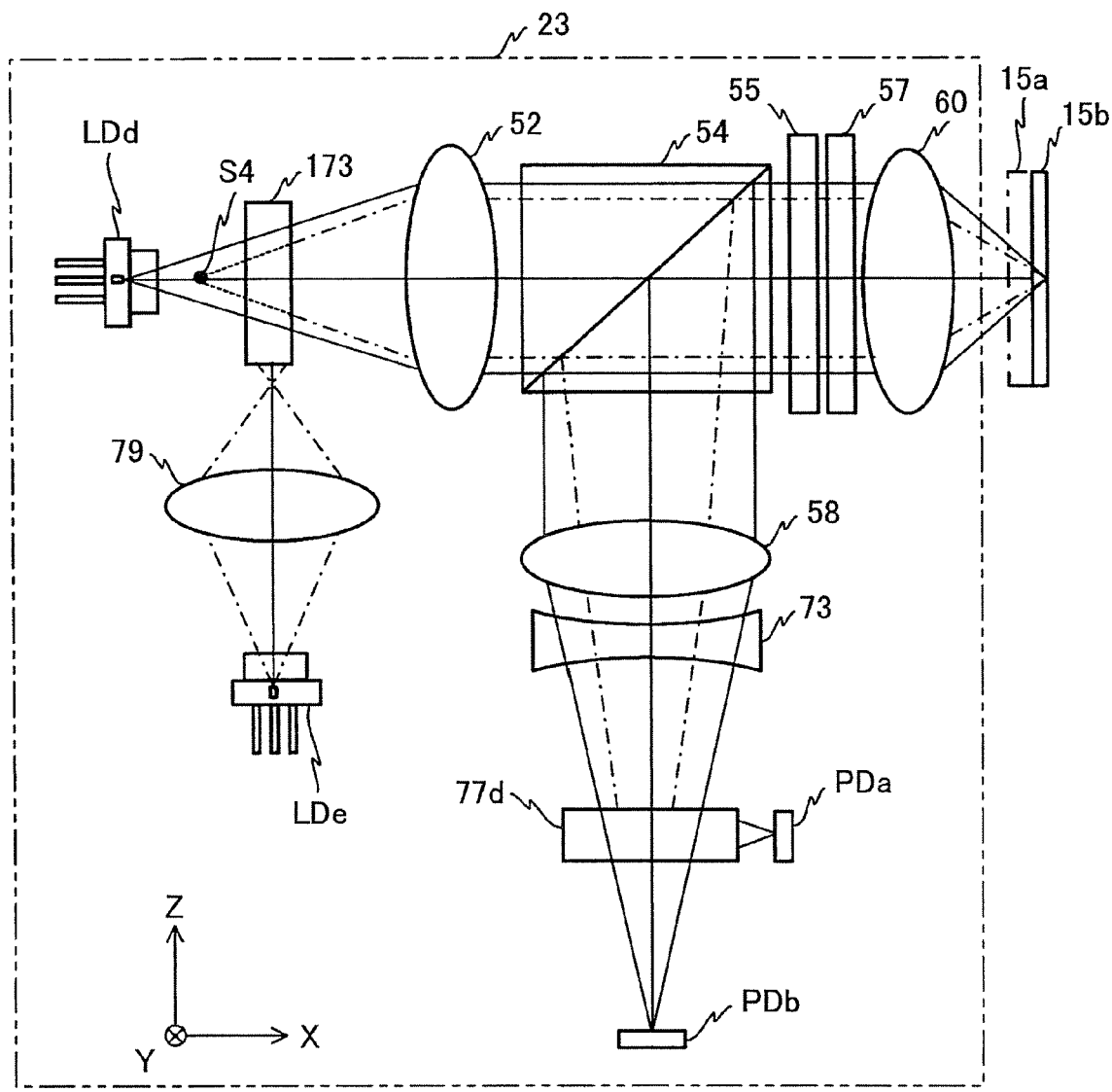
FIG. 20 is a diagram for explaining modification of the optical pickup device of FIG. 19.

In this embodiment, as shown in FIG. 20, it may replace with the dichroic prism 76c and the hologram element 77d may be used. This hologram element 77d is a volume hologram, and when the optical disk is the optical disk 15a, it diffracts returned light in the direction of +X.

And 77d of hologram elements also have the function which corrects the aberration resulting from the difference in substrate thickness. In this case, the optical detector unit is realized by the two photodetectors (PDa, PDb) and the hologram element 77d.

Next, a description will be given of the optical pickup device in an embodiment of this invention.

Unlike the previously mentioned embodiment, this embodiment is characterized in that the optical pickup device is adapted to access any of CD, DVD and BD.

The composition of the optical disk device except the optical pickup device and the data-processing and signal processing parts is the same as that of the previously mentioned embodiment. The elements which are the same as corresponding element in the previously mentioned embodiment are designated by the same reference numerals, and a description thereof will be omitted. It is supposed that the optical disks 15 is any of CD, DVD and BD, and that DVD is the optical disk 15a, BD is the optical disk 15b, and CD is the optical disk 15c.

Figure 21:
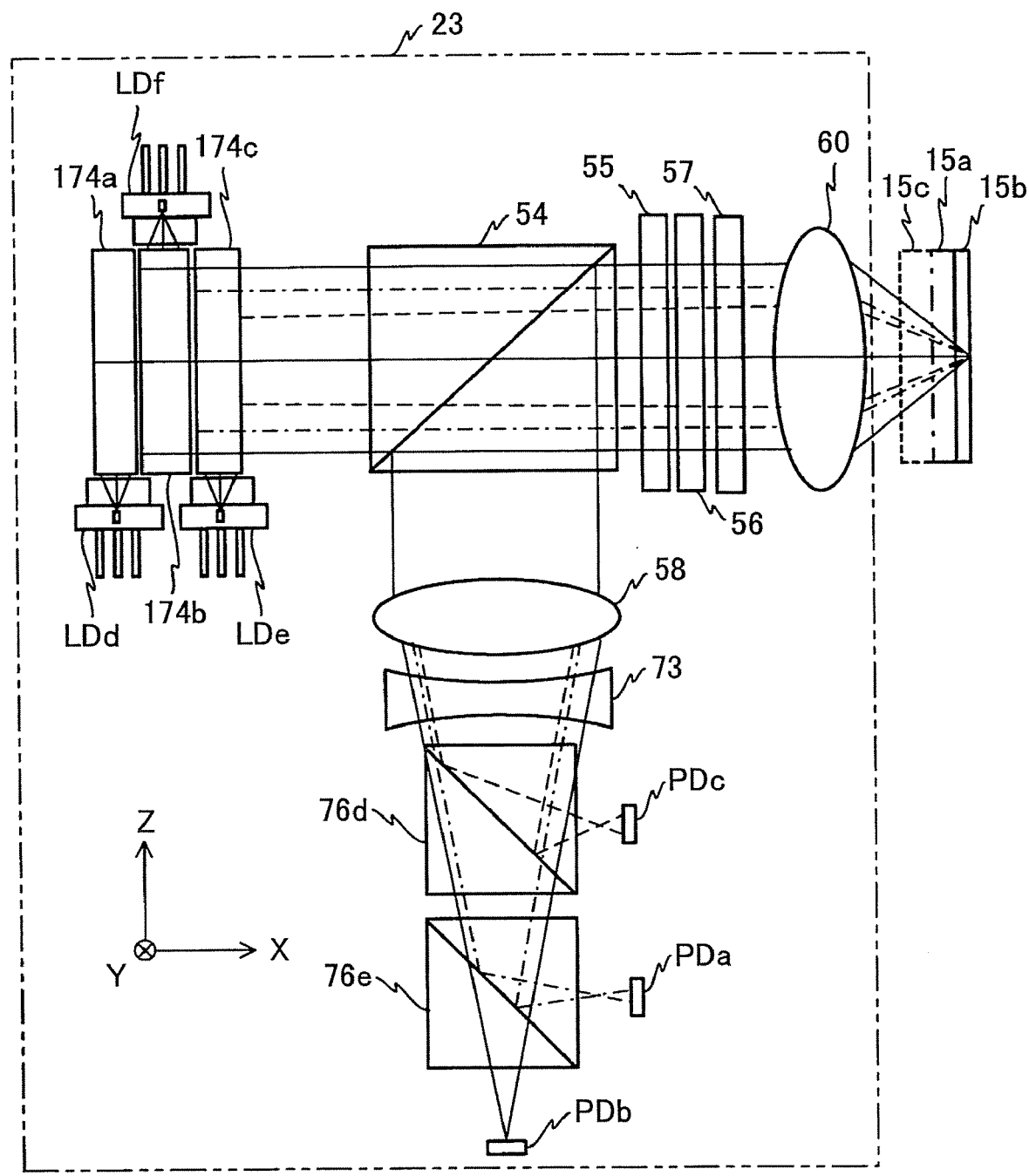
FIG. 21 is a diagram for explaining the optical pickup device in an embodiment of this invention.

As shown in FIG. 21, the optical pickup device 23 comprises three light sources (LDd, LDe, LDf), two dichroic prisms (76d, 76e), three hologram elements (174a, 174b, 174c), a polarization beam splitter 54, a quarter wave plate 55 for three wavelengths, a diffraction optical element 56, an opening wavelength filter 57, an objective lens 60, a detection lens 58, three photodetectors (PDa, PDb, PDc), a cylinder lens 73, and the drive system (which is not illustrated) for driving the objective lens 60.

The light source LDd is used when the optical disk is BD, and it has a semiconductor laser which emits light in the laser beam whose wavelength is 405 nm. The maximum intensity outgoing radiation direction of the laser beam emitted from light source LDd is the direction of +Z.

The light source LDe is used when the optical disk is DVD. And it has a semiconductor laser which emits light in the laser beam whose wavelength is 660 nm. The maximum intensity outgoing radiation direction of the laser beam emitted from light source LDe is the direction of +Z.

The light source LDf is used when the optical disk is CD, and it has a semiconductor laser which emits light in the laser beam whose wavelength is 780 nm. The maximum intensity outgoing radiation direction of the laser beam emitted from light source LDf is the direction of −Z. The polarized light beam (P polarization) parallel to the plane of incidence of polarization beam splitter 54 is emitted from each light source.

The hologram element 174a is arranged on the +Z side of light source LDd, and the light from light source LDd enters. The light from light source LDd is repeatedly diffracted in the hologram area of hologram element 174a, and is reflected on the border plane repeatedly. And the diffracted light from hologram element 174a of the parallel beam is emitted towards the direction of +X.

The hologram element 174b is the +X side of hologram element 174a, and it is arranged on the −Z side of light source LDf, and the light from light source LDf enters. The light from light source LDf is repeatedly diffracted in the hologram area of hologram element 174b, and is reflected on the border plane repeatedly. And the diffracted light from hologram element 174b which is in the parallel is emitted towards the direction of +X.

The hologram element 174c is arranged on the +X side of hologram element 174b, and it is arranged on the +Z side of light source LDe, and the light from light source LDe enters. The light from light source LDe is repeatedly diffracted in the hologram area of hologram element 174c, and is reflected on the border plane repeatedly. And the diffracted light from hologram element 174c is converted into a slightly diverging light beam which is diverging towards the direction of +X.

That is, in this embodiment, the lens function in which each hologram element changes the degree of divergence of outgoing radiation light to incident light is added.

The polarization beam splitter 54 is arranged on the +X side of hologram element 174c. The quarter wave plate 55, the objective lens 60, the detection lens 58, and the cylinder lens 73 are arranged similar to those in the previously mentioned embodiment.

It is supposed that the objective lens 60 is optimized to the BD disk. Then, aberration for hologram element 174b and hologram element 174c to correct the aberration resulting from the difference in substrate thickness to hologram pattern creation time is added.

The diffraction optical element 56 is arranged on the +X side of the quarter wave plate 55, and performs the aberration compensation corresponding to each wavelength. The opening wavelength filter 57 is arranged on the +X side of diffraction optical element 56, and performs the opening restriction corresponding to each wavelength. The servo drive of each of the diffraction optical element 56 and the opening wavelength filter 57 is performed integrally with the objective lens 60.

The dichroic prism 76d is arranged on the −Z side of cylinder lens 73, and when the optical disk is CD, it reflects the returned light in the direction of +X. The photodetector PDc is arranged on the +X side of this dichroic prism 76d and receives the returned light reflected by the dichroic prism 76d.

The dichroic prism 76e is arranged on the −Z side of the dichroic prism 76d, and when the optical disk is DVD, it reflects the returned light in the direction of +X. The photodetector PDa is arranged on the +X side of this dichroic prism 76e, and receives the returned light reflected by the dichroic prism 76e is received. The photodetector PDb is arranged on the −Z side of the dichroic prism 76e, and receives the returned light penetrating the dichroic prism 76e.

Operation of the optical pickup device 23 of this embodiment will be explained briefly.

When the optical disk is DVD, the light of the plane polarization (P polarization) emitted from light source LDf enters into hologram element 174b, and it is diffracted by hologram element 174b. The diffracted light is converted into the parallel beam and penetrates hologram element 174c without change, so that it enters into polarization beam splitter 54.

The most part of the diffracted light penetrates polarization beam splitter 54 without change, and it is converted into the circularly polarized light by quarter wave plate 55. The aberration compensation is carried out by diffraction optical element 56, and the opening restriction is carried out by opening wavelength filter 57, so that it is focused on the recording layer of optical disk 15a as a small spot through objective lens 60.

The reflected light from optical disk 15a is converted into the circularly polarized light in the opposite polarization direction, and enters into diffraction optical element 56 through objective lens 60 and opening wavelength filter 57 as the returned light. The returned light which is converted into the parallel beam by diffraction optical element 56 enters into quarter wave plate 55, so that it is converted into the linearly polarized light (S polarization) which is perpendicular to the outward trip. And this returned light enters into polarization beam splitter 54.

The returned light reflected in the direction of −Z by polarization beam splitter 54 enters into dichroic prism 76d through detection lens 58 and cylinder lens 73, and penetrates dichroic prism 76d without change. And the light enters into dichroic prism 76e, and it is reflected by dichroic prism 76e, so that the reflected light is received by the photodetector PDa.

When the optical disk is BD, the light of the plane polarization (P polarization) emitted from light source LDd enters into hologram element 174a. The light is diffracted by hologram element 174a and converted into the parallel beam, which penetrates hologram element 174b and hologram element 174c without change, and enters into polarization beam splitter 54.

The most part of the diffracted light penetrates polarization beam splitter 54 without change, and it is converted into the circularly polarized light by quarter wave plate 55. The light penetrates diffraction optical element 56 without change, opening restriction is carried out by opening wavelength filter 57, and it is focused on the recording layer of optical disk 15b as a small spot through objective lens 60.

The reflected light from optical disk 15b is converted into the circularly polarized light in the opposite polarization direction, and enters into diffraction optical element 56 through objective lens 60 and opening wavelength filter 57 as returned light. The returned light which is converted into the parallel beam by the diffraction optical element 56 enters into quarter wave plate 55, so that it is converted into the linearly polarized light (S polarization) which is perpendicular to the outward trip. And this returned light enters into polarization beam splitter 54.

The returned light reflected in the direction of −Z by polarization beam splitter 54 enters into dichroic prism 76d through detection lens 58 and cylinder lens 73. The light penetrates dichroic prism 76d without change, and it enters into dichroic prism 76e. The light penetrates dichroic prism 76e without change, and it is received by the photodetector PDb.

When the optical disk is CD, the light of the plane polarization (P polarization) emitted from light source LDe enters into hologram element 174c. The light is diffracted by hologram element 174c, and it is converted into a slightly diverging light beam, and enters into polarization beam splitter 54.

The most part of the diffracted light penetrates polarization beam splitter 54 without change, and it is converted into the circularly polarized light by quarter wave plate 55. The aberration compensation is carried out by diffraction optical element 56, the opening restriction is carried out by opening wavelength filter 57, and the light is focused on the recording layer of optical disk 15c as a small spot through objective lens 60.

The reflected light from optical disk 15c is converted into the circularly polarized light in the opposite polarization direction, and enters into diffraction optical element 56 through objective lens 60 and opening wavelength filter 57 as returned light. The returned light from diffraction optical element 56 enters into quarter wave plate 55, so that it is converted into the linearly polarized light (S polarization) which is perpendicular to the outward trip. And this returned light enters into polarization beam splitter 54.

The returned light reflected in the direction of −Z by polarization beam splitter 54 enters into dichroic prism 76d through detection lens 58 and cylinder lens 73. The light is reflected by dichroic prism 76d, and it is received by the photodetector PDc.

In the optical pickup device 23 of this embodiment, the light source unit is realized by three light sources (LDd, LDe, LDf) and three hologram elements (174a, 174b, 174c).

In the optical pickup device 23 of this embodiment, the hologram element 174a which diffracts the light emitted in the direction of +Z from light source LDd in the direction of +X, the hologram element 174c which diffracts the light emitted in the direction of +Z from light source LDe in the direction of +X, and the hologram element 174b which diffracts the light emitted in the direction of −Z from light source LDf in the direction of +X are arranged on the optical path of the light from each light source facing the objective lens 60. And it is possible to attain miniaturization without causing performance decrement.

In this embodiment, the lens function is added to each hologram element, and the collimating lens can be excluded and the miniaturization of an optical pickup device and optical disk device can be attained.

In this embodiment, the incidence directions of the incident light in the two hologram elements which are arranged adjacent to each other differ mutually, and the width of a hologram element may be made smaller than the width of a light source.

Figure 22:
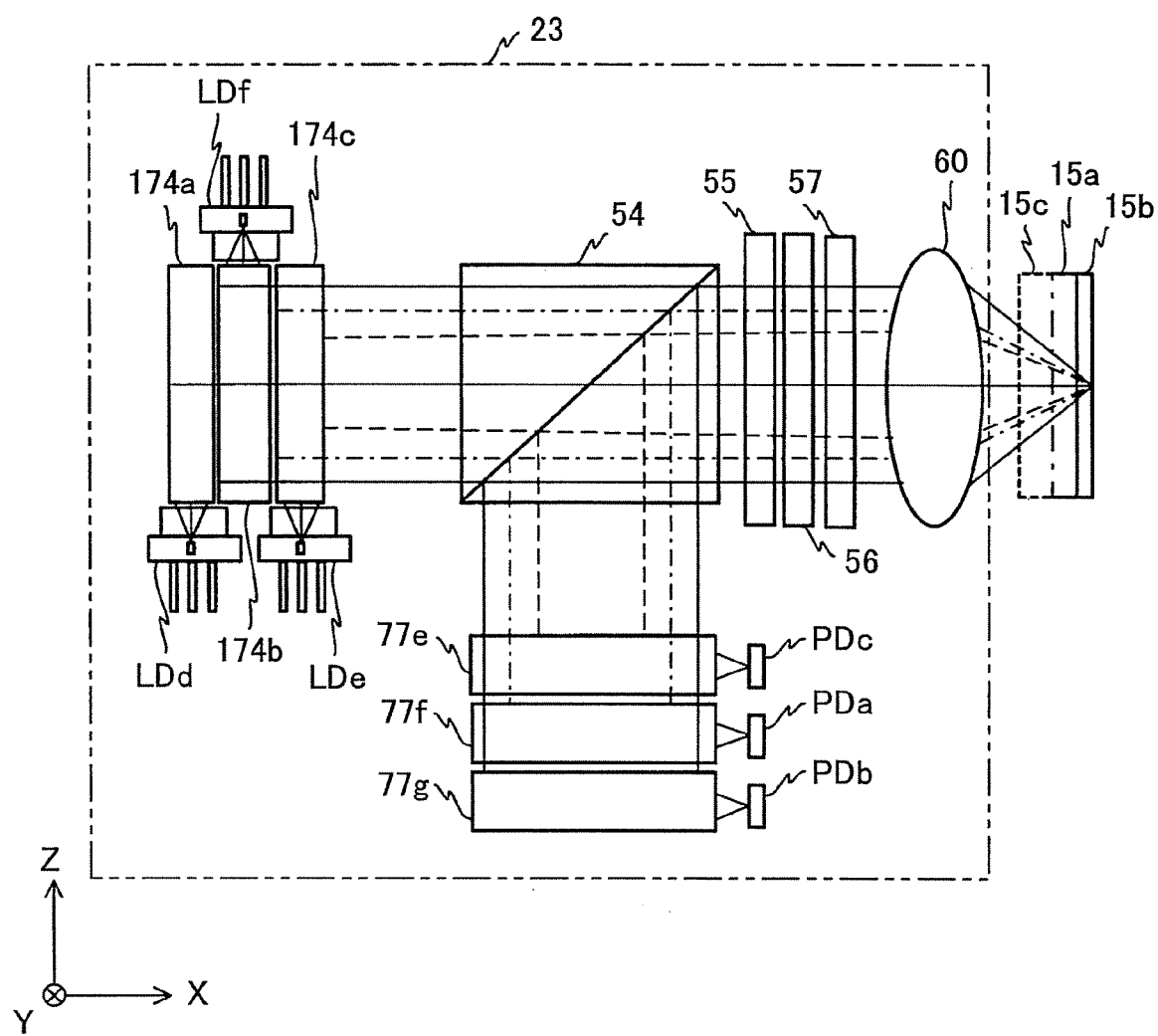
FIG. 22 is a diagram for explaining modification of the optical pickup device of FIG. 20.

In this embodiment, as shown in FIG. 22, a hologram element 77e may be used instead of the dichroic prism 76d, and a hologram element 77f may be used, instead of the dichroic prism 76e, and a hologram element 77g may be provided on the −Z side of the hologram element 77f. This hologram element 77e is a volume hologram element, and when the optical disk is CD, it diffracts the returned light in the direction of +X. The hologram element 77f is a volume hologram element, and when the optical disk is DVD, it diffracts the returned light in the direction of +X. The hologram element 77g is a volume hologram element, and when the optical disk is BD, it diffracts the returned light in the direction of +X. And the photodetector PDb is arranged on the +X side of the hologram element 77g.

The hologram elements (77e, 77f, 77g) have mutually different Bragg conditions in which the optical intensity of the diffracted light is set to the maximum. The hologram elements (77e, 77f, 77g) have a function which corrects the aberration resulting from the difference in substrate thickness. The hologram elements (77e, 77f, 77g) have given astigmatism to the diffracted light. In this case, the optical detector unit is realized by the three photodetectors (PDa, PDb, PDc) and three hologram elements (77e, 77f, 77g).

Next, a description will be given of the optical pickup device in an embodiment of this invention.

This embodiment is characterized in using a hologram unit instead of each light source in the previously mentioned embodiment. The elements which are the same as corresponding elements in the previously mentioned embodiment are designated by the same reference numerals, and a description thereof will be omitted.

Figure 23:
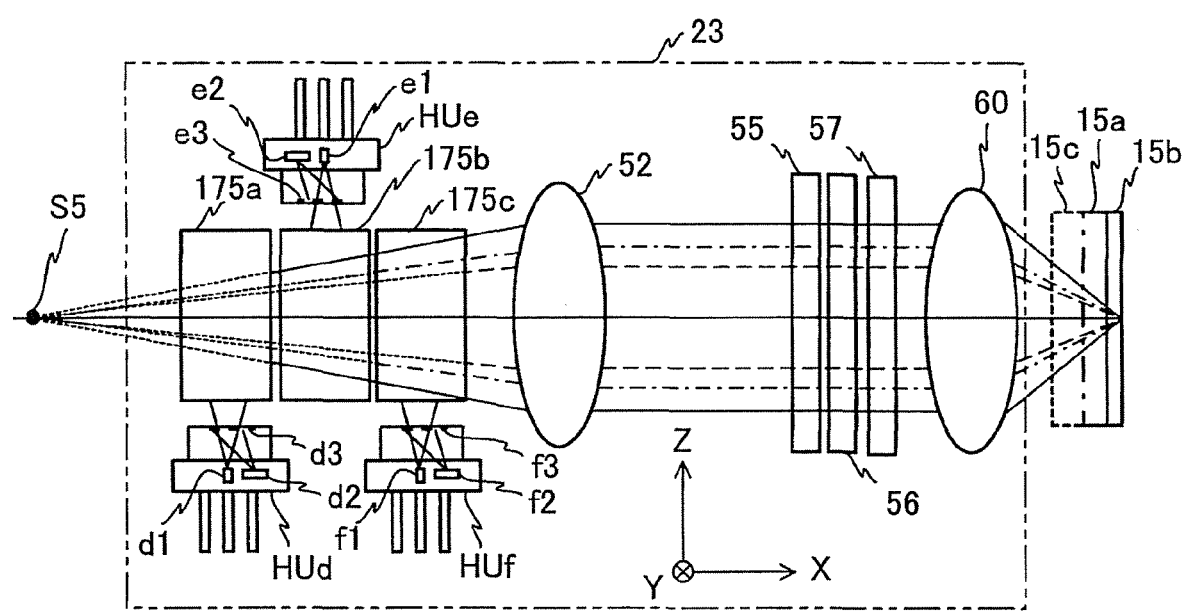
FIG. 23 is a diagram for explaining the optical pickup device in an embodiment of this invention.

As shown in FIG. 23, the optical pickup device 23 of this embodiment comprises three hologram units (HUd, HUe, HUf), three hologram elements (175a, 175b, 175c), a collimating lens 52, a quarter wave plate 55 for three wavelengths, a diffraction optical element 56, an opening wavelength filter 57, an objective lens 60, and the drive system (which is not illustrated) for driving the objective lens 60.

The hologram element 175b is arranged on the +X side of hologram element 175a, and the hologram element 175c is arranged on the +X side of hologram element 175b. The respective hologram elements have mutually different Bragg conditions in which the optical intensity of diffracted light is set to the maximum.

The hologram unit HUd is used when the optical disk is BD, it has the semiconductor laser d1 which emits a laser beam whose wavelength is 405 nm, the photodetector d2, and the polarization hologram d3 and is arranged on the −Z side of hologram element 175a. The semiconductor laser d1 emits the light of P polarization towards the direction of +Z.

The polarization hologram d3 is arranged on the +Z side of semiconductor laser d1, and it is set up so that its diffraction efficiency to P polarization is small and its diffraction efficiency to S polarization is large. The photodetector d2 is arranged near the semiconductor laser d1, and receives the returned light deflected by polarization hologram d3. Therefore, the light emitted from semiconductor laser d1 enters into hologram element 175a through polarization hologram d3.

The light from hologram unit HUd is repeatedly diffracted in the hologram area of hologram element 175a, and is reflected on the border plane repeatedly. And the diffracted light is emitted towards the direction of +X from hologram element 175a.

The diffracted light from hologram element 175a is a diverging light equivalent to the light emitted from the virtual emission point S2. Although the diffracted light from hologram element 175a enters into hologram element 175b and hologram element 175c, it does not satisfy the Bragg conditions and it penetrates them without change.

The hologram unit HUe is used when the optical disk is DVD, and it has the semiconductor laser e1 which emits a laser beam whose wavelength is 660 nm, the photodetector e2, and polarization hologram e3. The hologram unit HUe is arranged on the +Z side of hologram element 75b.

The semiconductor laser e1 emits the light of P polarization towards the direction of −Z. The polarization hologram e3 is arranged on the −Z side of semiconductor laser e1, and it is set up so that its diffraction efficiency to P polarization is small and its diffraction efficiency to S polarization is large. The photodetector e2 is arranged near the semiconductor laser e1, and receives the returned light deflected by polarization hologram e3. Therefore, the light emitted from semiconductor laser e1 enters into hologram element 175 through polarization hologram e3.

The light from hologram unit HUe is repeatedly diffracted in the hologram area of hologram element 175b, and is reflected on the border plane repeatedly. And the diffracted light is emitted towards the direction of +X from hologram element 175b.

The diffracted light from hologram element 175b is a diverging light equivalent to the light emitted from the virtual emission point S2. Although the diffracted light from hologram element 175b enters into hologram element 175c, it does not satisfy the Bragg conditions, and the light penetrates hologram element 75c without change.

The hologram unit HUf is used when the optical disk is CD, and it has the semiconductor laser f1 which emits a laser beam whose wavelength is 780 nm, the photodetector f2, and the polarization hologram f3. This hologram unit HUf is arranged on the −Z side of hologram element 175c.

The semiconductor laser f1 emits the light of P polarization towards the direction of +Z. The polarization hologram f3 is arranged on the +Z side of semiconductor laser f1, and it is set up so that its diffraction efficiency to P polarization is small and its diffraction efficiency to S polarization is large. The photodetector f2 is arranged near the semiconductor laser f1, and receives the returned light deflected by polarization hologram f3. Therefore, the light emitted from semiconductor laser f1 enters into hologram element 175c through polarization hologram f3.

The light from hologram unit HUf is repeatedly diffracted in the hologram area of hologram element 175c, and is reflected on the border plane repeatedly. And the diffracted light is emitted towards the direction of +X from hologram element 175c. The diffracted light from hologram element 175c is a diverging light equivalent to the light emitted from the virtual emission point S2.

The objective lens 60 is optimized to BD. And the aberration to correct the aberration resulting from the difference in the substrate thickness of BD and DVD is added to the hologram element 175b at the time of hologram pattern creation. The aberration to correct the aberration resulting from the difference in the substrate thickness of BD and CD is added to the hologram element 175c at the time of hologram pattern creation.

The collimating lens 52 is arranged on the +X side of hologram element 175c. The quarter wave plate 55, the diffraction optical element 56, the opening wavelength filter 57, and the objective lens 60 are arranged similar to the previously mentioned embodiment.

Operation of the optical pickup device 23 of this embodiment will be explained briefly.

When the optical disk is DVD, the light of the plane polarization emitted from semiconductor laser e1 enters into hologram element 175b through polarization hologram e3, is diffracted by hologram element 175b, and enters into collimating lens 52 through hologram element 175c.

It is converted into the circularly polarized light with quarter wave plate 55, aberration compensation is carried out with diffraction optical element 56, opening restriction is carried out with opening wavelength filter 57, and the diffracted light which is converted into the parallel beam by collimating lens 52 is focused on the recording layer of optical disk 15a as a small spot through objective lens 60.

The reflected light from optical disk 15a is converted into the circularly polarized light in the opposite polarization direction, and it enters into diffraction optical element 56 through objective lens 60 and opening wavelength filter 57 as the returned light.

The returned light which is converted into the parallel beam by the diffraction optical element 56 enters into quarter wave plate 55, so that it is converted into the linearly polarized light which is perpendicular to the outward trip. And this returned light enters into hologram element 175c through collimating lens 52, penetrates hologram element 175c without change, and enters into hologram element 175b.

In the hologram element 175b, the returned light is diffracted in the direction of +Z. The diffracted light from hologram element 175b is deflected by polarization hologram e3, and is received by the photodetector e2.

When the optical disk is the BD disk, the light of the plane polarization emitted from semiconductor laser d1 enters into hologram element 175a through polarization hologram d3, is diffracted by hologram element 175a, and enters into collimating lens 52 through hologram element 175b and hologram element 175c.

It is converted into the circularly polarized light with quarter wave plate 55, and diffraction optical element 56 is penetrated without change, opening restriction is carried out with opening wavelength filter 57, and the diffracted light which is converted into the parallel beam by collimating lens 52 is focused on the recording layer of optical disk 15b as a small spot through objective lens 60.

The reflected light from optical disk 15b is converted into circularly polarized light of the circumference of the contrary, and enters into diffraction optical element 56 through objective lens 60 and opening wavelength filter 57 as the returned light.

The returned light which is converted into the parallel beam by the diffraction optical element 56 enters into quarter wave plate 55, so that it is converted into the linearly polarized light which is perpendicular to the outward trip. And this returned light enters into hologram element 175c through collimating lens 52, it penetrates hologram element 175c without change, enters into hologram element 175b, penetrates hologram element 175b without change, and enters into hologram element 175a.

In the hologram element 175a, the returned light is diffracted in the direction of −Z. The diffracted light from hologram element 175a is deflected by polarization hologram d3, and is received by the photodetector d2.

When the optical disk is CD, the light of the plane polarization emitted from semiconductor laser f1 enters into hologram element 175c through polarization hologram f3, is diffracted by hologram element 175c, and enters into collimating lens 52.

It is converted into the circularly polarized light with quarter wave plate 55, aberration compensation is carried out with diffraction optical element 56, opening restriction is carried out with opening wavelength filter 57, and the diffracted light which is converted into the parallel beam by collimating lens 52 is focused on the recording layer of optical disk 15c as a small spot through objective lens 60.

The reflected light from optical disk 15c is converted into circularly polarized light of the circumference of the contrary, and enters into diffraction optical element 56 through objective lens 60 and opening wavelength filter 57 as returned light.

The returned light which is converted into the parallel beam by the diffraction optical element 56 enters into quarter wave plate 55, so that it is converted into the linearly polarized light which is perpendicular to the outward trip. And this returned light enters into hologram element 175c through collimating lens 52.

In the hologram element 175c, the returned light is diffracted in the direction of −Z. The diffracted light from hologram element 175c is deflected by polarization hologram f3, and is received by the photodetector f2.

In the optical disk device 20 of this embodiment, the light source unit is realized by three light sources (d1, e1, f1) and three hologram elements (175a, 175b, 175c). And the optical detector unit is realized by three hologram elements (175a, 175b, 175c) and three the photodetectors (d2, e2, f2).

As explained above, in the optical pickup device 23 of this embodiment, the volume hologram element 175a which diffracts the light beam from semiconductor laser d1 to send the laser beam to objective lens 60 and which diffracts the returned light through objective lens 60 of the light beam emitted from semiconductor laser d1, the volume hologram element 175b which diffracts the light beam from semiconductor laser e1 to send the laser beam to objective lens 60 and which diffracts the returned light through objective lens 60 of the light beam emitted from semiconductor laser e1, and the volume hologram element 175c which diffracts the light beam from semiconductor laser f1 to send the laser beam to objective lens 60 and which diffracts the returned light through objective lens 60 of the light beam emitted from semiconductor laser c1 are provided. It is possible to attain miniaturization without causing performance decrement.

In this embodiment, the incidence directions of the incident light in the hologram elements which are arranged adjacent to each other are mutually different, and the width of a hologram element may be made smaller than the width of a hologram unit.

Next, a description will be given of the optical pickup device in an embodiment of the invention.

The optical pickup device 23 of this embodiment is an optical pickup device which is adapted to emit the laser light to the three recording layers of optical disk 15 simultaneously and receive the detected light beams from the three recording layers simultaneously.

Figure 24:
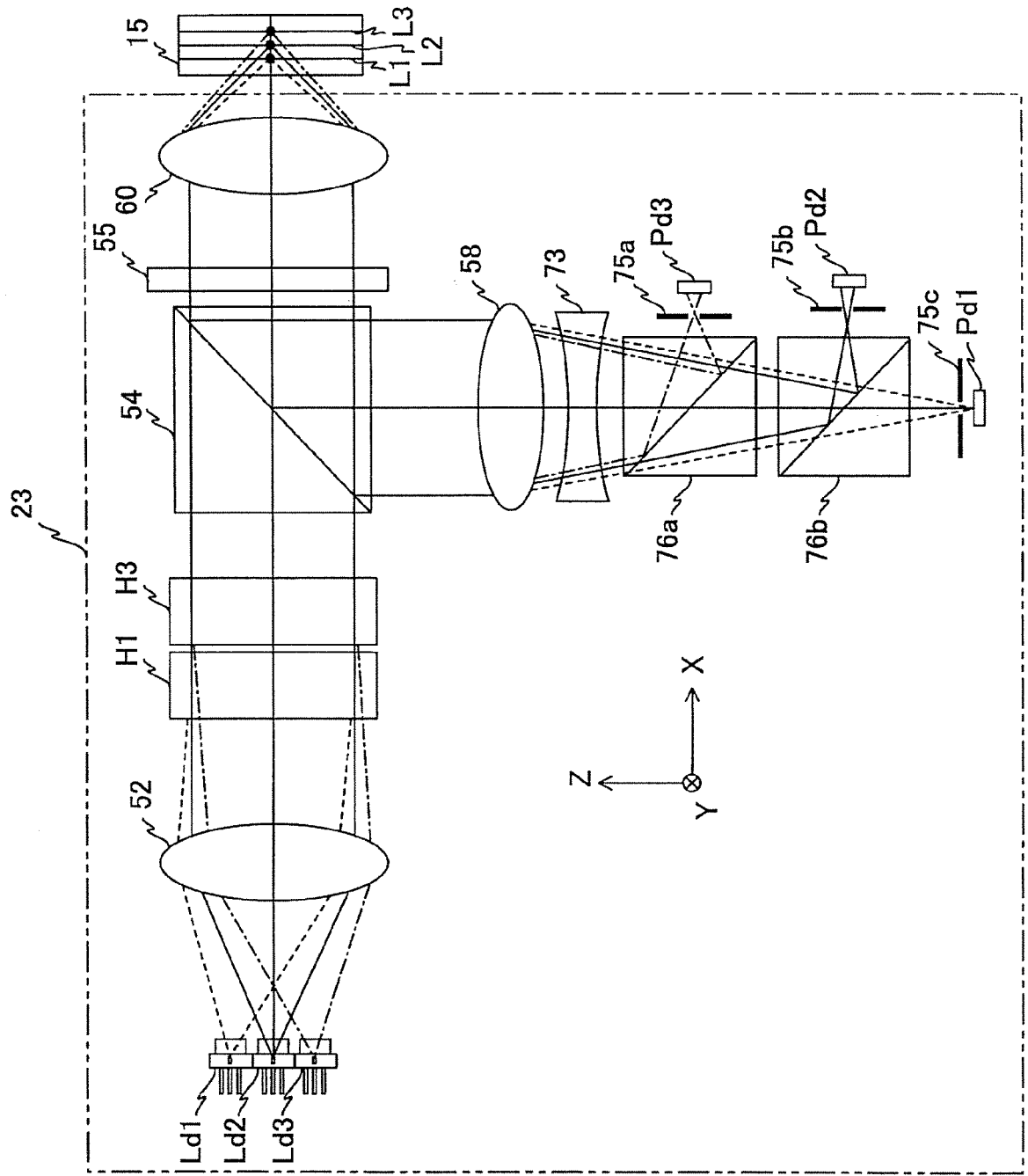
FIG. 24 is a diagram for explaining the optical pickup device in the optical disk device in an embodiment of the invention.

It is assumed that the optical disk 15 is a three-layer disk which has the 1st recording layer (L1), the 2nd recording layer (L2), and the 3rd recording layer (L3) sequentially from the incidence side of a laser beam as shown in FIG. 24. The optical disk 15 is, for example, a DVD-type information recording medium.

As shown in FIG. 24, the optical pickup device 23 of this embodiment comprises three light sources (Ld1, Ld2, Ld3), a collimating lens 52, two hologram elements (H1, H3), a polarization beam splitter 54, a quarter wave plate 55, an objective lens 60, a condenser lens 58, a cylinder lens 73, two half prisms (76a, 76b), three pinholes (75a, 75b, 75c), three photodetectors (Pd1, Pd2, Pd3), and the drive system (which is not illustrated) for driving the objective lens 60.

Each of the three light sources emits a laser beam whose wavelength is 660 nm. The light source Ld2 is arranged on the optical axis of collimating lens 52, the light source Ld1 is arranged on the +Z side of light source Ld2, and the light source Ld3 is arranged on the −Z side of light source Ld2. The each light source emits the light of P polarization for example. All the maximum intensity outgoing radiation directions of the laser beams emitted from the three light sources are the direction of +X.

The collimating lens 52 is arranged on the +X side of each light source, and converts the light emitted from each light source into a generally parallel beam. In this case, when the light emitted from light source Ld1 penetrates the collimating lens 52, it is converted into the slightly inclined parallel beam in the direction of X which is inclined slightly clockwise to the axial direction. When the light which is emitted from light source Ld3 penetrates collimating lens 52, it is converted into the slightly inclined parallel beam in the direction of X which is inclined slightly counterclockwise to the axial direction. When the light which is emitted from light source Ld3 penetrates collimating lens 52, it is converted into the parallel beam.

The hologram elements are all volume hologram elements, which are previously described with reference to FIG. 3. A photo-polymer may be used for the material of each hologram element. This photo-polymer is an organic macromolecule recording material, and it is used in many cases for a WORM (Write Once Read Many) type hologram memory. The performance is sharply improved in recent years by the manufactures, photo-polymer is excellent in the optical property with a thickness of several 100 micrometers, and has succeeded in the development of material which reduces the contraction accompanied with recording.

For example, the low contractility photo-polymer which comprises 2-chemistry-materials, the low contractility photo-polymer which is polymerized using a cation ring polymerization mechanism. As a result, high photo sensitivity and high volume recording density became compatible. By using such photo-polymer for a volume hologram element, an efficient and highly accurate light beam synthesizing means and luminous flux separation means are realizable.

In addition, many thermo-plastics are used for a WORM type hologram memory. Recording and reproduction is possible for thermo-plastic by which especially coloring matter is doped with the light of various wavelengths. Fabrication of several millimeter thickness is possible for the manufacturers, it is excellent in the optical property, and has succeeded in development of thermo-plastic which reduces the contraction accompanying record. As a result, high photo sensitivity and high volume recording density became compatible. Since the material itself is made for the volume hologram element used as the substrate as for such a thermo-plastic, it can realize a light beam synthesizing means and a luminous flux separation means are several millimeter thickness and efficient and highly precise.

As an example, each hologram element which is made of a thermo-plastic is created using the known 2 light-beam interference exposing method.

The hologram element H1 is arranged on the +X side of collimating lens 52, and it is set up so that the light from light source Ld1 through collimating lens 52 may satisfy the Bragg conditions. Therefore, the light from light source Ld1 through collimating lens 52 is diffracted in the direction of +X by hologram element H1. The diffracted light (not illustrated in FIG. 24) emitted from the hologram element H1 is converted into a slightly converging light beam, and when the light from light source Ld2 is focused on the recording layer L2, the degree of that convergence is designed beforehand by the optical parameter so that the light from light source Ld1 may be focused on the recording layer L1.

The light from light source Ld2 and the light from light source Ld3 through collimating lens 52 do not satisfy the Bragg conditions of hologram element H1, and penetrate hologram element H1 without change.

The hologram element H3 is arranged on the +X side of hologram element H1, and it is set up so that the light from light source Ld3 penetrating the hologram element H1 without change may satisfy the Bragg condition. Therefore, the light from light source Ld3 penetrating the hologram element H1 without change is diffracted in the direction of +X by hologram element H3.

The diffracted light (not illustrated in FIG. 24) emitted from the hologram element H3 is converted into a slightly diverging light beam, and when the light from light source Ld2 is focused on the recording layer L2, the degree of that divergence is designed beforehand by the optical parameter so that the light from light source Ld3 may be focused on the recording layer L3.

The light emitted from light source Ld2 and penetrating hologram element H1 without change and the diffracted light from hologram element H1 do not satisfy the Bragg conditions of hologram element H3, and penetrate hologram element H3 without change.

The Bragg conditions of hologram element H1 and hologram element H3 are different from each other, and the hologram elements are arranged along with the direction of the X-axis. Each angle magnification (=sin(the outgoing radiation angle)/sin(the incident angle)) of each hologram element is smaller than 1. Hologram element H3 may be arranged on the +X side of collimating lens 52, and hologram element H1 may be arranged on the +X side of hologram element H3.

The polarization beam splitter 54 is arranged on the +X side of hologram element H3. This polarization beam splitter 54 differs in that reflection factor according to the polarization state of the entering light. The polarization beam splitter 54 has a small reflection factor to P polarization as an example, and it is set up so that the reflection factor to S polarization is large. Therefore, the most part of light from each light source through hologram element H3 can penetrate polarization beam splitter 54.

The quarter wave plate 55 is arranged on the +X side of polarization beam splitter 54, and gives ¼ wave of optical phase difference to incident light. The objective lens 60 is arranged on the +X side of this quarter wave plate 55, and the light through quarter wave plate 55 is focused.

The light from light source Ld1 is focused on the 1st recording layer L1, the light from light source Ld2 is focused on the 2nd recording layer L2, and the light from light source Ld3 is focused on the 3rd recording layer L3. That is, if three light sources are made to emit light simultaneously, light spot can be simultaneously formed in three recording layers of optical disk 15.

The condenser lens 58 is arranged on the −Z side of polarization beam splitter 54, and changes into convergence light the returned light from optical disk 15 reflected in the direction of −Z by polarization beam splitter 54.

The cylinder lens 73 is arranged on the −Z side of condenser lens 58, and gives astigmatism to the light from condenser lens 58. The half prism 76a is arranged on the −Z side of cylinder lens 73, reflects the returned light component from the 3rd recording layer L3 contained in the light through cylinder lens 73 in the direction of +X, and makes the remaining light component penetrate.

The half prism 76b is arranged on the −Z side of half prism 76a, reflects the returned light component from the 2nd recording layer L2 contained in the light penetrating the half prism 76a in the direction of +X, and makes the remaining light component penetrate.

The pinhole 75a is arranged on the +X side of half prism 76a, and the light reflected by half prism 76a enters. The light passing through this pinhole 75a is received by the photodetector Pd3. Therefore, the light received by the photodetector Pd3 is mainly the returned light from the 3rd recording layer L3.

The pinhole 75b is arranged on the +X side of half prism 76b, and the light reflected by half prism 76b enters. The light passing through this pinhole 75b is received by the photodetector Pd2. Therefore, the light received by the photodetector Pd2 is mainly the returned light from the 2nd recording layer L2.

The pinhole 75c is arranged on the −Z side of half prism 76b, and the light penetrating the half prism 76b enters. The light passing through this pinhole 75c is received by the photodetector Pd1. Therefore, the light received by the photodetector Pd1 is mainly the returned light from the 1st recording layer L1.

The drive system has a tracking actuator for carrying out a very small movement of the objective lens 60 in the focusing direction which is an optical axis direction of objective lens 60, and a focusing actuator for carrying out a very small movement of the objective lens 60 in the tracking direction.

Operation of the optical pickup device 23 of this embodiment will be explained briefly.

After the light of the plane polarization (P polarization) emitted from light source Ld1 is converted into the parallel beam by collimating lens 52, it is diffracted by hologram element H1, penetrates hologram element H3 without change, and enters into polarization beam splitter 54.

After the light of the plane polarization (P polarization) emitted from light source Ld2 is converted into the parallel beam by collimating lens 52, it penetrates hologram element H1 and hologram element H3 without change, and enters into polarization beam splitter 54.

After the light of the plane polarization (P polarization) emitted from light source Ld3 is converted into the parallel beam by collimating lens 52, it penetrates hologram element H1 without change, is diffracted by hologram element H3, and enters into polarization beam splitter 54.

The most part of the light which entered into polarization beam splitter 54 penetrates polarization beam splitter 54 without change, it is converted into the circularly polarized light by quarter wave plate 55, and is focused on each recording layer of optical disk 15 through objective lens 60.

The received light from each recording layer of optical disk 15 is converted into the circularly polarized light in the opposite polarization direction, and the returned light enters into quarter wave plate 55 through objective lens 60 so that it is converted into the linearly polarized light (S polarization) which is perpendicular to the outward trip. And this returned light enters into polarization beam splitter 54.

The returned light reflected in the direction of −Z enters into half prism 76a through condenser lens 58 and cylinder lens 73 by polarization beam splitter 54. It is reflected by half prism 76a, and the returned light component from the 3rd recording layer L3 contained in returned light is received by the photodetector Pd3 through pinhole 75a.

The returned light penetrating the half prism 76a enters into half prism 76b. It is reflected by half prism 76b, and the returned light component from the 2nd recording layer L2 contained in this returned light is received by the photodetector Pd2 through pinhole 75b.

The returned light penetrating the half prism 76b is received by the photodetector Pd1 through pinhole 75c.

Each pinhole is provided in order to remove the cross talk between the recording layers of the disk.

Each photodetector is constituted including two or more photodetector elements (or two or more light receiving areas) which output the signal containing the wobble signal information, the playback data information, the focal error information, truck error information, etc. like the usual optical disk device. Each photodetector (or each light receiving area) generates the signal according to light receiving quantity by photoelectric conversion, respectively, and outputs it to the playback signal processing circuit 28.

Referring back to FIG. 1, the playback signal processing circuit 28 acquires servo signals (a focus error signal, a track error signal, etc.), address information, synchronization information, an RF signal, etc. based on the output (two or more photoelectric conversion signals) of each photodetector of the optical pickup device 23.

The servo signal acquired is outputted to the control circuit 26, the address information is outputted to the CPU 40, and the synchronizing signal is outputted to the encoder 25, the drive control circuit 26, etc.

The playback signal processing circuit 28 performs decoding processing, error detection processing, etc. to the RF signal. When an error is detected, it performs error correction processing, and stores the resulting signal in the buffer RAM 34 through the buffer manager 37 as the playback data. The address information contained in the playback data is outputted to the CPU 40.

Based on the servo signal from the playback signal processing circuit 28, the drive control circuit 26 generates the driving signal of the drive system, and outputs it to the optical pickup device 23. Thereby, tracking control and focus control are performed.

The drive control circuit 26 generates the driving signal for driving the seek motor 21, and the driving signal for driving the spindle motor 22 based on the instructions of the CPU 40. The driving signal of each motor is outputted to seek motor 21 and spindle motor 22.

The data (the recorded data) recorded on optical disk 15, and the data (the playback data) reproduced from optical disk 15 are temporarily stored in the buffer RAM 34. The input/output of the data of the buffer RAM 34 is managed by buffer manager 37.

Based on the instructions of the CPU 40, the encoder 25 acquires the recorded data stored in the buffer RAM 34 through buffer manager 37, performs modulation of data, addition of an error correction code, etc., and generates the write signal to optical disk 15. The write signal generated is outputted to the laser control circuit 24.

The laser control circuit 24 controls the emission power of each light source of the optical pickup device 23. For example, in the case of recording, the driving signal of each light source is generated by the laser control circuit 24 based on the write signal, the recording condition, the luminescence characteristics of each light source, etc.

The interface 38 is a bidirectional communication interface to the host device 90 (for example, a personal computer). It is based on standard interfaces, such as ATAPI (AT Attachment Packet Interface), SCSI (Small Computer System Interface), and USB (Universal Serial Bus). The various programs described in code decipherable in the CPU 40, the luminescence characteristics of each light source, etc. are stored in the flash memory 39.

The light source unit is realized by the three light sources (Ld1, Ld2, Ld3) and the two hologram elements (H1, H3) in the optical pickup device 23 of this embodiment.

According to the optical pickup device 23 of this embodiment, the three light sources (Ld1, Ld2, Ld3) and the hologram element H1 made to penetrate without change, without diffracting the light from light source Ld1 in the direction of +X, and diffracting the light from light sources Ld2 and Ld3, the light from light source Ld3 penetrating the hologram element H1 without change is diffracted in the direction of +X, and it has hologram element H3 which makes the light from light source Ld2 and the diffracted light from hologram element H1 penetrating the hologram element H1 penetrate without change, and hologram element H1 and hologram element H3, the plane of incidence of an incoming light and the plane of outgoing radiation of a diffracted light are in parallel, the volume hologram elements arranged along with the optical paths between the three light sources (Ld1, Ld2, Ld3) and the objective lenses 60. Therefore, the illumination system can be miniaturized without reducing efficiency for light utilization, and therefore it is possible to attain miniaturization without causing performance decrement.

It is possible to attain miniaturization without reducing the access accuracy to the optical disk which has two or more recording layers.

According to the optical disk device 20 of this embodiment, since recording in the 1st recording layer L1, recording in the 2nd recording layer L2, and recording in the 3rd recording layer L3 can be performed almost simultaneously, it is possible to perform recording processing to the optical disk quickly.

According to optical disk device 20 of this embodiment, since playback from the 1st recording layer L1, playback from the 2nd recording layer L2, and playback from the 3rd recording layer L3 can be performed almost simultaneously, it is possible to perform playback processing from the optical disk quickly.

In the above-mentioned embodiment, it is also possible to perform recording and reproduction almost simultaneous. For example, information is renewable from the 2nd recording layer L2, recording the information on the 1st recording layer L1.

Next, a description will be given of the optical pickup device in an embodiment of this invention.

Figure 25:
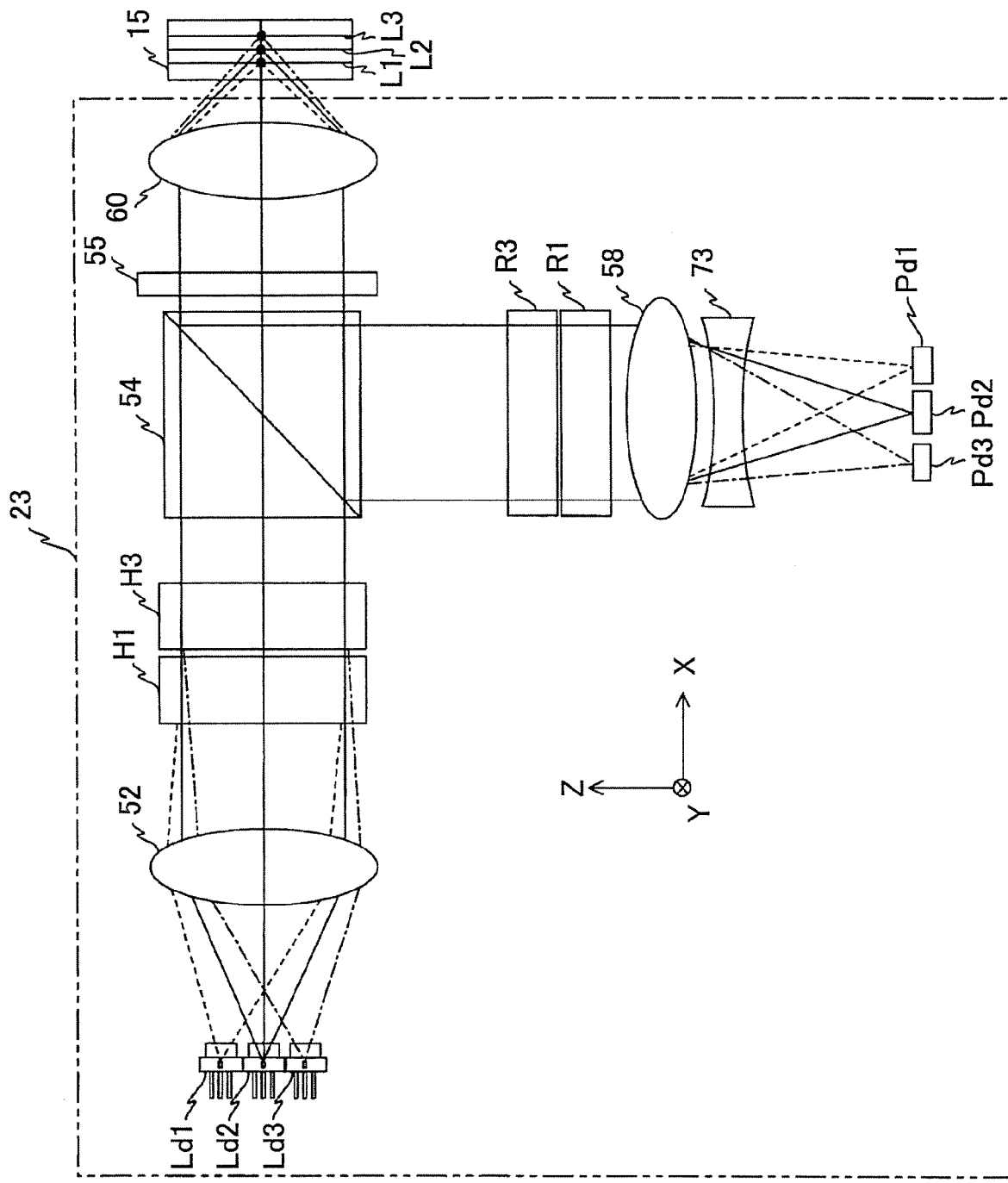
FIG. 25 is a diagram for explaining modification of the optical pickup device of FIG. 24.

In this embodiment, as shown in FIG. 25, it may replace with the half prism 76a and the half prism 76b, and two hologram elements (R3, R1) may be arranged on the optical path of the returned light between the polarization beam splitter 54 and the condenser lens 58.

The hologram element R3 and the hologram element R1 have mutually different Bragg conditions, and both are the volume hologram elements in which the plane of incidence of the incoming light and the plane of outgoing radiation of the diffracted light are in parallel.

The hologram element R3 is arranged on the −Z side of polarization beam splitter 54, and the returned light component from the 3rd recording layer L3 contained in the returned light reflected in the direction of −Z by polarization beam splitter 54 is set up satisfy the Bragg condition.

Therefore, the returned light component from the 3rd recording layer L3 contained in the returned light is diffracted by hologram element R3.

The diffracted light (which is not illustrated in FIG. 25) emitted from this hologram element R3 is inclined slightly to the optical axis of the condenser lens 58. Hologram element R3 has a function which corrects the aberration resulting from the difference of the position of the 2nd recording layer L2 to objective lens 60, and the position of the 3rd recording layer L3.

The returned light component from the 1st recording layer L1 and the returned light component from the 2nd recording layer L2 which are contained in the returned light reflected in the direction of −Z by polarization beam splitter 54 do not satisfy the Bragg conditions of hologram element R3, but penetrate hologram element R3 without change.

The hologram element R1 is arranged on the −Z side of hologram element R3, and the returned light component from the 1st recording layer L1 contained in the returned light penetrating the hologram element R3 is set up satisfy the Bragg condition. Therefore, the returned light component from the 1st recording layer L1 contained in returned light is diffracted by hologram element R1.

The diffracted light (not illustrated in FIG. 25) emitted from the hologram element R1 is inclined slightly to the optical axis of the condenser lens 58.

The hologram element R1 has a function which corrects the aberration resulting from the difference of the position of the 2nd recording layer L2 to objective lens 60, and the position of the 1st recording layer L1.

The returned light component from the 2nd recording layer L2 contained in the returned light penetrating the diffracted light and hologram element R3 from hologram element R3 does not satisfy the Bragg conditions of hologram element R1, but penetrates hologram element R1 without change.

Thereby, each photodetector can be arranged on the same field, and a normal focal signal can be generated at small detection spot. That is, the photodetector Pd3 is arranged on the −X side of the photodetector Pd2, and the photodetector Pd1 is arranged on the +X side of the photodetector Pd2.

In this case, the optical detector unit is realized by the two hologram elements (R3, R1) and the three photodetectors (Pd1, Pd2, Pd3). And the respective pinholes are unnecessary. In this case, hologram element R1 may be arranged on the −Z side of polarization beam splitter 54, and hologram element R3 may be arranged on the −Z side of hologram element R1.

Therefore, the detection system can be miniaturized without reducing efficiency for light utilization, and therefore it is possible to attain the miniaturization of an optical pickup device without causing performance decrement further.

Although the above-mentioned embodiment is explained with respect to the case where the number of light sources is three, the invention is not limited to this embodiment. Although the above-mentioned embodiment is explained with respect to the case where there are three recording layers of the optical disk 15, the invention is not limited to this embodiment.

In the above-mentioned embodiment, high order spherical aberration may be added to the information light used when creating each hologram element. It is also possible to correct spherical aberration completely. The aberration resulting from the shift of objective lens 60 at the time of tracking control may be added to the information light. In this case, corresponding to the light source Ld2, the hologram element to which the aberration compensation function mentioned above is added may be provided.

Next, a description will be given of the optical pickup device in an embodiment of this invention.

This embodiment is characterized in using a hologram unit instead of each light source in the previously mentioned embodiment respectively.

The composition of the optical disk device except the optical pickup device is the same as that of the above-mentioned embodiment.

As shown in FIG. 26, the optical pickup device 23 of this embodiment comprises three hologram units (HU1, HU2, HU3), two hologram elements (H11, H31), a collimating lens 52, a quarter wave plate 55, an objective lens 60, and the drive system (which is not illustrated) for driving the objective lens 60.

Figure 27C:
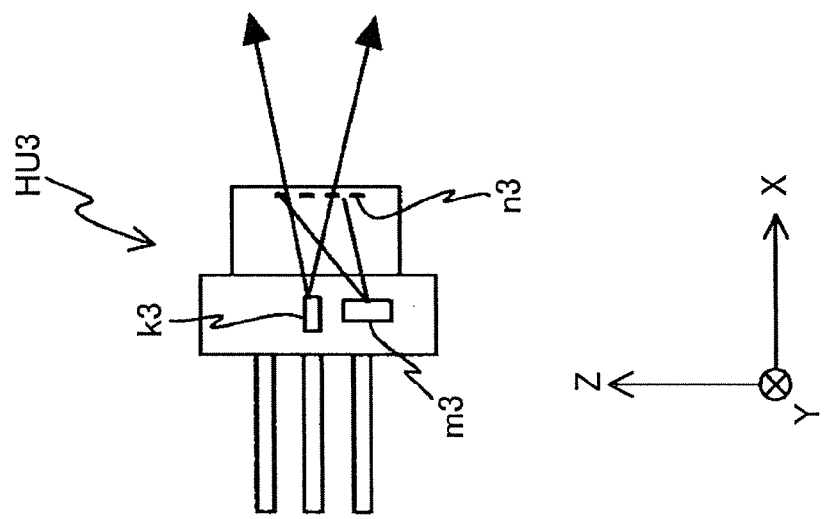
FIG. 27A, FIG. 27B and FIG. 27C are diagrams for explaining the hologram unit in FIG. 26.

Each hologram unit is a hologram unit having the same characteristics respectively. As shown in FIG. 27A, the hologram unit HU2 has the light source k2 which emits a laser beam whose wavelength is 660 nm, the photodetector m2, and the polarization hologram n2, and this hologram unit is arranged on the optical axis of collimating lens 52.

The light source k2 emits the light of P polarization. The polarization hologram n2 is arranged on the +X side of light source k2, and it is set up so that its reflection factor to P polarization is small and its reflection factor to S polarization is large.

The photodetector m2 is arranged near the light source k2, and receives the returned light deflected by polarization hologram n2. Therefore, the light emitted from light source k2 enters into collimating lens 52 through polarization hologram n2.

Figure 27B:
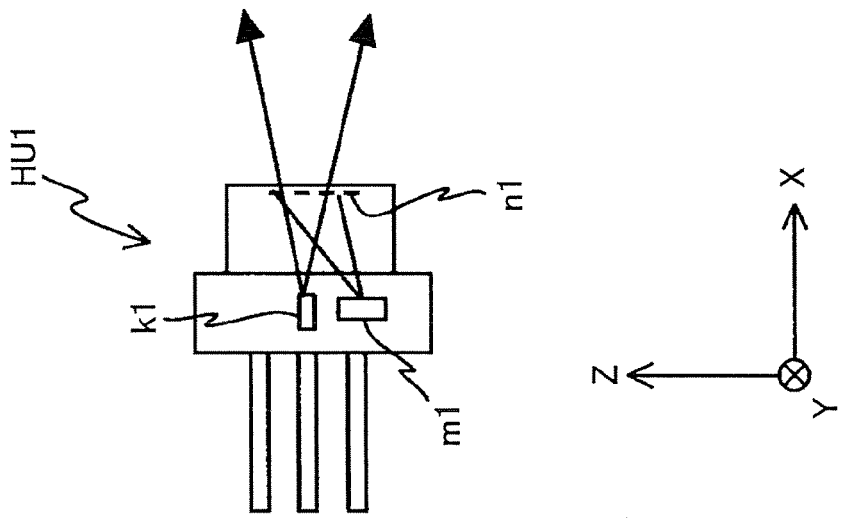
Figure 27A:
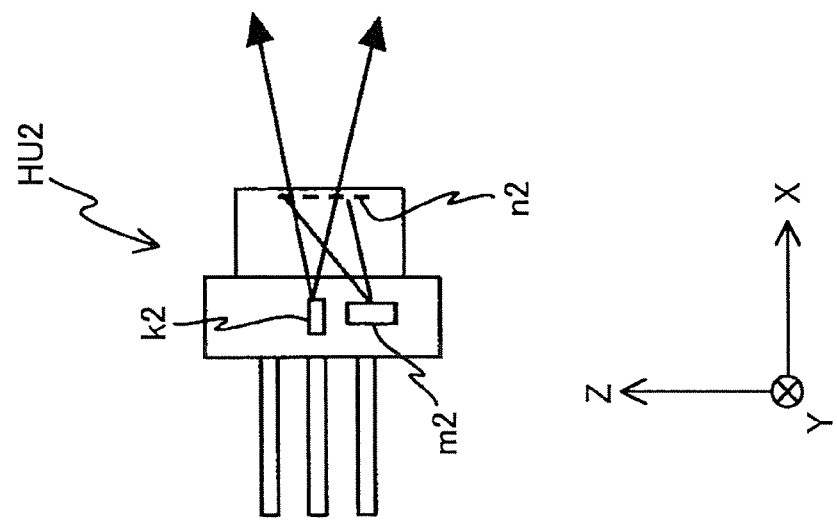

As shown in FIG. 27B, the hologram unit HU1 has the light source k1 which emits a laser beam whose wavelength is 660 nm, the photodetector m1, and the polarization hologram n1, and this hologram unit is arranged on the +Z side of hologram unit HU2.

The light source k1 emits the light of P polarization. The polarization hologram n1 is arranged on the +X side of light source k1, and it is set up so that its reflection factor to P polarization is small and its reflection factor to S polarization is large.

The photodetector m1 is arranged near the light source k1, and receives the returned light deflected by polarization hologram n1. Therefore, the light emitted from light source k1 enters into collimating lens 52 through polarization hologram n1.

As shown in FIG. 27C, the hologram unit HU3 has the light source k3 which emits a laser beam whose wavelength is 660 nm, the photodetector m3, and the polarization hologram n3, and this hologram unit is arranged on the −Z side of hologram unit HU2.

The light source k3 emits the light of P polarization. The polarization hologram n3 is arranged on the +X side of light source k3, and it is set up so that its reflection factor to P polarization is small and its reflection factor to S polarization is large.

The photodetector m3 is arranged near the light source k3, and receives the returned light deflected by polarization hologram n3. Therefore, the light emitted from light source k3 enters into collimating lens 52 through polarization hologram n3.

The hologram element H11 and the hologram element H31 have mutually different Bragg conditions, and both are the volume hologram elements in which the plane of incidence of the incoming light and the plane of outgoing radiation of the diffracted light. Each angle magnification of each hologram element is smaller than 1. A thermo-plastic or photo-polymer is used for the material, and each hologram element is created using the known 2 light-beam interference exposing method.

The hologram element H11 is arranged on the +X side of collimating lens 52, and it is set up so that the light from hologram unit HU1 through collimating lens 52 may satisfy the Bragg condition. Therefore, the hologram element H11 diffracts the light from hologram unit HU1 through collimating lens 52.

The diffracted light (not illustrated in FIG. 26) from this hologram element H11 is converted into the slightly converging light beam which is inclined slightly to the optical axis of objective lens 60. The degree of the convergence is beforehand designed by the optical parameter so that the light from hologram unit HU1 may be focused on the recording layer L1, and the light from hologram unit HU2 may be focused on the recording layer L2.

The hologram element H11 has a function which corrects the aberration resulting from the difference between the position of the 2nd recording layer L2 and the position of the 1st recording layer L1 to the objective lens 60.

The light from hologram unit HU2 and the light from hologram unit HU3 through collimating lens 52 do not satisfy the Bragg conditions of hologram element H11, and they penetrate hologram element H11 without change.

The hologram element H31 is arranged on the +X side of hologram element H11, and it is set up so that the light from hologram unit HU3 penetrating the hologram element H11 may satisfy the Bragg conditions. Therefore, the hologram element H31 diffracts the light from hologram unit HU3 penetrating the hologram element H11.

The diffracted light (not illustrated in FIG. 26) from this hologram element H31 is converted into the slightly diverging light beam which is inclined slightly to the optical axis of objective lens 60. The degree of the divergence is beforehand designed by the optical parameter so that the light from hologram unit HU2 may be focused on the recording layer L2, and the light from hologram unit HU3 may be focused on the recording layer L3.

The hologram element H31 has a function which corrects the aberration resulting from the difference between the position of the 2nd recording layer L2 and the position of the 3rd recording layer L3 to objective lens 60.

The light from hologram unit HU2 and penetrating hologram element H11 and the diffracted light from hologram element H11 do not satisfy the Bragg conditions of hologram element H31, and they penetrate hologram element H31 without change.

The quarter wave plate 55 is arranged on the +X side of hologram element H31, and the objective lens 60 is arranged on the +X side of the quarter wave plate 55.

Operation of the optical pickup device 23 of this embodiment will be explained briefly.

The light of the plane polarization (P polarization) emitted from light source k1 enters into collimating lens 52 through polarization hologram n1, and it is diffracted by hologram element H11, penetrates hologram element H31 without change, and enters into quarter wave plate 55.

And it is converted into the circularly polarized light by quarter wave plate 55, and the light is focused on recording layer L1 of optical disk 15 through objective lens 60.

The light of the plane polarization (P polarization) emitted from light source k2 enters into collimating lens 52 through polarization hologram n2, penetrates hologram element H11 and hologram element H31 without change, and enters into quarter wave plate 55.

And the light is converted into the circularly polarized light by quarter wave plate 55, and the light is focused on recording layer L2 of optical disk 15 through objective lens 60.

The light of the plane polarization (P polarization) emitted from light source k3 enters into collimating lens 52 through polarization hologram n3, and penetrates hologram element H11 without change, is diffracted by hologram element H31, and enters into quarter wave plate 55.

And the light is converted into the circularly polarized light by quarter wave plate 55, and the light is focused on recording layer L3 of optical disk 15 through objective lens 60.

Thus, if each light source is made to emit light simultaneously, light spots can be simultaneously formed on the respective recording layers.

However, unlike the previously mentioned embodiment, the positions of each light spot in the direction of the Z-axis differ mutually. That is, each light spot differs in the distance from the center of rotation of the optical disk 15 mutually.

The received light from optical disk 15 is converted into the circularly polarized light in the opposite polarization direction, and the returned light enters into quarter wave plate 55 through objective lens 60, so that it is converted into the linearly polarized light (S polarization) which is perpendicular to the outward trip. And this returned light enters into hologram element H31, and the returned light component from the 3rd recording layer L3 contained in returned light is diffracted. This diffracted light is inclined slightly to the optical axis of collimating lens 52.

The returned light through hologram element H31 enters into hologram element H11, and the returned light component from the 1st recording layer L1 contained in returned light is diffracted. This diffracted light is inclined slightly to the optical axis of collimating lens 52.

The returned light through hologram element H11 enters into collimating lens 52. The returned light component (light diffracted by hologram element H31) from the 3rd recording layer L3 contained in the returned light which entered into collimating lens 52 is emitted from collimating lens 52 towards hologram unit HU3, and is received by the photodetector m3 through polarization hologram n3.

The returned light component (light diffracted by hologram element H11) from the 1st recording layer L1 contained in the returned light which entered into collimating lens 52 is emitted from collimating lens 52 towards hologram unit HU1, and is received by the photodetector m1 through polarization hologram n1.

The returned light component (light penetrating the each hologram element) from the 2nd recording layer L2 contained in the returned light which entered into collimating lens 52 is emitted from collimating lens 52 towards hologram unit HU2, and is received by the photodetector m2 through polarization hologram n2.

The respective photodetectors are constituted like the previously mentioned embodiment, and each outputs the signal according to the light receiving quantity to the playback signal processing circuit 28.

As explained above, in the optical pickup device 23 of this embodiment, the three light sources (k1, k2, k3), the hologram element H11 which diffracts the light from light sources k1 in the direction facing to the objective lens 60, and which diffracts the returned light through objective lens 60 of the light emitted from light source k1 in the direction facing to the photodetector m1, and the hologram element H31 which diffracts the light from light source k3 in the direction facing to the objective lens 60, and which diffracts the returned light through objective lens 60 of the light emitted from light source k3 in the direction facing to the photodetector m3 are provided. Each hologram element is a volume hologram element in which the plane of incidence of the incoming light and the plane of outgoing radiation of the diffracted light are in parallel, and each volume hologram element is arranged along with the direction of the X-axis. Thereby, the miniaturization of an optical pickup device and an optical disk device can be further promoted rather than the previously mentioned embodiment.

Figure 28:
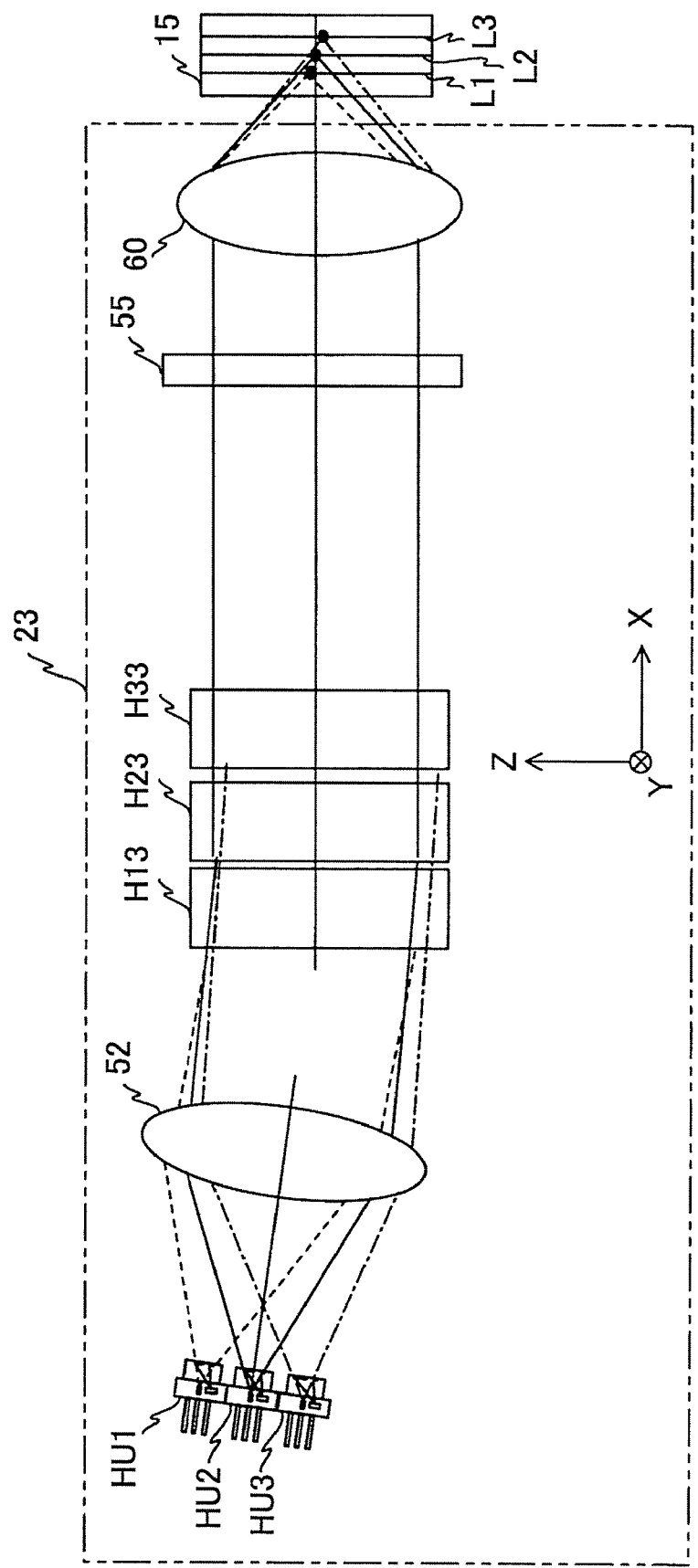
FIG. 28 is a diagram for explaining modification of the optical pickup device of FIG. 26.

In the above embodiment, when it is necessary to correct the aberration of the light from the hologram unit HU2, as shown in FIG. 28, three hologram elements (H13, H23, H33) corresponding to the hologram units (HU1, HU2, HU3) may be used instead of the two hologram elements (H11, H31). In this case, the maximum intensity outgoing radiation direction of the light emitted from each light source as an example in the light from a corresponding hologram unit in order to separate the 0th light and primary diffracted light is made to incline to the optical axis of the objective lens 60 by all the hologram elements.

The hologram elements (H13, H23, H33) differ in the Bragg conditions mutually, and they are the volume hologram elements in which the plane of incidence of the incoming light and the plane of outgoing radiation of the diffracted light are in parallel.

The hologram element H13 is arranged on the +X side of collimating lens 52, and it is set up so that the light from hologram unit HU1 through collimating lens 52 may satisfy the Bragg condition. Therefore, the hologram element H13 diffracts the light from hologram unit HU1 through collimating lens 52. The diffracted light (not illustrated in FIG. 28) emitted from this hologram element H13 is converted into the slightly converging light beam, which is inclined slightly to the optical axis of objective lens 60, and the degree of the convergence is beforehand designed by the optical parameter so that the light from hologram unit HU13 may be focused on the recording layer L1, and the light from hologram unit HU2 may be focused on the recording layer L2.

The hologram element H13 has a function which corrects the aberration resulting from the difference of the position of the 2nd recording layer L2 to objective lens 60, and the position of the 1st recording layer L1.

The light from hologram unit HU2 and the light from hologram unit HU3 through collimating lens 52 do not satisfy the Bragg conditions of hologram element H13, and penetrates the hologram element H13 without change.

The hologram element H23 is arranged on the +X side of hologram element H13, and it is set up so that the light from hologram unit HU2 penetrating the hologram element H13 may satisfy the Bragg conditions. Therefore, the hologram element H23 diffracts the light from hologram unit HU2 penetrating the hologram element H13.

The diffracted light emitted from this hologram element H23 is converted into the light parallel to the optical axis of objective lens 60. That is, the angle magnification of hologram element H23 is set to 0.

The light from hologram unit HU3 penetrating hologram element H13 and the diffracted light from hologram element H13 do not satisfy the Bragg conditions of hologram element H23, and they penetrate hologram element H23 without change.

The hologram element H33 is arranged on the +X side of hologram element H23, and it is set up so that the light from hologram unit HU3 penetrating the hologram element H23 may satisfy the Bragg condition. Therefore, the hologram element H33 diffracts the light from hologram unit HU3 penetrating the hologram element H23.

The diffracted light (not illustrated in FIG. 28) emitted from this hologram element H33 is inclined slightly to the optical axis of objective lens 60, it becomes the slightly diverging light beam, and the degree of the emission when the light from hologram unit HU2 is focused on the recording layer L2, is beforehand designed by the optical parameter so that the light from hologram unit HU3 may be focused on the recording layer L3.

The hologram element H33 has a function which corrects the aberration resulting from the difference of the position of the 2nd recording layer L2 to objective lens 60, and the position of the 3rd recording layer L3. No diffracted light from hologram element H13 and diffracted light from hologram element H23 satisfy the Bragg conditions of hologram element H33, but penetrate hologram element H33 without change.

The light source is not limited to three pieces as in this embodiment. And the number of the recording layers of optical disk 15 is not limited to three layers as in this embodiment.

Next, a description will be given of the optical pickup device in an embodiment of this invention.

Unlike the previously mentioned embodiment, this embodiment is characterized in forming two or more light spots on the same recording layer simultaneously.

The composition of the optical disk device except the optical pickup device and the portions of data processing and signal processing is essentially the same as that of the previously mentioned embodiment.

Figure 29:
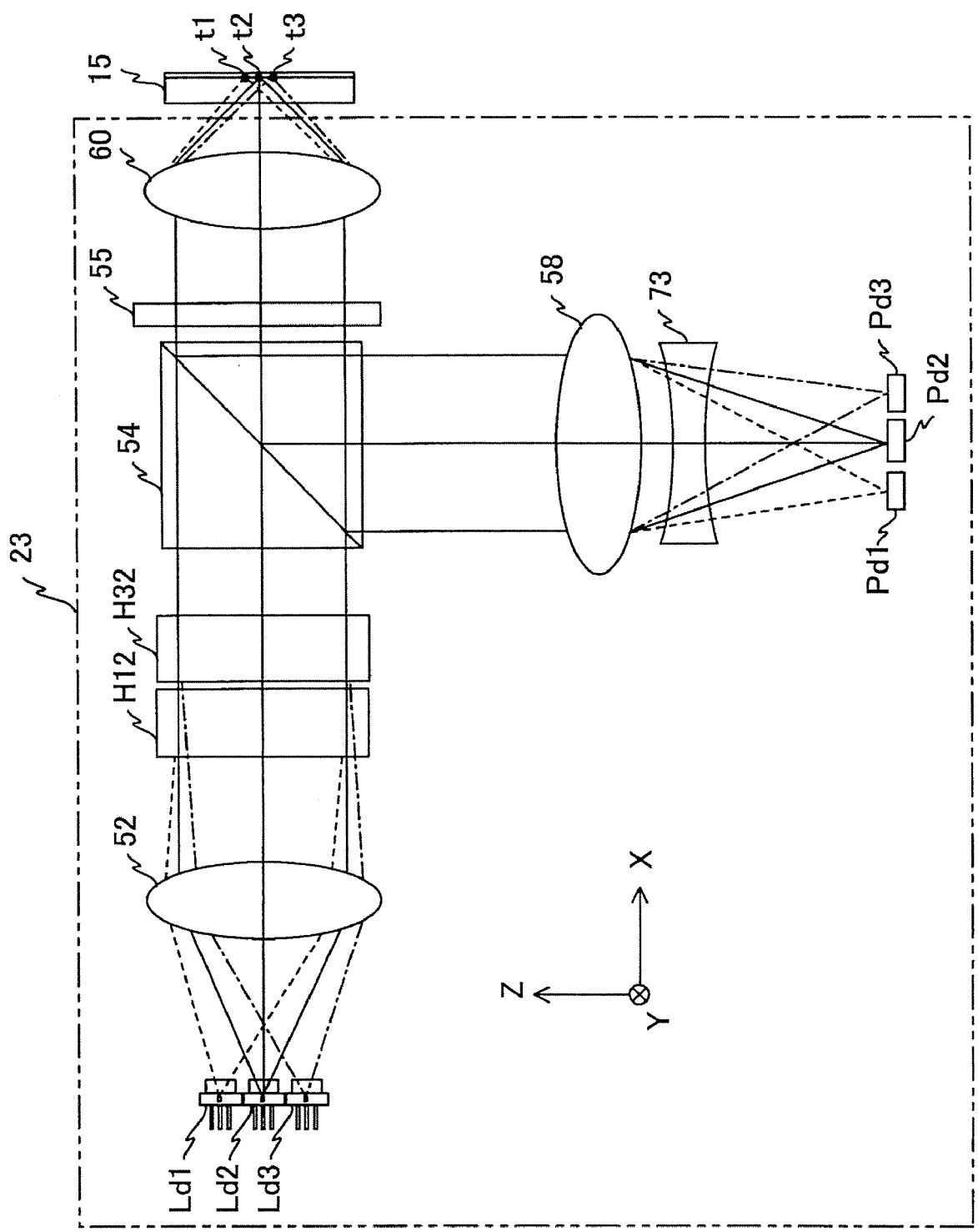
FIG. 29 is a diagram for explaining the optical pickup device in an embodiment of the invention.

As shown in FIG. 29, the optical pickup device 23 of this embodiment comprises three light sources (Ld1, Ld2, Ld3), two hologram elements (H12, H32), a collimating lens 52, three photodetectors (Pd1, Pd2, Pd3), a polarization beam splitter 54, a quarter wave plate 55, an objective lens 60, a condenser lens 58, a cylinder lens 73, and the drive system (which is not illustrated) for driving the objective lens 60.

Each of the light sources emits a laser beam whose wavelength is 660 nm. The light source Ld2 is arranged on the optical axis of collimating lens 52, the light source Ld1 is arranged on the +Z side of light source Ld2, and the light source Ld3 is arranged on the −Z side of light source Ld2.

Each light source emits the light of P polarization. The maximum intensity outgoing radiation direction of the laser beam emitted from each light source is the direction of +X.

Figure 30A:
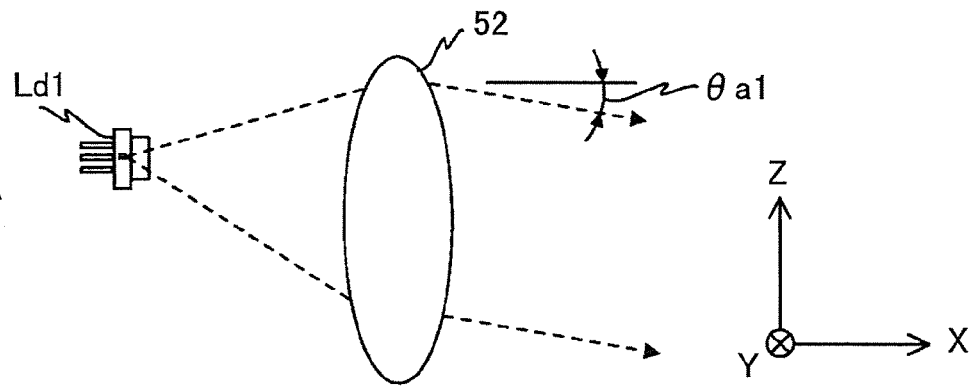
FIG. 30A, FIG. 30B and FIG. 30C are diagrams for explaining the light emitted from each hologram unit in FIG. 29.
Figure 30B:
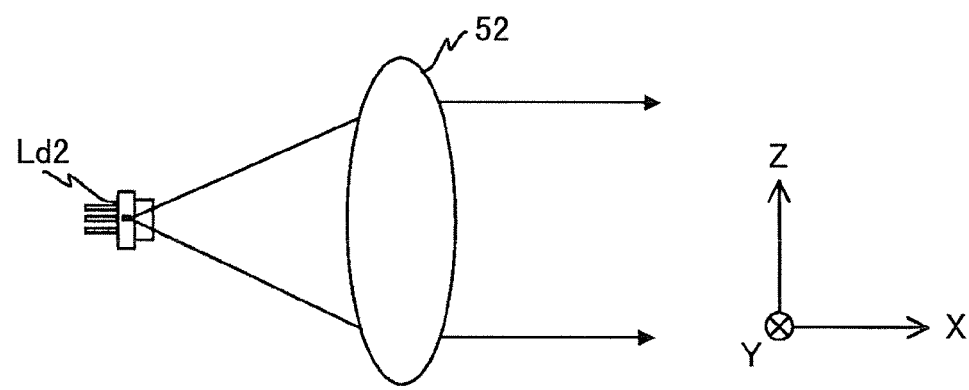
Figure 30C:
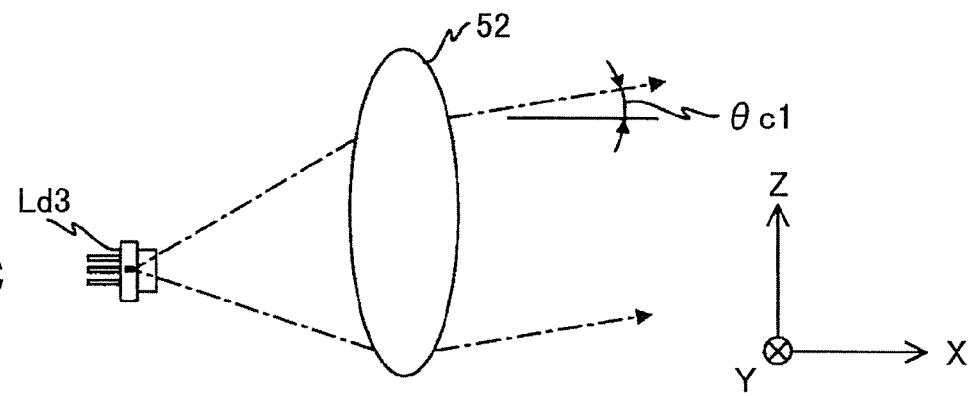

The collimating lens 52 is arranged on the +X side of each light source, and converts the light from each light source into a generally parallel beam. As shown in FIG. 30A, if the light emitted from light source Ld1 penetrates collimating lens 52, the light is converted into a generally parallel light which is inclined by +θa1 clockwise to the axial direction of X. As shown in FIG. 30B, if the light emitted from light source Ld2 penetrates collimating lens 52, the light is converted into the parallel beam in the direction of the X-axis. As shown in FIG. 30C, if the light emitted from light source Ld3 penetrates collimating lens 52, it is converted into a generally parallel light which is inclined by −θc1 counterclockwise to the direction of the X-axis.

In this specification, clockwise inclination is made into positive (+) and counterclockwise inclination is made into negative (−).

The hologram element H12 and the hologram element H32 have mutually different Bragg conditions, and both are the volume hologram elements in which the plane of incidence of the incoming light and the plane of outgoing radiation of the diffracted light are in parallel. The hologram element H12 is arranged on the +X side of collimating lens 52, and hologram element H32 is arranged on the +X side of hologram element H12.

A thermo-plastic or photo-polymer is used for the material of each hologram element, and each hologram element is created using the known 2 light-beam interference exposing method. For example, the hologram element Hm in which the hologram pattern is not formed yet as shown in FIG. 31A, while entering the left side (direction where it received horizontal and by +θa1 inclined) reference light Lr of hologram element Hm, the information light Li is entered from the left side (direction where it received horizontally and −θa2 inclined) of hologram element Hm, and hologram element H12 is created by forming a hologram pattern in the inside of hologram element Hm. Rather than the optical axis of collimating lens 52, the light source Ld1 gives the same aberration as the aberration by being arranged on the +Z side to reference light Lr, and it makes information light Li non-aberration.

That is, hologram element H12 can correct the aberration by light source Ld1 being arranged rather than the optical axis of collimating lens 52 at the +Z side.

Figure 31B:
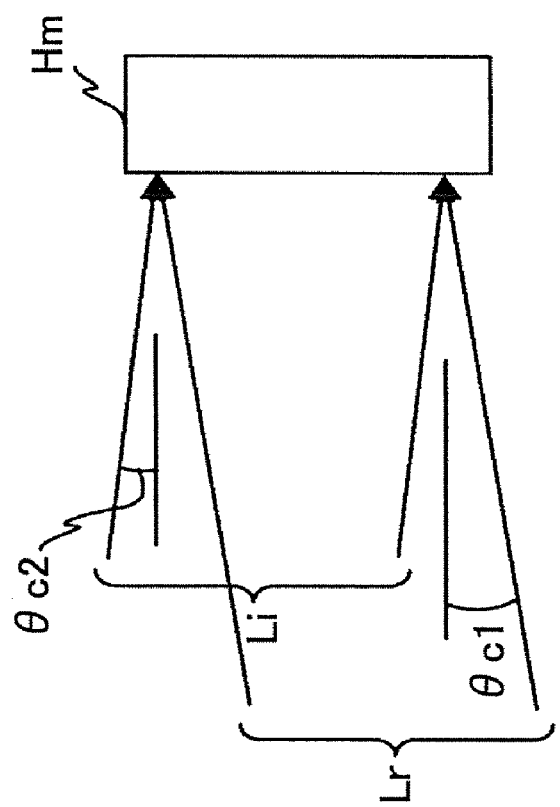
FIG. 31A and FIG. 31B are diagrams for explaining the preparation method of each hologram element in FIG. 29.
Figure 31A:
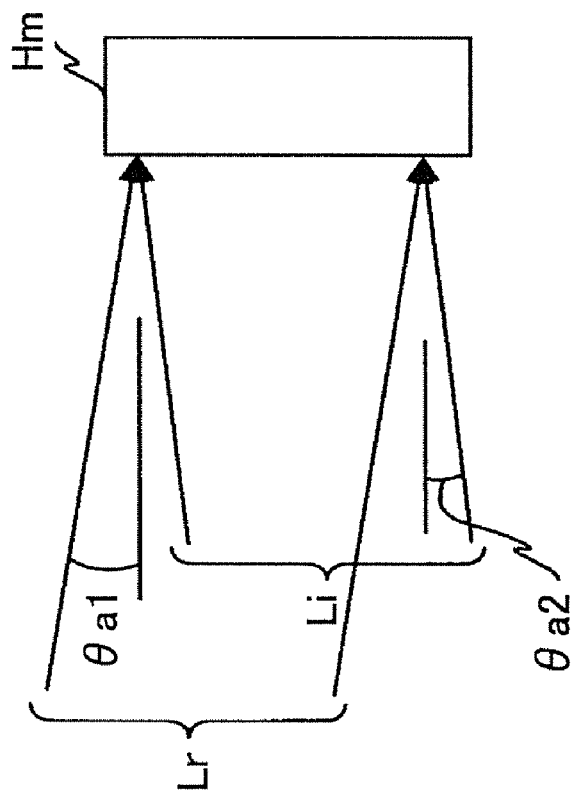

For the hologram element Hm in which the hologram pattern has not been formed yet, as shown in FIG. 31B, while entering the left side (direction where it received horizontally and −θc1 inclined) reference light Lr of hologram element Hm, the information light Li is entered from the left side (direction where it received horizontally and +θc2 inclined) of hologram element Hm, and hologram element H32 is created by forming a hologram pattern in the inside of hologram element Hm. Rather than the optical axis of collimating lens 52, light source Ld3 gives the same aberration as the aberration by being arranged on the −Z side to reference light Lr, and it makes information light Li non-aberration.

That is, the hologram element H32 can correct the aberration by light source Ld3 being arranged rather than the optical axis of collimating lens 52 at the −Z side.

The light from light source Ld1 through collimating lens 52 is diffracted by hologram element H12 in order to satisfy the Bragg conditions of hologram element H12. The hologram element H12 emits diffracted light in the direction which is inclined by −θa2 to the direction of the X-axis, as shown in FIG. 32A.

The light from light source Ld2 and the light from light source Ld3 through collimating lens 52 do not satisfy the Bragg conditions of hologram element H12, and they penetrate hologram element H12 without change.

The light from light source Ld3 penetrating the hologram element H12 is diffracted by hologram element H32 in order to satisfy the Bragg conditions of hologram element H32. The hologram element H32 emits diffracted light in the direction which is inclined by +θc2 to the direction of the X-axis as shown in FIG. 32B.

The diffracted light from hologram element H12 and the light from light source Ld2 penetrating hologram element H12 do not satisfy the Bragg conditions of hologram element H32, and they penetrate hologram element H32 without change.

The hologram element H32 may be arranged on the +X side of collimating lens 52, and hologram element H12 may be arranged on the +X side of hologram element H32. The information luminous-intensity distribution is corrected in order to set equally intensity distribution of the diffracted light from each hologram element as the axial object.

Since the refractive index change of a space top will become large if volume hologram element H12 is created with reference light Lr and information light Li with the usual gauss intensity distribution from which the medial axis shifted as shown in FIG. 33A.

As shown in FIG. 33B, there is a possibility that the intensity distribution of diffracted light may turn into partial Gaussian distribution, may change the form of the light spot formed in an optical disk, and a signal characteristic may deteriorate.

Figure 34A:
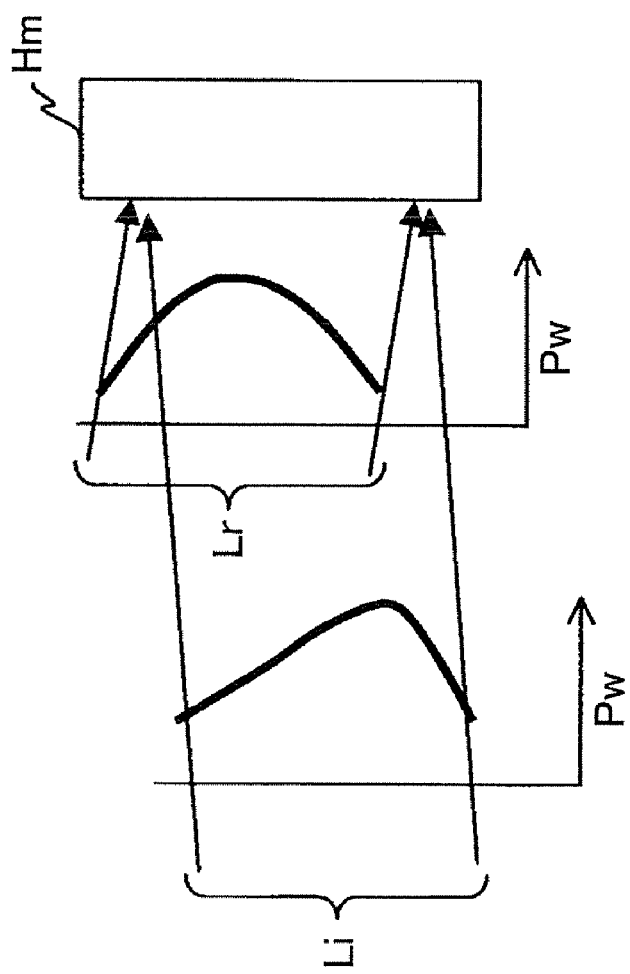
FIG. 34A and FIG. 34B are diagrams for explaining the relation between information luminous-intensity distribution and the intensity distribution of diffracted light.
Figure 34B:
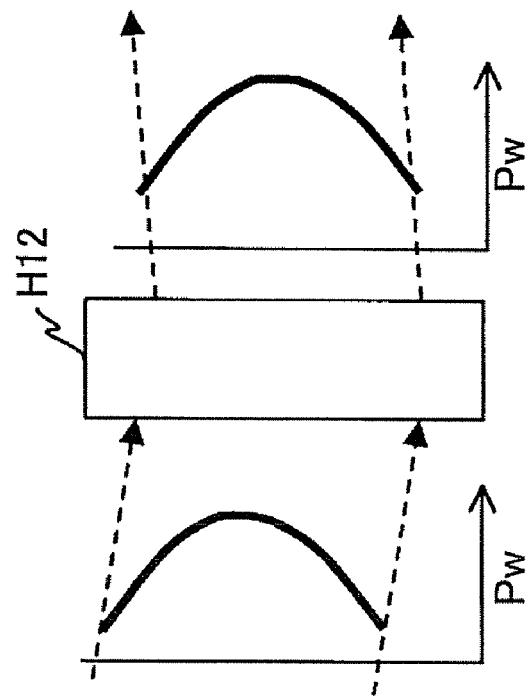

If the volume hologram element H12 is created with information light Li which has peak intensity in the space bottom as shown in FIG. 34A, the diffracted light with the usual gauss intensity distribution which is symmetrical to the axis will be obtained as shown in FIG. 34B.

Figure 35B:
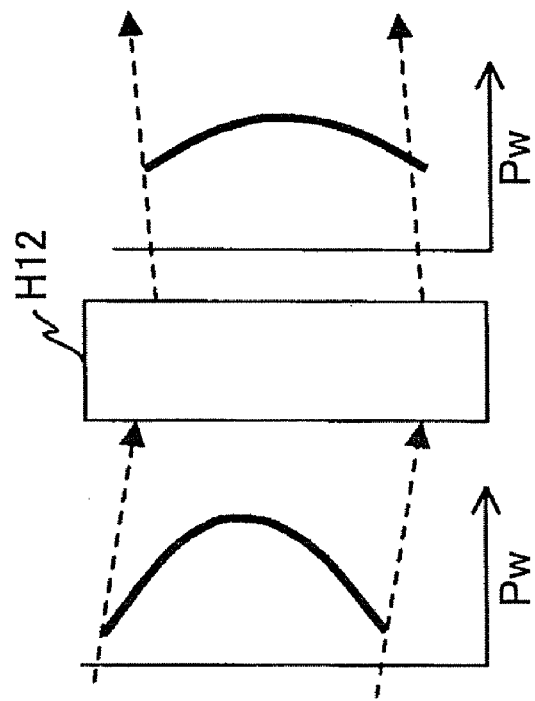
FIG. 35A and FIG. 35B are diagrams for explaining the relation between information luminous-intensity distribution and the intensity distribution of diffracted light.
Figure 35A:
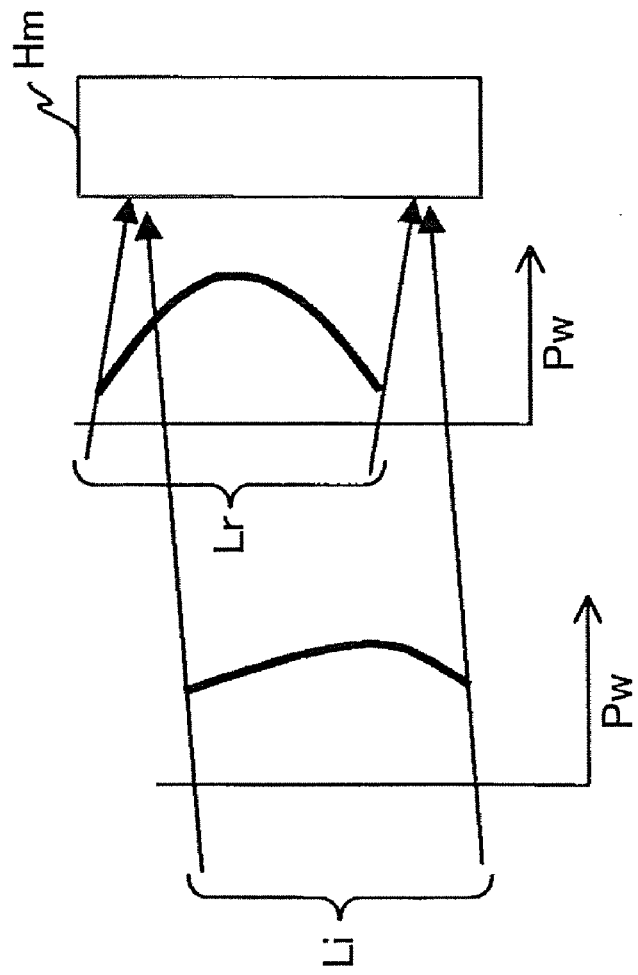

If the volume hologram element H12 is created with information light Li with larger intensity of a beam end than the intensity of a beam center as shown in FIG. 35A, the diffracted light with large intensity of the beam end will be obtained as shown in FIG. 35B.

The end intensity (RIM intensity) of the diffracted light can be adjusted by adjusting the intensity distribution of information light Li. This is equivalent to the usual beam shaping function.

The diffracted light emitted from each hologram element has the intensity distribution of axial symmetry to the optical axis of the hologram element. Each hologram element is set up so that the half-width angle of the intensity distribution of the diffracted light emitted is larger than the half-width angle of the intensity distribution of incident light.

Referring back to FIG. 29, the polarization beam splitter 54 is arranged on the +X side of hologram element H32, and the quarter wave plate 55, the objective lens 60, the condenser lens 58, and the cylinder lens 73 are arranged similar to the previously mentioned embodiment.

The photodetector Pd2 is arranged on the −Z side of cylinder lens 73, and arranged on the optical axis of cylinder lens 73. The photodetector Pd1 is arranged on the −X side of the photodetector Pd2, and the photodetector Pd3 is arranged on the +X side of the photodetector Pd2.

Operation of the optical pickup device 23 of this embodiment will be explained briefly.

The light of the plane polarization (P polarization) emitted from light source Ld1 enters into hologram element H12 through collimating lens 52, it is diffracted by hologram element H12, penetrates hologram element H32 without change, and enters into polarization beam splitter 54.

The light of the plane polarization (P polarization) emitted from light source Ld2 enters into hologram element H12 through collimating lens 52, penetrates hologram element H12 and hologram element H32 without change, and enters into polarization beam splitter 54.

The light of the plane polarization (P polarization) emitted from light source Ld3 enters into hologram element H12 through collimating lens 52, it penetrates hologram element H12 without change, is diffracted by hologram element H32, and enters into polarization beam splitter 54.

The most part of the light which entered into polarization beam splitter 54 penetrates polarization beam splitter 54 without change, it is converted into the circularly polarized light by quarter wave plate 55, and is focused on the recording layer of optical disk 15 through objective lens 60.

The light from light source Ld2 is focused at the position t2 which intersects the optical axis of objective lens 60, the light from light source Ld1 is focused at the position t1 by the side of +Z of the position t2, and the light from light source Ld3 is focused at the position t3 by the side of −Z of the position t2.

That is, the light emitted from each light source is focused at the mutually different position on the recording layer of optical disk 15.

The received light from optical disk 15 is converted into the circularly polarized light in the opposite polarization direction, and the returned light enters into quarter wave plate 55 through objective lens 60 so that it is converted into the linearly polarized light (S polarization) which is perpendicular to the outward trip. And this returned light enters into polarization beam splitter 54.

The returned light reflected in the direction of −Z by polarization beam splitter 54 is received by each photodetector through condenser lens 58 and cylinder lens 73.

The returned light from position t1 is received by the photodetector Pd1, the returned light from position t2 is received by the photodetector Pd2, and the returned light from position t3 is received by the photodetector Pd3.

The gap D of each light spot formed in the recording layer of optical disk 15 is dependent on the gap dp in the direction of the Z-axis of each light source, the angle magnification m of the hologram element (=sin(outgoing radiation angle)/sin (the degree of incident angle)) and the focal length fc of collimating lens 52, and the focal length fo of objective lens 60. That is, the relation represented by the formula: $m = (D/dp) \times (fc/fo)$ is satisfied.

For example, what is necessary for D=0.01 mm when dp=6 mm, fc=24 mm, fo=4 mm is to be set as m=0.01. Since the value of sin(degree of incident angle)=D/fc=0.25, it can be set as sin(outgoing radiation angle)=sin(degree of incident angle)×0.01=0.0025.

In this case, for example, the photodetector Pd2 may be used as 4 division photodetector, and track error signal detection by an astigmatic method and focus error signal detection by the push pull method may be performed based on the output of the photodetector Pd2.

In the optical pickup device 23 of this embodiment, the light source unit is realized by three light sources (Ld1, Ld2, Ld3) and two hologram elements (H12, H32).

In the optical pickup device 23 of this embodiment, the three light sources (Ld1, Ld2, Ld3) and hologram element H12 made to penetrate without change, without diffracting the light from light source Ld1 and no light from light source Ld2 and light source Ld3 diffracting, the light from light source Ld3 penetrating the hologram element H12 is diffracted.

The hologram element H32 made to penetrate without change, without no lights diffracted by the light and hologram element H12 from light source Ld2 penetrating the hologram element H12 diffracting, each hologram element having the plane of incidence of the incident light and the plane of outgoing radiation of the diffracted light which are in parallel, and each is a volume hologram element which is arranged along the direction of the X-axis.

Therefore, the illumination system can be miniaturized without reducing efficiency for light utilization, and it is possible to attain miniaturization without causing performance decrement.

According to the optical disk device of this embodiment, since playback from two or more tracks can be performed almost simultaneously, it is possible to perform playback processing to the optical disk quickly.

In this embodiment, it is also possible to perform recording and reproduction almost simultaneously. For example, information is renewable from other tracks, recording the information on the track of 1.

Figure 36:
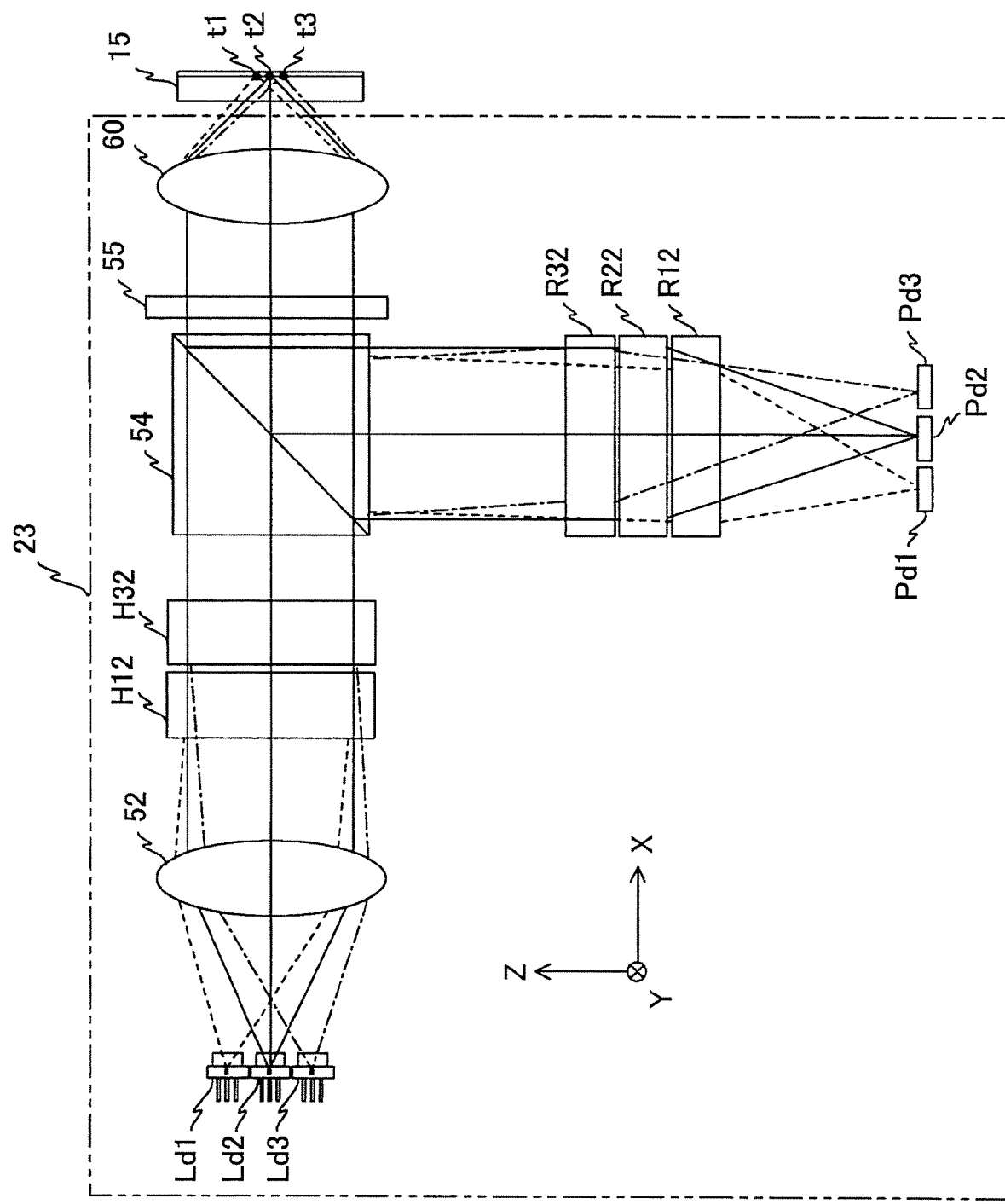
FIG. 36 is a diagram for explaining modification of the optical pickup device of FIG. 29.

In the above embodiment, as shown in FIG. 36, it may replace with the condenser lens 58 and cylinder lens 73, and three hologram elements (R32, R22, R12) may be arranged on the optical path between the polarization beam splitter 54 and each photodetector. The hologram element R32, the hologram element R22, and the hologram element R12 have mutually different Bragg conditions, and they are the volume hologram elements in which the plane of incidence of the incoming light and the plane of outgoing radiation of the diffracted light are in parallel.

The hologram element R32 is arranged on the −Z side of polarization beam splitter 54, diffracts the returned light component from position t3 included in the returned light reflected in the direction of −Z by polarization beam splitter 54, and is set up condense to the acceptance surface of the photodetector Pd3. The hologram element R32 gives astigmatism to the diffracted light.

The returned light component from position t1 and the returned light component from position t2 which are contained in the returned light reflected in the direction of −Z by polarization beam splitter 54 do not satisfy the Bragg conditions of hologram element R32, but penetrate hologram element R32 without change.

The hologram element R22 is arranged on the −Z side of hologram element R32, diffracts the returned light component from position t2 included in the returned light penetrating the hologram element R32, and is set up condense to the acceptance surface of the photodetector Pd2. The hologram element R22 gives astigmatism to diffracted light.

No lights other than the returned light component from position t2 included in the returned light penetrating the hologram element R32 satisfy the Bragg conditions of hologram element R22, and they penetrate hologram element R22 without change.

The hologram element R12 is arranged on the −Z side of hologram element R22, diffracts the returned light component from position t1 included in the returned light penetrating the hologram element R22, and is set up condense to the acceptance surface of the photodetector Pd1. The hologram element R12 gives astigmatism to the diffracted light.

No lights other than the returned light component from position t1 included in the returned light penetrating the hologram element R22 satisfy the Bragg conditions of hologram element R12, and they penetrate hologram element R12 without change.

That is, the three hologram elements (R32, R22, R12) have the lens function to change the degree of divergence of outgoing radiation light to incident light.

Therefore, the detection system can be miniaturized without reducing efficiency for light utilization, and it is possible to attain the miniaturization of an optical pickup device without causing performance decrement further.

The optical pickup device 23 of this embodiment uses a hologram unit. In this case, the hologram element which diffracts each of lights emitted from a corresponding hologram unit and returned light received by a corresponding hologram unit is used.

A description will be given of the optical pickup device in an embodiment of this invention.

Unlike the previously mentioned embodiment, this embodiment has the feature that it can respond to all of the optical disk (BD) based on Blu-ray standard practice and the optical disk (DVD) based on DVD standard practice.

The composition of the optical disk device except the optical pickup device and the portions of data processing and signal processing is the same as that of the previously mentioned embodiment. The elements which are the same as corresponding elements in the previously mentioned embodiment are designated by the same reference numerals, and a description thereof will be omitted.

The optical disks 15 is either DVD or BD. When it is needed to be distinguished, DVD is indicated as the optical disk 15d, and BD is indicated as the optical disk 15b.

Figure 37:
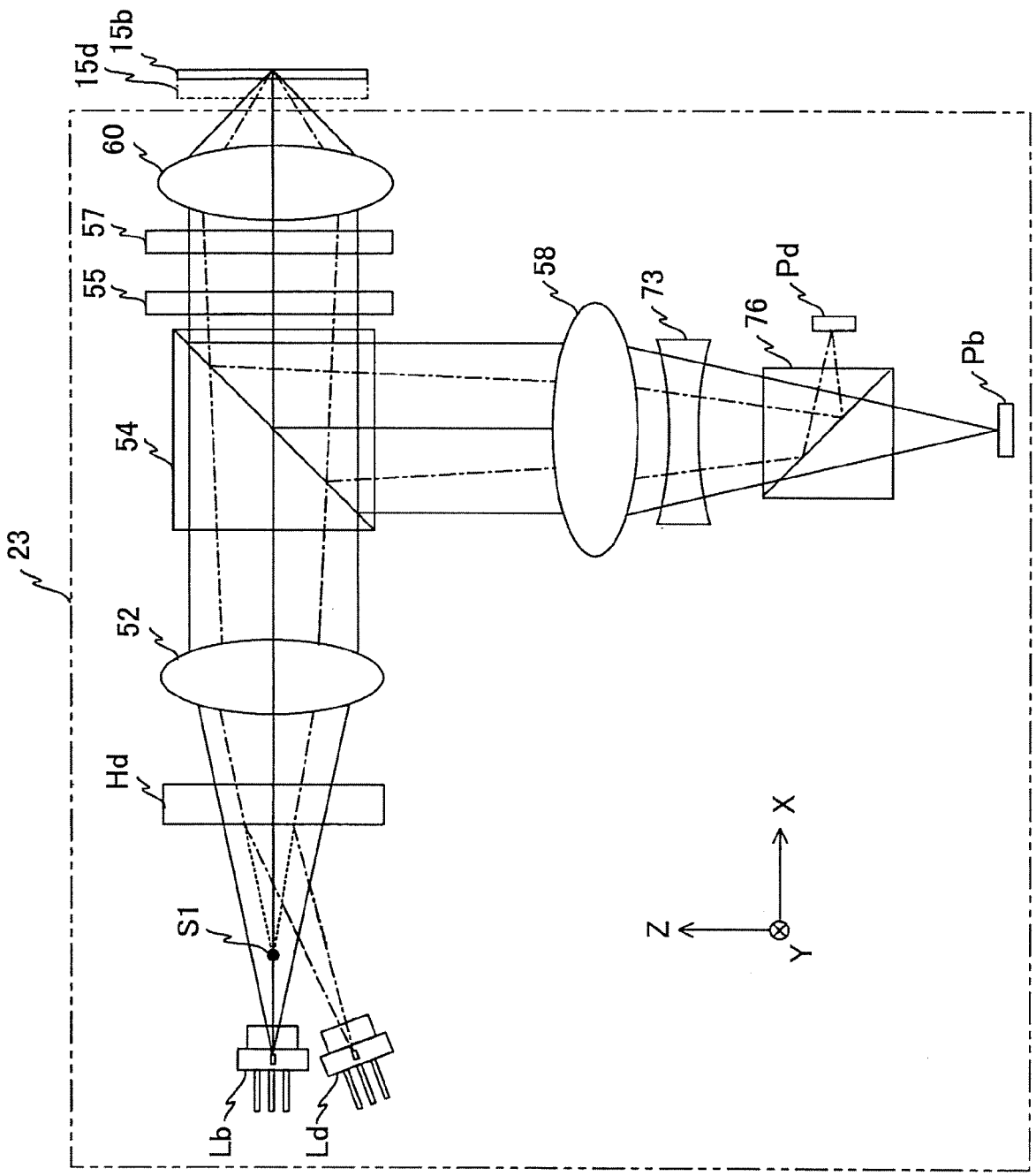
FIG. 37 is a diagram for explaining the optical pickup device in an embodiment of the invention.

As shown in FIG. 37, the optical pickup device 23 of this embodiment comprises two light sources (Lb, Ld), a hologram element Hd, a collimating lens 52, a polarization beam splitter 54, a quarter wave plate 55 for two wavelengths, an opening wavelength filter 57, an objective lens 60, a condenser lens 58, a cylinder lens 73, two photodetectors (Pd, Pb), a dichroic prism 76, and the drive system (which is not illustrated) for driving the objective lens 60. The objective lens 60 is optimized to BD.

The light source Lb is used when the optical disk is BD, and it emits the laser beam whose wavelength is 405 nm. The maximum intensity outgoing radiation direction of the laser beam emitted from light source Lb is the direction of +X. Light source Lb is arranged in the position whose point of the emitting light corresponds with the focal position of collimating lens 52.

The light source Ld is used when the optical disk is DVD, and it emits the laser beam whose wavelength is 660 nm. Light source Ld is near the light source Lb, and it is arranged so that the light emitted from light source Ld may satisfy the Bragg conditions of hologram element Hd.

The light of P polarization is emitted from light source Lb and light source Ld. The plane of incidence of the incoming light and the plane of outgoing radiation of the diffracted light are in parallel and the volume hologram elements, and hologram element Hd is arranged on the optical path between each light source and the collimating lens 52. The light emitted from light source Lb does not satisfy the Bragg conditions of hologram element Hd, but penetrates hologram element Hd without change.

On the other hand, the light emitted from light source Ld is diffracted by hologram element Hd in order to satisfy the Bragg conditions of hologram element Hd. And from hologram element Hd, diffracted light is emitted towards the direction of +X.

This hologram element Hd is set up so that diffracted light may turn into a diverging light more equivalent to the light emitted from the virtual emission point S1 located in the +X side of the focal position of collimating lens 52.

Figure 38A:
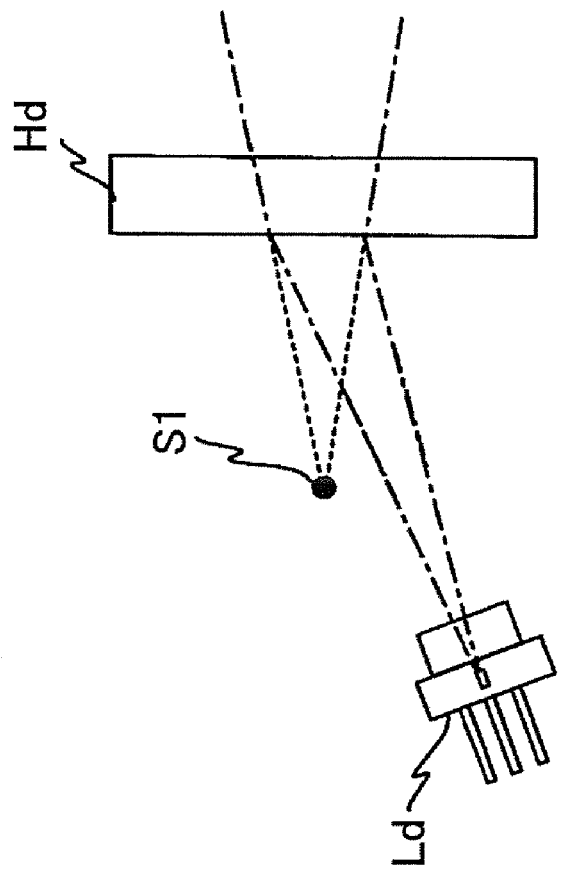
FIG. 38A is a diagram for explaining the preparation method of the hologram element in FIG. 37.

The hologram element Hd is shown in FIG. 38A as an example. The reference light Lr from the light source Ld enters into hologram element Hm in which a hologram pattern is not formed yet, the information light Li is entered from the virtual emission point S1, so that the hologram element is created by forming the hologram pattern in the inside of hologram element Hm. The virtual emission point S1 is determined in consideration of the difference between the substrate thickness of BD and DVD, and the wavelength.

Figure 38B:
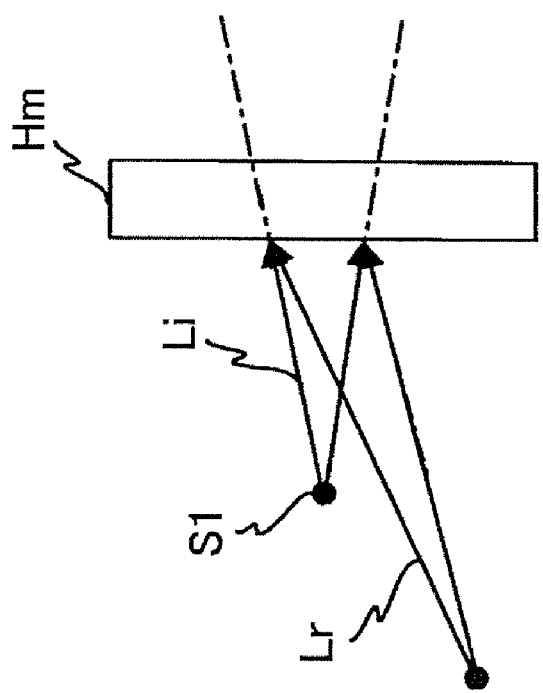
FIG. 38B is a diagram for explaining operation of the hologram element in FIG. 37.

That is, the diffracted light is converted into emission light by which the aberration resulting from the difference between the substrate thickness of BD and DVD and a wavelength is corrected, as shown in FIG. 38B. The angle magnification of hologram element Hd is smaller than 1. A thermo-plastic or photo-polymer is used for the material, and the hologram element Hd is created using the known 2 light-beam interference exposing method.

The collimating lens 52, the polarization beam splitter 54, the quarter wave plate 55, the objective lens 60, the condenser lens 58, and the cylinder lens 73 are arranged similar to the previously mentioned embodiment.

The opening wavelength filter 57 is arranged on the optical path between the quarter wave plate 55 and the objective lens 60, and it is designed so that an opening diameter may change according to the wavelength. The opening restriction of the light from light source Lb is carried out so that the numerical aperture (NA) of objective lens 60 may be set to 0.85, and opening restriction of the light from light source Ld is carried out so that the numerical aperture (NA) of objective lens 60 may be set to 0.65. The servo drive of this opening wavelength filter 57 is carried out integrally with the objective lens 60.

The dichroic prism 76 is arranged on the −Z side of cylinder lens 73. The returned light when the optical disk is DVD is reflected in the direction of +X by dichroic prism 76, and the returned light when the optical disk is BD penetrates dichroic prism 76 without change.

The photodetector Pd is arranged on the +X side of this dichroic prism 76, and the returned light reflected with dichroic prism 76 is received. The photodetector Pb is arranged on the −Z side of dichroic prism 76, and receives the returned light penetrating the dichroic prism 76.

Operation of the optical pickup device 23 of this embodiment will be explained briefly.

When the optical disk is the BD disk, the light of the plane polarization (P polarization) emitted from light source Lb penetrates hologram element Hd without change, is converted into the parallel beam with collimating lens 52, and enters into polarization beam splitter 54.

The polarization beam splitter 54 is penetrated without change, it is converted into the circularly polarized light with quarter wave plate 55, opening restriction is carried out with opening wavelength filter 57, and the most part of light from collimating lens 52 is focused on the recording layer of optical disk 15*b* through objective lens 60.

The received light from optical disk 15*b* is converted into the circularly polarized light in the opposite polarization direction, and the returned light enters into quarter wave plate 55 through objective lens 60 and opening wavelength filter 57, so that it is converted into the linearly polarized light (S polarization) which is perpendicular to the outward trip. And this returned light enters into polarization beam splitter 54.

The returned light reflected in the direction of −Z by polarization beam splitter 54 enters into dichroic prism 76 through condenser lens 58 and cylinder lens 73, penetrates dichroic prism 76 without change, and is received by the photodetector Pb.

When the optical disk is DVD, the light of the plane polarization (P polarization) emitted from light source Ld enters into hologram element Hd, it is diffracted in the direction of +X by hologram element Hd, is converted into a slightly diverging light beam by collimating lens 52, and enters into polarization beam splitter 54. The polarization beam splitter 54 is penetrated without change, it is converted into circularly polarized light beam by quarter wave plate 55, opening restriction is carried out by opening wavelength filter 57, and the most part of diffracted light is focused on the recording layer of 15*d* of optical disks through objective lens 60.

The received light from optical disk 15*d* is converted into the circularly polarized light in the opposite polarization direction, and the returned light enters into quarter wave plate 55 through objective lens 60 and opening wavelength filter 57, so that it is converted into the linearly polarized light (S polarization) which is perpendicular to the outward trip. And this returned light enters into polarization beam splitter 54.

It enters into dichroic prism 76 through condenser lens 58 and cylinder lens 73, it is reflected with dichroic prism 76, and the returned light reflected in the direction of −Z by polarization beam splitter 54 is received by the photodetector Pd.

When the optical disk is DVD, the light which enters into objective lens 60 is converted into emission light, and the aberration resulting from the difference between substrate thickness with BD and a wavelength is corrected. When creating hologram element Hd, high order spherical aberration and the aberration resulting from the cyst of the objective lens at the time of tracking control may be added further.

High order spherical aberration and coma aberration are added to information light Li using an aspheric surface lens, a liquid crystal device, etc., and the hologram pattern is formed in the inside of hologram element Hm.

Since the information light of creation time will occur if reference light is glared, the hologram element created using such an information light can correct not only the difference between substrate thickness with BD, and a wavelength but the aberration resulting from the objective lens at the time of tracking control, if this hologram element is used.

When the optical disk is BD, it may have further a hologram element which has a function which corrects the aberration resulting from the cyst of the objective lens at the time of tracking control.

In the optical pickup device 23 of this embodiment, the light source unit is realized by two light sources (Lb, Ld) and hologram elements Hd.

In the optical pickup device 23 of this embodiment explained above, the light source unit is constituted by the two light sources (Lb, Ld) and the hologram element Hd. In the hologram element Hd, the plane of incidence of the light and the outgoing radiation of the diffracted light are in parallel and it is a volume hologram element, and the light from the light source Lb is made to penetrate the hologram element Hd without change, and the hologram element Hd which diffracts the light from the light source Ld in the direction of +X. Thereby, the illumination system can be miniaturized without reducing efficiency for light utilization, and it is possible to attain miniaturization without causing performance decrement.

Figure 39:
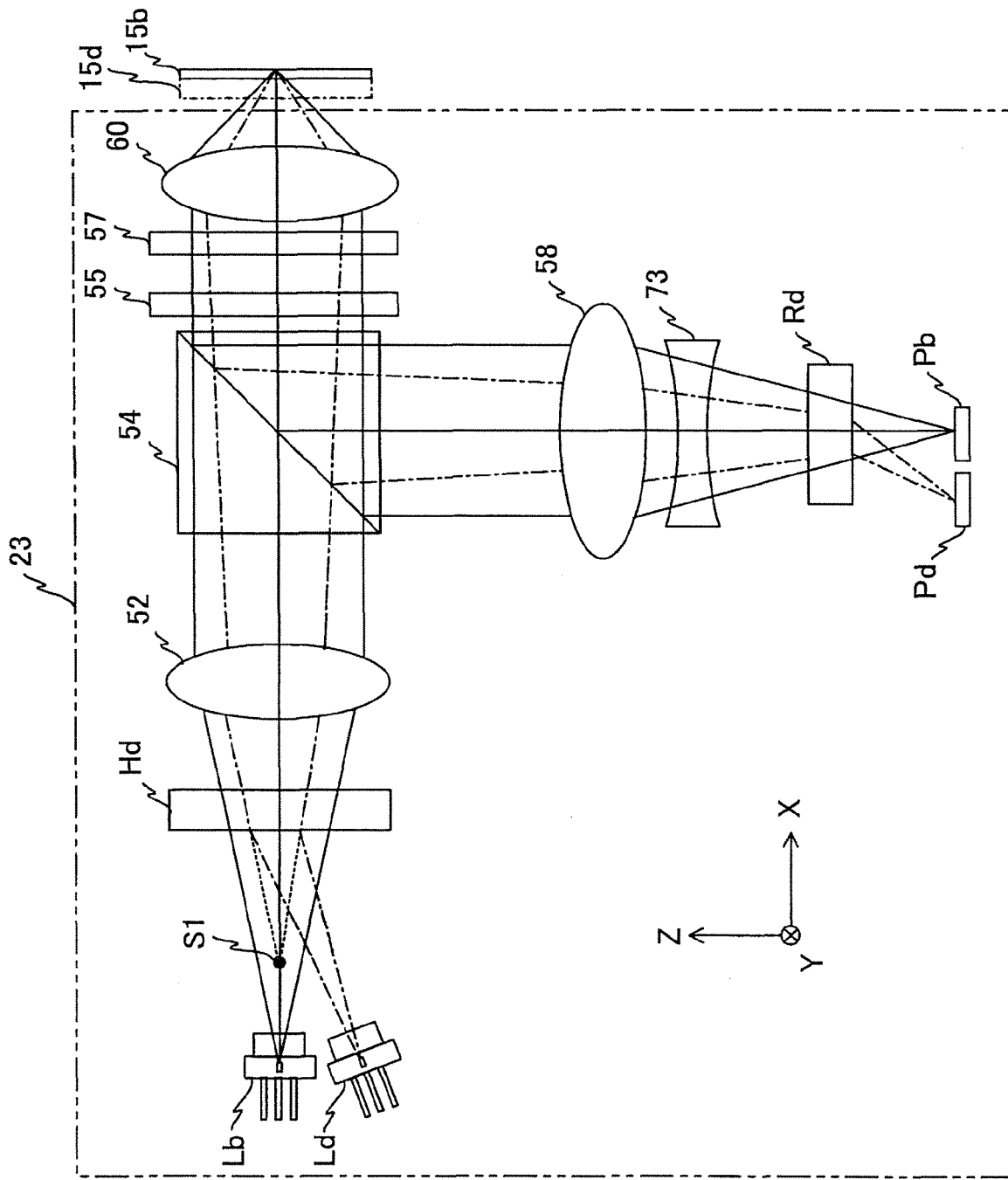
FIG. 39 is a diagram for explaining modification of the optical pickup device of FIG. 37.

It is possible for the optical pickup device 23 of this embodiment to attain miniaturization without substrate thickness reducing the access accuracy to the plurality of kinds of mutually different optical disks, In this embodiment method explained above, as shown in FIG. 39, it may replace with the dichroic prism 76, and hologram element Rd may be used.

In this hologram element Rd, the plane of incidence of the incoming light and the plane of outgoing radiation of the diffracted light are in parallel. The returned light, when the optical disk is the BD disk, is made to penetrate this volume hologram element without change, and the returned light, when the optical disk is a DVD is diffracted by the volume hologram element.

The photodetector Pd is arranged near the condensing position of the diffracted light. The hologram element Rd also has the function which corrects the aberration resulting from the difference in substrate thickness. In this case, the optical detector unit is realized by two the photodetectors (Pb, Pd) and hologram elements Rd.

Therefore, the detection system can be miniaturized without reducing efficiency for light utilization, and it is possible to attain the miniaturization of an optical pickup device without causing performance decrement further.

By the way, substrate thickness is designed at 0.1 mm for BD (the light source wavelength is 405 nm, and the objective lens 60 generates the aberration by the difference between substrate thickness and wavelength, when substrate thickness is at 0.6 mm for DVD (the light source wavelength is 660 nm).

For this reason, when the photodetector Pd is arranged on the same substrate as the photodetector Pb, hologram element Rd has a function of aberration compensation temporarily, and an optical disk is DVD, the fault of offset or a sensitivity fall occurs in a focus error signal. That is, since the returned light from 15*d* of optical disks enters into condenser lens 58 in the state of convergence light to the returned light from optical disk 15*b* entering into condenser lens 58 in the state of the parallel beam, the photodetector Pd must be arranged to the front (+Z side) rather than the photodetector Pb.

The hologram element Rd generates the diffracted light which corrected the aberration of convergence light, and even if it arranges the photodetector Pd and the photodetector Pb on the same side, it can acquire a normal focus error signal and can attain miniaturization and simplification further.

The optical pickup device 23 of this embodiment may be constituted to use a hologram unit. In this case, the hologram element which diffracts each of lights emitted from a corresponding hologram unit and returned light received by a corresponding hologram unit is used.

A description will be given of the optical pickup device in an embodiment of this invention.

Unlike the previously mentioned embodiment, this embodiment has the feature that it can respond to any of the optical disk (CD) based on the CD standard, the DVD, and the BD.

The composition of the optical disk device except the optical pickup device and the data-processing and signal processing portions is the same as that of the above-mentioned embodiment. The elements which are the same as corresponding elements in the previously mentioned embodiment are designated by the same reference numerals, and a description thereof will be omitted.

The optical disk 15 is any of CD, DVD and BD. When it is needed to be distinguished, the DVD is indicated as the optical disk 15d, the BD is indicated as the optical disk 15b, and the CD is indicated as the optical disk 15c.

Figure 40:
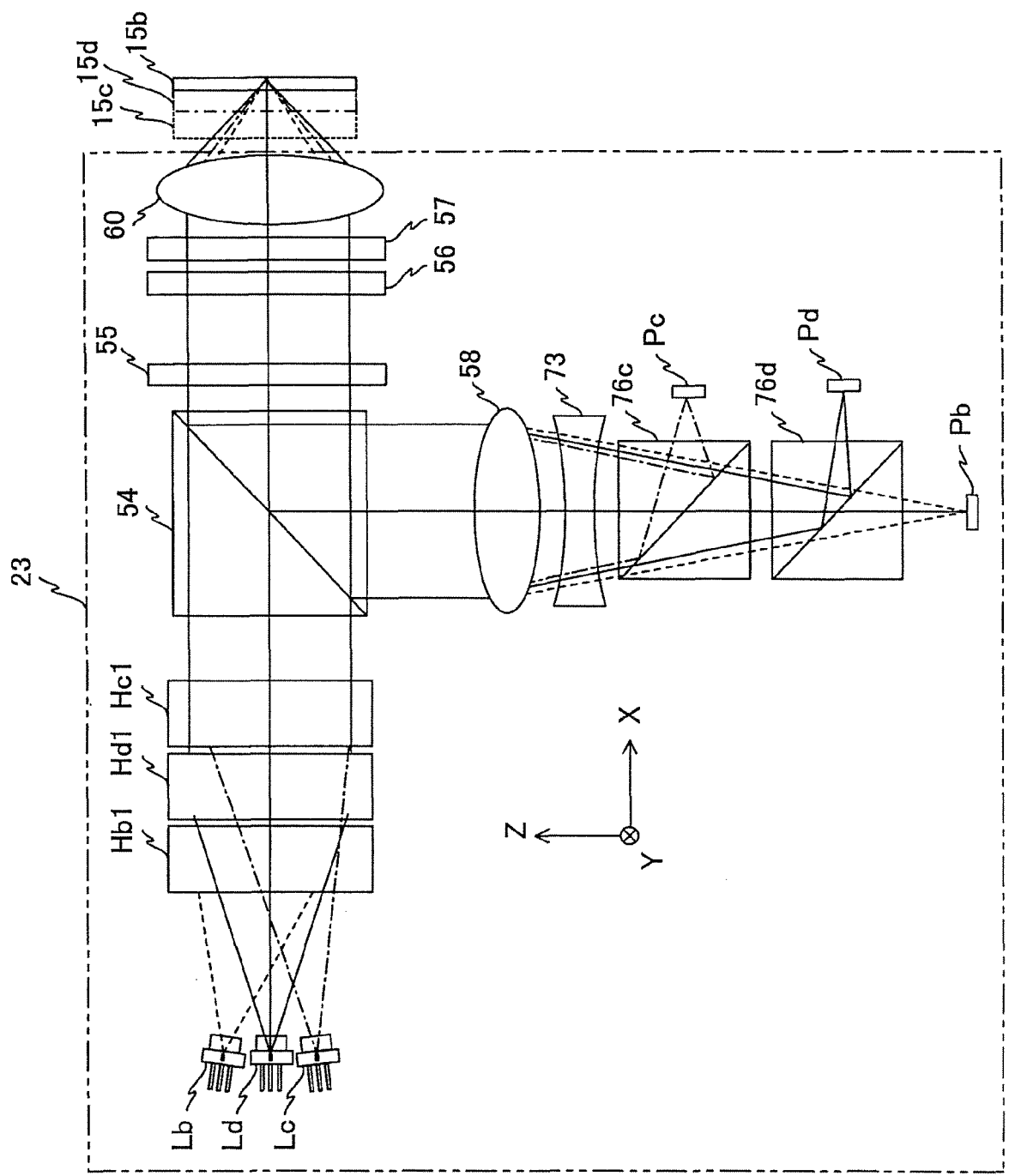
FIG. 40 is a diagram for explaining the optical pickup device in an embodiment of the invention.

As shown in FIG. 40, the optical pickup device 23 of this embodiment comprises three light sources (Lb, Ld, Lc), two dichroic prisms (76c, 76d), three hologram elements (Hb1, Hd1, Hc1), a polarization beam splitter 54, a quarter wave plate 55 for three wavelengths, a diffraction optical element 56, an opening wavelength filter 57, an objective lens 60, a condenser lens 58, a cylinder lens 73, three photodetectors (Pb, Pd, Pc), and the drive system (which is not illustrated) for driving the objective lens 60.

The light source Ld is used when the optical disk is DVD, and it emits the laser beam whose wavelength is 660 nm. This light source Ld is arranged on the optical axis of polarization beam splitter 54.

The light source Lb is used when the optical disk is BD, and it emits the laser beam whose wavelength is 405 nm. This light source Lb is arranged on the +Z side of light source Ld.

The light source Lc is used when the optical disk is CD, and it emits the laser beam whose wavelength is 780 nm. This light source Lc is arranged on the −Z side of light source Ld.

The light emitted from each light source shall be P polarization. Each hologram element is a volume hologram element in which the plane of incidence of the incoming light and the plane of outgoing radiation of the diffracted light are in parallel. Each angle magnification of each hologram element is smaller than 1. A thermoplastic or photo-polymer is used for the material, and each hologram element is created using the known 2 light-beam interference exposing method.

The hologram element Hb1 is arranged on the +X side of each light source, and it is set up so that the light emitted from light source Lb may satisfy the Bragg condition. Therefore, the light emitted from light source Lb is diffracted by hologram element Hb1. This diffracted light is emitted almost in parallel with the optical axis of objective lens 60.

On the other hand, the light emitted from light source Ld and light source Lc does not satisfy the Bragg conditions of hologram element Hb1, but penetrates hologram element Hb1 without change. The hologram element Hd1 is arranged on the +X side of hologram element Hb1, and it is set up so that the light from light source Ld penetrating the hologram element Hb1 may satisfy the Bragg condition. Therefore, the light from light source Ld penetrating the hologram element Hb1 is diffracted by hologram element Hd1. This diffracted light is emitted almost in parallel with the optical axis of objective lens 60.

On the other hand, the light from light source Lc penetrating the diffracted light from hologram element Hb1 and hologram element Hb1 does not satisfy the Bragg conditions of hologram element Hd1, but penetrates hologram element Hd1 without change.

The hologram element Hc1 is arranged on the +X side of hologram element Hd1, and it is set up so that the light from light source Lc penetrating the hologram element Hd1 may satisfy the Bragg condition. Therefore, the light from light source Lc penetrating the hologram element Hd1 is diffracted by hologram element Hc1. This diffracted light is emitted almost in parallel with the optical axis of objective lens 60.

On the other hand, the diffracted light from hologram element Hb1 and the diffracted light from hologram element Hd1 do not satisfy the Bragg conditions of hologram element Hc1, but penetrate hologram element Hc1 without change.

That is, each hologram element has the lens function to change the degree of divergence of outgoing radiation light to incident light. For this reason, the collimating lens becomes unnecessary. The hologram element can be created by making into the parallel beam information light used when creating the hologram element. The order of arrangement of each hologram element is not limited to this.

The polarization beam splitter 54 is arranged on the +X side of hologram element Hc1, and the quarter wave plate 55, the objective lens 60, the condenser lens 58, and the cylinder lens 73 are arranged similar to the previously mentioned embodiment, The objective lens 60 is optimized to DVD.

The aberration for correcting the aberration resulting from the difference in the substrate thickness of BD and DVD to hologram element Hb1 is added to hologram pattern creation time, and the aberration for correcting the aberration resulting from the difference in the substrate thickness of CD and DVD is added to hologram element Hc1.

The diffraction optical element 56 is arranged on the +X side of the quarter wave plate 55, and performs the aberration compensation corresponding to each wavelength. The opening wavelength filter 57 is arranged on the +X side of diffraction optical element 56, and performs the opening restrictions corresponding to each wavelength.

The servo drive of the diffraction optical element 56 and the opening wavelength filter 57 is carried out integrally with the objective lens 60.

The dichroic prism 76c is arranged on the −Z side of cylinder lens 73, and when the optical disk is CD, it reflects returned light in the direction of +X. The photodetector Pc is arranged on the +X side of this dichroic prism 76c, and the returned light reflected with dichroic prism 76c is received. The dichroic prism 76c makes returned light penetrate without change when the optical disk is BD or DVD.

The dichroic prism 76d is arranged on the −Z side of dichroic prism 76c, and when the optical disk is DVD, it reflects the returned light penetrating the dichroic prism 76c in the direction of +X. The photodetector Pd is arranged on the +X side of this dichroic prism 76d, and the returned light reflected with dichroic prism 76d is received.

The dichroic prism 76d makes the returned light penetrate without change, when the optical disk is BD. The photodetector Pb is arranged on the −Z side of the dichroic prism 76d and receives the returned light penetrating the dichroic prism 76d.

Next, operation of the optical pickup device 23 of this embodiment will be explained briefly.

Operation of the optical pickup device 23 when the optical disk is the BD disk will be explained. The light of the plane polarization (P polarization) emitted from light source Lb enters into hologram element Hb1, it is diffracted by hologram element Hb1, is converted into the parallel beam, penetrates hologram element Hd1 and hologram element Hc1 without change, and enters into polarization beam splitter 54. The most part of diffracted light penetrates polarization beam splitter 54 without change, and it is converted into the circularly polarized light by quarter wave plate 55.

The aberration compensation which is suitable for BD with diffraction optical element 56 is made, the opening restrictions which were suitable for BD with opening wavelength filter 57 are made, and it is focused on the recording layer of optical disk 15b through objective lens 60.

The received light from optical disk 15b is converted into the circularly polarized light in the opposite polarization direction, and the returned light enters into diffraction optical element 56 through objective lens 60 and opening wavelength filter 57. The returned light which is converted into the parallel beam by the diffraction optical element 56 enters into quarter wave plate 55, so that it is converted into the linearly polarized light (S polarization) which is perpendicular to the outward trip. And this returned light enters into polarization beam splitter 54.

The returned light, reflected in the direction of −Z by polarization beam splitter 54, enters into dichroic prism 76c through condenser lens 58 and cylinder lens 73, and dichroic prism 76c is penetrated without change, it enters into dichroic prism 76d, dichroic prism 76d is penetrated without change, and the light is received by the photodetector Pb.

Operation of the optical pickup device 23 when the optical disk is a DVD will be explained. The light of the plane polarization (P polarization) emitted from light source Ld enters into hologram element Hd1, is diffracted by hologram element Hd1. The light is converted into the parallel beam, and penetrates hologram element Hb1 and hologram element Hc1 without change, and enters into polarization beam splitter 54.

The most part of the diffracted light penetrates polarization beam splitter 54 without change, and it is converted into the circularly polarized light by quarter wave plate 55. The light penetrates diffraction optical element 56 without change, and the opening restriction suitable for DVD is performed by opening wavelength filter 57. The light is focused on the recording layer of optical disk 15d through objective lens 60.

The received light from optical disk 15d is converted into the circularly polarized light in the opposite polarization direction, and the returned light enters into diffraction optical element 56 through objective lens 60 and opening wavelength filter 57. The returned light which is converted into the parallel beam by the diffraction optical element 56 enters into quarter wave plate 55, so that it is converted into the linearly polarized light (S polarization) which is perpendicularly to the outward trip. And this returned light enters into polarization beam splitter 54.

The returned light reflected in the direction of −Z by the polarization beam splitter 54 enters into the dichroic prism 76c through the condenser lens 58 and the cylinder lens 73, and the dichroic prism 76c is penetrated without change, and it enters into the dichroic prism 76d, it is reflected by the dichroic prism 76d, and the light is received by the photodetector Pd.

Operation of the optical pickup device 23 when the optical disk is a CD will be explained. The light of the plane polarization (P polarization) emitted from light source Lc penetrates hologram element Hb1 and hologram element Hd1, enters into hologram element Hc1, it is diffracted by hologram element Hc1, is converted into the parallel beam, and enters into polarization beam splitter 54.

The most part of diffracted light penetrates polarization beam splitter 54 without change, and it is converted into the circularly polarized light by quarter wave plate 55. The aberration compensation which is suitable for CD with diffraction optical element 56 is made, the opening restrictions which were suitable for CD with opening wavelength filter 57 are made, and it is focused on the recording layer of optical disk 15c through objective lens 60.

The received light from optical disk 15c is converted into the circularly polarized light in the opposite polarization direction, and enters into diffraction optical element 56 through objective lens 60 and opening wavelength filter 57 as returned light. The returned light which is converted into the parallel beam by diffraction optical element 56 enters into quarter wave plate 55, and let it be the plane polarization (S polarization) which is perpendicular to the outward trip. And this returned light enters into polarization beam splitter 54.

It enters into dichroic prism 76c through condenser lens 58 and cylinder lens 73, it is reflected with dichroic prism 76c, and the returned light reflected in the direction of −Z by polarization beam splitter 54 is received by the photodetector Pc.

In the optical pickup device 23 of this embodiment, the light source unit is realized by three light sources (Lb, Ld, Lc) and three hologram elements (Hb1, Hd1, Hc1).

In the optical pickup device 23 of this embodiment, the three light sources (Lb, Ld, Lc) are provided, and the hologram element Hb1 is made to penetrate without change, without diffracting the light from light source Lb in the direction of +X, and no lights from light source Ld and light source Lc diffracting, the light from light source Ld penetrating the hologram element Hb1 is diffracted in the direction of +X. And the hologram element Hd1 made to penetrate without change, without no lights diffracted by the light from light source Lc and hologram element Hb1 penetrating the hologram element Hb1 diffracting, the light from light source Lc penetrating the hologram element Hd1 is diffracted in the direction of +X.

Each light diffracted by the light and hologram element Hd1 which are diffracted by hologram element Hb1 has hologram element Hc1 made to penetrate without change, without diffracting and each hologram element has the plane of incidence of the incoming light and the plane of outgoing radiation of the diffracted light which are in parallel, and the volume hologram elements are arranged along with the direction of the X-axis.

Thereby, the illumination system can be miniaturized without reducing efficiency for light utilization, and therefore it is possible to attain miniaturization without causing performance decrement.

Figure 41:
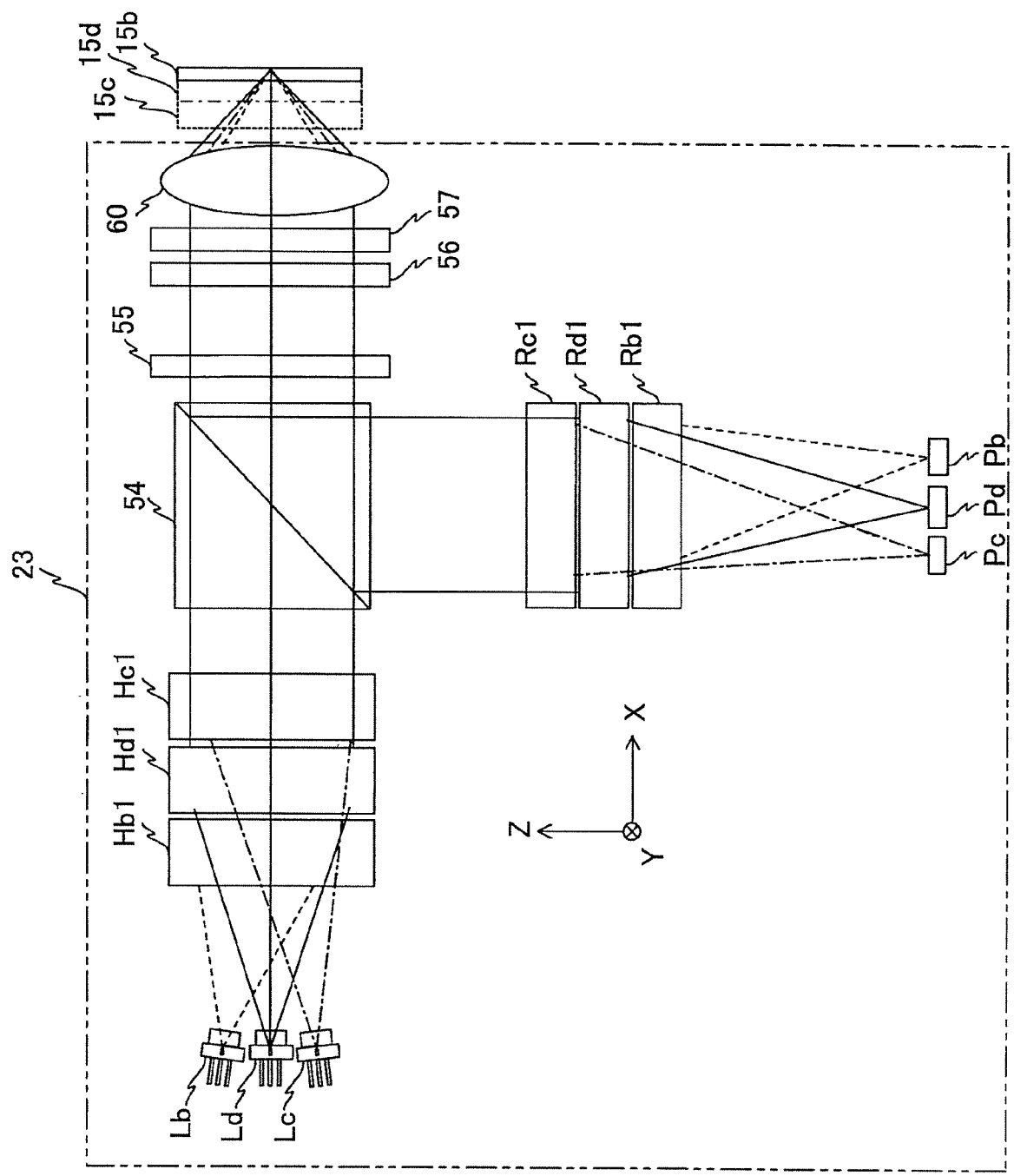
FIG. 41 is a diagram for explaining modification of the optical pickup device of FIG. 40.

In the present embodiment, as shown in FIG. 41, it may replace with the condenser lens 58, the cylindrical lens 73, the dichroic prism 76c, and the dichroic prism 76d, and three hologram elements (Rc1, Rd1, Rb1) may be used.

The three hologram elements (Rc1, Rd1, Rb1) have mutually different Bragg conditions, and each is a volume hologram element in which the plane of incidence of the incoming light and the plane of outgoing radiation of the diffracted light are in parallel.

The hologram element Rc1 is arranged on the −Z side of polarization beam splitter 54, and it is set up so that returned light when the optical disk is CD may satisfy the Bragg condition. Therefore, returned light when the optical disk is CD is diffracted by hologram element Rc1, and is focused on the specified position.

This hologram element Rc1 has given astigmatism to the diffracted light emitted while correcting the aberration resulting from the difference in the substrate thickness of CD and DVD. No returned light when the optical disk is BD or DVD satisfies the Bragg conditions of hologram element Rc1, and it penetrates hologram element Rc1 without change.

The hologram element Rd1 is arranged on the −Z side of hologram element Rc1, and it is set up so that returned light when the optical disk is DVD may satisfy the Bragg condition. Therefore, the returned light when the optical disk is DVD is diffracted by hologram element Rd1, and is focused on the specified position.

This hologram element Rd1 has given astigmatism to the diffracted light. No returned light when the optical disk is BD and the returned light diffracted by hologram element Rc1 satisfy the Bragg conditions of hologram element Rd1, and they penetrate hologram element Rd1 without change.

The hologram element Rb1 is arranged on the −Z side of hologram element Rd1, and it is set up so that the returned light when the optical disk is BD may satisfy the Bragg condition. Therefore, the returned light when the optical disk is BD is diffracted by hologram element Rb1, and is focused at the specified position. This hologram element Rb1 has given astigmatism to the diffracted light emitted while correcting the aberration resulting from the difference in the substrate thickness of BD and DVD.

No returned light diffracted by the returned light and hologram element Rd1 which are diffracted by hologram element Rc1 satisfies the Bragg conditions of hologram element Rb1, and it penetrates hologram element Rb1 without change.

That is, each of three hologram elements (Rc1, Rd1, Rb1) has a lens function equivalent to the condenser lens 58, and a lens function equivalent to the cylindrical lens 73. The order of arrangement of three hologram elements (Rc1, Rd1, Rb1) is not limited to this.

In this case, the photodetector Pc is arranged near the condensing position of the diffracted light from hologram element Rc1, the photodetector Pd is arranged near the condensing position of the diffracted light from hologram element Rd1, and the photodetector Pb is arranged near the condensing position of the diffracted light from hologram element Rb1. That is, each photodetector can be arranged on the same side.

In this case, the optical detector unit is realized by three the photodetectors (Pd, Pb, Pc) and three hologram elements (Rc1, Rd1, Rb1). Therefore, the detection system can be miniaturized without reducing efficiency for light utilization, and therefore it is possible to attain the miniaturization of an optical pickup device without causing performance decrement further.

Next, a description will be given of the optical pickup device in an embodiment of the invention.

Figure 42:
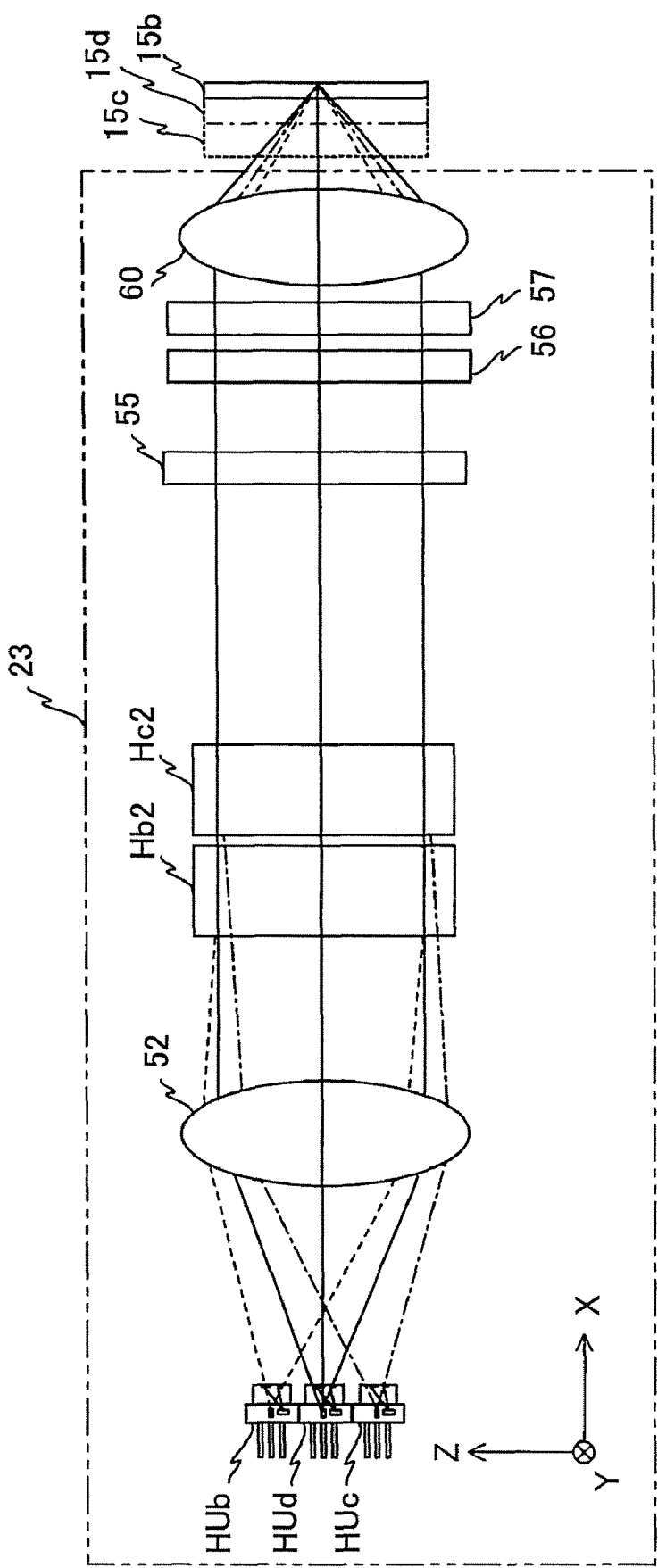
FIG. 42 is a diagram for explaining the optical pickup device in an embodiment of the invention.

This embodiment uses a hologram unit instead of each light source in the previously mentioned embodiment. As shown in FIG. 42, the optical pickup device 23 of this embodiment comprises three hologram units (Hub, HUd, HUc), two hologram elements (Hb2, Hc2), a collimating lens 52, a quarter wave plate 55 for three wavelengths, a diffraction optical element 56, an opening wavelength filter 57, an objective lens 60, and the drive system (which is not illustrated) for driving the objective lens 60.

Figure 43C:
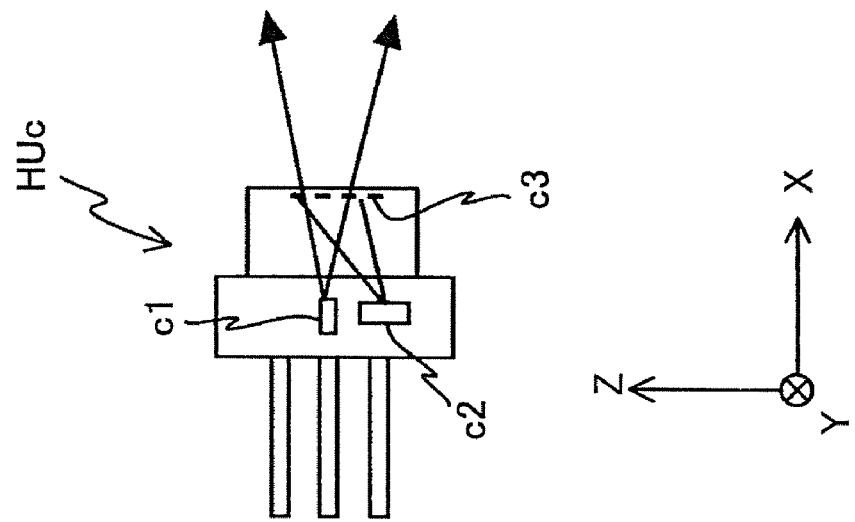
FIG. 43A, FIG. 43B and FIG. 43C are diagrams for explaining the hologram unit in FIG. 42.
Figure 43B:
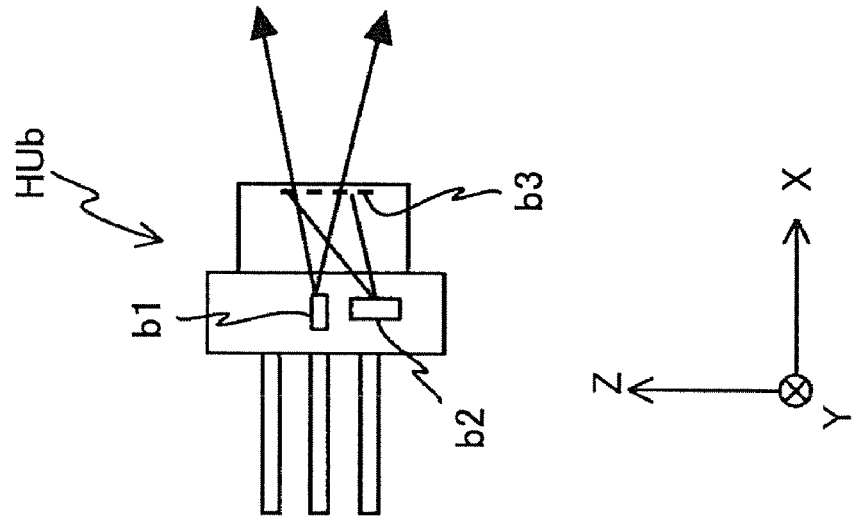
Figure 43A:
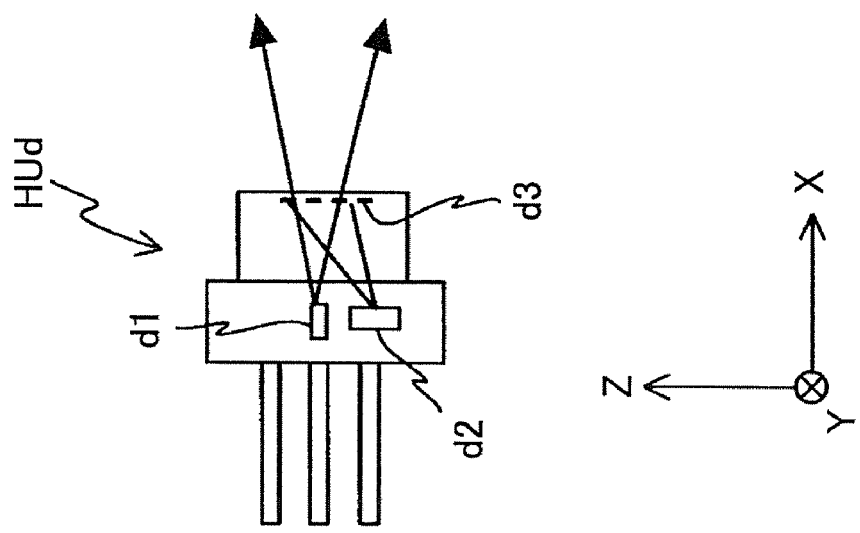

The hologram unit HUd is used when the optical disk is DVD, and as shown in FIG. 43A, the hologram unit HUd comprises the light source d1 which emits a laser beam whose wavelength is 660 nm, the photodetector d2, and the polarization hologram d3. The hologram unit HUd is arranged on the optical axis of collimating lens 52.

The light of P polarization is emitted from light source d1. The polarization hologram d3 is arranged on the +X side of light source d1, and it is set up so that its reflection factor to P polarization is small and its reflection factor to S polarization is large.

The photodetector d2 is arranged near the light source d1, and receives the returned light deflected by polarization hologram d3. Therefore, the light emitted from light source d1 enters into collimating lens 52 through polarization hologram d3.

The hologram unit HUb is used when the optical disk is the BD disk, and as shown in FIG. 43B, the hologram unit HUb comprises the light source b1 which emits a laser beam whose wavelength is 405 nm, the photodetector b2, and the polarization hologram b3. The hologram unit Hub is arranged on the +Z side of hologram unit HUd.

The light of P polarization is emitted from light source b1. The polarization hologram b3 is arranged on the +X side of light source b1, and it is set up so that its reflection factor to P polarization is small and its reflection factor to S polarization is large.

The photodetector b2 is arranged near the light source b1, and receives the returned light deflected by polarization hologram b3. Therefore, the light emitted from light source b1 enters into collimating lens 52 through polarization hologram b3.

The hologram unit HUc is used when the optical disk is a CD, and as shown in FIG. 43C, the hologram unit HUc comprises the light source c1 which emits a laser beam whose wavelength is 780 nm, the photodetector c2, and the polarization hologram c3. The hologram unit HUc is arranged on the −Z side of hologram unit HUd.

The light of P polarization is emitted from light source c1. The polarization hologram c3 is arranged on the +X side of light source c1, and it is set up so that its reflection factor to P polarization is small and its reflection factor to S polarization is large.

The photodetector c2 is arranged near the light source c1, and receives the returned light deflected by polarization hologram c3. Therefore, the light emitted from light source c1 enters into collimating lens 52 through polarization hologram c3.

The hologram element Hb2 and the hologram element Hc2 have mutually different Bragg conditions, and each is a volume hologram element in which the plane of incidence of the incoming light and the plane of outgoing radiation of the diffracted light are in parallel. Each angle magnification of each hologram element is smaller than 1. A thermo-plastic or photo-polymer is used for the material, and each hologram element is created using the known 2 light-beam interference exposing method.

The hologram element Hb2 is arranged on the +X side of collimating lens 52, and it is set up so that the light from hologram unit HUb through collimating lens 52 may satisfy the Bragg condition. Therefore, the light from hologram unit HUb through collimating lens 52 is diffracted in the direction of +X by hologram element Hb2. The light from hologram unit HUd and the light from hologram unit HUc through collimating lens 52 do not satisfy the Bragg conditions of hologram element Hb2, and they penetrate it without change.

The hologram element Hc2 is arranged on the +X side of hologram element Hb2, and it is set up so that the light from hologram unit HUc penetrating the hologram element Hb2 may satisfy the Bragg condition. Therefore, the light from hologram unit HUc penetrating the hologram element Hb2 is diffracted in the direction of +X by hologram element Hc2. The light from hologram unit HUd and the diffracted light from hologram element Hb2 penetrating the hologram element Hc2 do not satisfy the Bragg conditions of hologram element Hc2, and they penetrate it without change.

The objective lens 60 is optimized to DVD. Then, aberration for hologram element Hb2 to correct the aberration resulting from the difference in the substrate thickness of BD and DVD to hologram pattern creation time is added. And aberration for hologram element Hc2 to correct the aberration resulting from the difference in the substrate thickness of CD and DVD to hologram pattern creation time is added.

The quarter wave plate 55 is arranged on the +X side of hologram element Hc2. The diffraction optical element 56, the opening wavelength filter 57, and the objective lens 60 are arranged similar to the above-mentioned embodiment.

Operation of the optical pickup device 23 in this embodiment will be explained briefly.

Operation of the optical pickup device 23 when the optical disk is the BD disk will be explained. The light of the plane polarization emitted from light source b1 enters into collimating lens 52 through polarization hologram b3. It enters into hologram element Hb2 as the parallel beam, and it is diffracted by hologram element Hb2. The aberration compensation penetrating the hologram element Hc2, is converted into the circularly polarized light by the quarter wave plate 55, and the opening restriction which is suitable for BD is performed by the diffraction optical element 56. The opening restriction which is suitable for BD is performed by the opening wavelength filter 57, and it is focused on the recording layer of optical disk 15b through objective lens 60.

The received light from optical disk 15b is converted into the circularly polarized light in the opposite polarization direction, and the returned light enters into diffraction optical element 56 through objective lens 60 and opening wavelength filter 57. The returned light which is converted into the parallel beam by the diffraction optical element 56 enters into quarter wave plate 55, so that it is converted into the linearly polarized light which is perpendicular to the outward trip. And this returned light penetrates hologram element Hc2 without change, is diffracted by hologram element Hb2, enters into polarization hologram b3 through collimating lens 52, is deflected by polarization hologram b3, and is received by the photodetector b2.

Operation of the optical pickup device 23 when the optical disk is a DVD will be explained. The light of the plane polarization emitted from light source d1 enters into collimating lens 52 through polarization hologram d3. The hologram element Hb2 and hologram element Hc2 are penetrated without change as the parallel beam.

It is converted into the circularly polarized light by the quarter wave plate 55, the diffraction optical element 56 is penetrated without change, the opening restriction suitable for DVD is performed by the opening wavelength filter 57, and it is focused on the recording layer of optical disk 15d through objective lens 60.

The received light from optical disk 15d is converted into the circularly polarized light in the opposite polarization direction, and the returned light enters into diffraction optical element 56 through objective lens 60 and opening wavelength filter 57. The returned light which is converted into the parallel beam by the diffraction optical element 56 enters into quarter wave plate 55, so that it is converted into the linearly polarized light which is perpendicular to the outward trip. And this returned light penetrates hologram element Hc2 and hologram element Hb2 without change, enters into polarization hologram d3 through collimating lens 52, is deflected by polarization hologram d3, and is received by the photodetector d2.

Operation of the optical pickup device 23 when the optical disk is a CD will be explained. The light of the plane polarization emitted from light source c1 enters into collimating lens 52 through polarization hologram c3. It penetrates hologram element Hb2 as the parallel beam and it enters into hologram element Hc2.

The aberration compensation which is diffracted by hologram element Hc2, is converted into the circularly polarized light by the quarter wave plate 55. The opening restriction suitable for CD is performed by the diffraction optical element 56 and the opening restriction suitable for CD is performed by the opening wavelength filter 57. It is focused on the recording layer of optical disk 15c through objective lens 60.

The received light from optical disk 15c is converted into the circularly polarized light in the opposite polarization direction, and the returned light enters into diffraction optical element 56 through objective lens 60 and opening wavelength filter 57. The returned light which is converted into the parallel beam by the diffraction optical element 56 enters into quarter wave plate 55, so that it is converted into the linearly polarized light which is perpendicular to the outward trip. And this returned light is diffracted by hologram element Hc2, penetrates hologram element Hb2 without change, enters into polarization hologram c3 through collimating lens 52, is deflected by polarization hologram c3, and is received by the photodetector c2.

As explained above, in the optical pickup device 23 of this embodiment, there are provided the light sources (b1, d1, c1), the hologram element Hb2 which diffracts the light from the light source b1 in the direction of +X and diffracts the returned light through the objective lens 60 of the light emitted from the light source b1, and the hologram element Hc2 which diffracts the light from the light source c1 in the direction of +X and diffracts the returned light through the objective lens 60 of the light emitted from the light source c1. Each hologram element is a volume hologram element in which the plane of incidence of the incoming light and the plane of outgoing radiation of the diffracted light are in parallel, and both are arranged along with the direction of the X-axis. Thereby, the miniaturization of an optical pickup device can be further promoted.

The present invention is not limited to the above-described embodiments and variations and modifications may be made without departing from the scope of the invention.

Furthermore, the present application is based upon and claims the benefit of priority of Japanese patent application No. 2005-336097, filed on Nov. 21, 2005, and Japanese patent application No. 2006-012763, filed on Jan. 20, 2006, the entire contents of which are incorporated herein by reference.

The invention claimed is:

1. A light source unit comprising:
a plurality of light sources emitting a plurality of light beams; and
a plurality of volume hologram elements provided for the plurality of light sources respectively, each volume hologram element having a plane of incidence of an incoming light beam and a plane of outgoing radiation of a diffracted light beam which are perpendicular to each other, the plurality of volume hologram elements having mutually different Bragg conditions in which an optical intensity of a diffracted light beam is set to a maximum; and wherein a diffracted light from each of the plurality of volume hologram elements has an intensity distribution symmetrical to an optical axis of the volume hologram element, and a half-width angle of the intensity distribution of the diffracted light beam is larger than a half-width angle of an incoming light beam.

2. The light source unit according to claim 1, wherein two adjacent ones of the plurality of volume hologram elements have mutually different incidence directions of light beams emitted from corresponding ones of the plurality of light sources.

3. The light source unit according to claim 1, wherein each volume hologram element has a predetermined hologram area.

4. The light source unit according to claim 1, wherein each volume hologram element has a lens function to change a degree of divergence of an outgoing diffracted light beam to an incoming light beam.

5. The light source unit according to claim 1, wherein each volume hologram element is made of a photo-polymer or a thermo-plastic.

6. An optical detector unit which detects a plurality of light beams individually, comprising:
  a plurality of volume hologram elements provided for the plurality of light beams respectively, each volume hologram element having a plane of incidence of a corresponding light beam and a plane of outgoing radiation of a diffracted light beam which are perpendicular to each other, the plurality of volume hologram elements having mutually different Bragg conditions in which an optical intensity of a diffracted light beam is set to a maximum; and
  a plurality of photodetectors provided for the plurality of volume hologram elements respectively, each photodetector receiving a diffracted light beam from a corresponding one of the plurality of volume hologram elements; and
  wherein a diffracted light from each of the plurality of volume hologram elements has an intensity distribution symmetrical to an optical axis of the volume hologram element, and a half-width angle of the intensity distribution of the diffracted light beam is larger than a half-width angle of an incoming light beam.

7. The optical detector unit according to claim 6, wherein each of the plurality of volume hologram elements has a same direction of outgoing radiation of a diffracted light beam.

8. The optical detector unit according to claim 6, wherein each volume hologram element has a lens function to change a degree of divergence of an outgoing diffracted light beam to an incoming light beam.

9. The optical detector unit according to claim 6, wherein each volume hologram element is provided to give an astigmatism to an outgoing diffracted light beam.

10. The optical detector unit according to claim 6, wherein each volume hologram element is made of a photo-polymer or a thermo-plastic.

11. An optical pickup device which emits a light beam to an optical disk and receives a reflected light beam from the optical disk, comprising: a light source unit according to claim 1; and an optical system comprising an objective lens focusing a plurality of light beams emitted from the light source unit on a plurality of recording layers of an optical disk, respectively.

12. An optical pickup device which emits a light beam to an optical disk and receives a reflected light beam from the optical disk, comprising: a plurality of light sources emitting a plurality of light beams; an optical system comprising an objective lens focusing the plurality of light beams emitted by the plurality of light sources on a plurality of recording layers of an optical disk, respectively; and an optical detector unit according to claim 6 which is arranged on an optical path of returned light beams from the optical disk through the objective lens to detect the returned light beams.

13. An optical disk device which is adapted to perform reproduction of information from an optical disk, comprising: an optical pickup device according to claim 11; a processing unit provided to reproduce information currently recorded on the optical disk using an output of a photodetector of the optical pickup device.

* * * * *